(12) United States Patent
Wong et al.

(10) Patent No.: US 9,613,714 B1
(45) Date of Patent: Apr. 4, 2017

(54) ONE TIME PROGRAMMING MEMORY CELL AND MEMORY ARRAY FOR PHYSICALLY UNCLONABLE FUNCTION TECHNOLOGY AND ASSOCIATED RANDOM CODE GENERATING METHOD

(71) Applicant: eMemory Technology Inc., Hsin-Chu (TW)

(72) Inventors: Wei-Zhe Wong, Zhubei (TW); Hsin-Ming Chen, Hsinchu (TW); Meng-Yi Wu, Zhubei (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 0 days.

(21) Appl. No.: 15/209,079

(22) Filed: Jul. 13, 2016

Related U.S. Application Data

(60) Provisional application No. 62/280,137, filed on Jan. 19, 2016.

(51) Int. Cl.
| | | |
|---|---|---|
| G11C 17/00 | (2006.01) | |
| G11C 17/16 | (2006.01) | |
| G11C 17/18 | (2006.01) | |
| G06F 12/14 | (2006.01) | |
| H04L 9/32 | (2006.01) | |
| G11C 29/00 | (2006.01) | |
| G11C 16/22 | (2006.01) | |
| G11C 7/24 | (2006.01) | |
| G11C 5/06 | (2006.01) | |

(52) U.S. Cl.
CPC .......... *G11C 17/16* (2013.01); *G06F 12/1408* (2013.01); *G11C 7/24* (2013.01); *G11C 16/22* (2013.01); *G11C 17/18* (2013.01); *G11C 29/785* (2013.01); *H04L 9/3278* (2013.01); *G06F 2212/1052* (2013.01); *G06F 2212/402* (2013.01); *G11C 5/063* (2013.01)

(58) Field of Classification Search
CPC ........... G11C 17/16; G11C 17/18; G11C 7/24; G11C 16/22; G11C 29/785; G11C 8/08; G11C 8/10; G11C 5/063
USPC .... 365/96, 195, 196, 189.09, 230.06, 225.7, 365/63
See application file for complete search history.

(56) References Cited

U.S. PATENT DOCUMENTS

| | | | |
|---|---|---|---|
| 8,300,450 B2 | 10/2012 | Christensen et al. | |
| 9,324,436 B2 * | 4/2016 | Kim | G11C 16/10 |
| 2015/0007337 A1 * | 1/2015 | Krutzik | G06F 21/73 |
| | | | 726/26 |
| 2015/0055417 A1 | 2/2015 | Kim et al. | |
| 2015/0130506 A1 * | 5/2015 | Bhunia | H01L 24/49 |
| | | | 326/8 |

* cited by examiner

*Primary Examiner* — Gene Auduong
(74) *Attorney, Agent, or Firm* — WPAT, PC; Justin King

(57) ABSTRACT

A one time programming memory cell includes a selecting circuit, a first antifuse storing circuit and a second antifuse storing circuit. The selecting circuit is connected with a bit line and a word line. The first antifuse storing circuit is connected between a first antifuse control line and the selecting circuit. The second antifuse storing circuit is connected between a second antifuse control line and the selecting circuit.

20 Claims, 29 Drawing Sheets

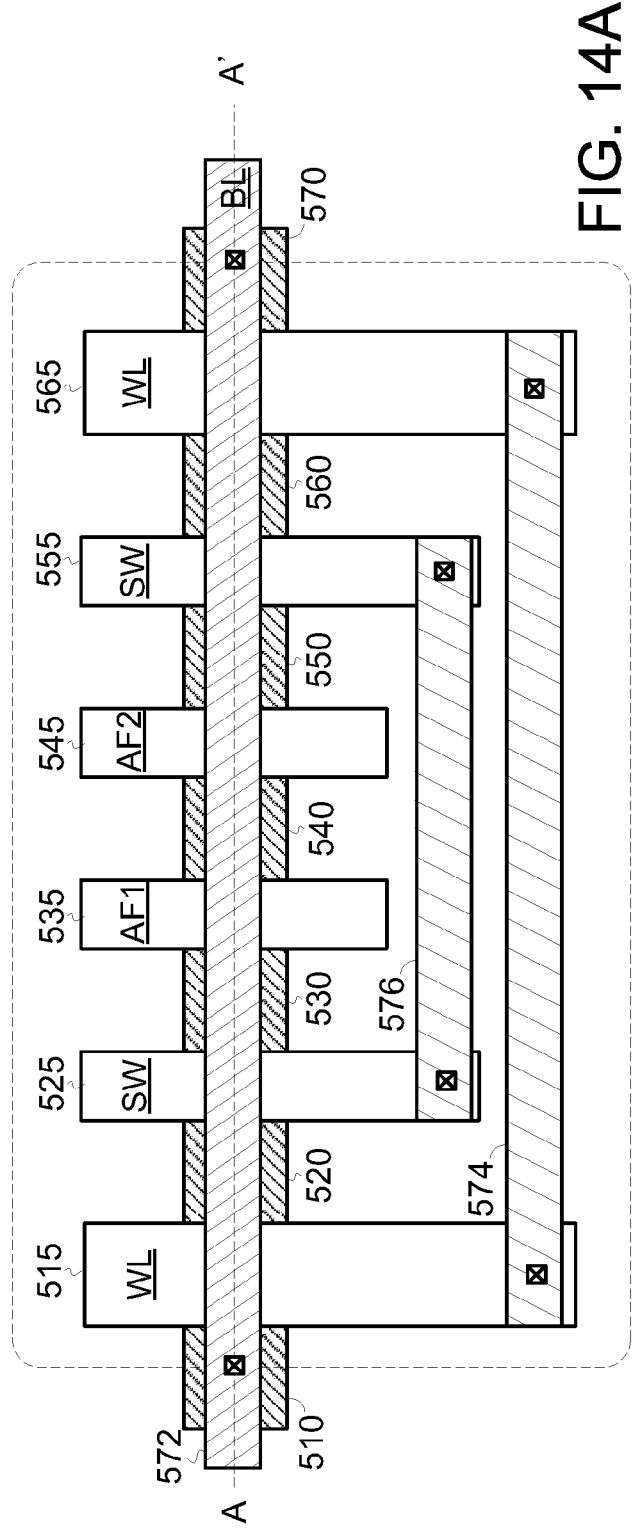
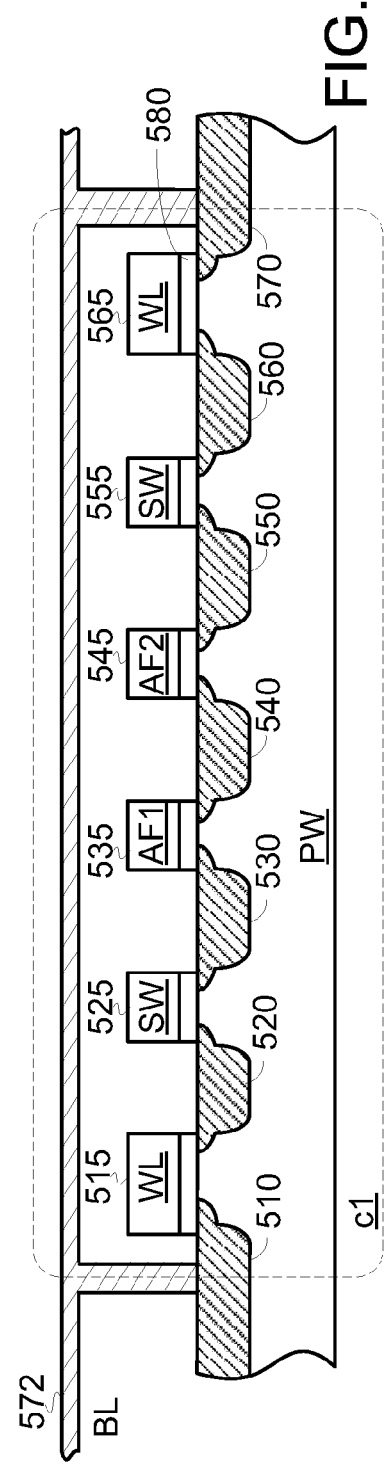
FIG. 14A
FIG. 14B

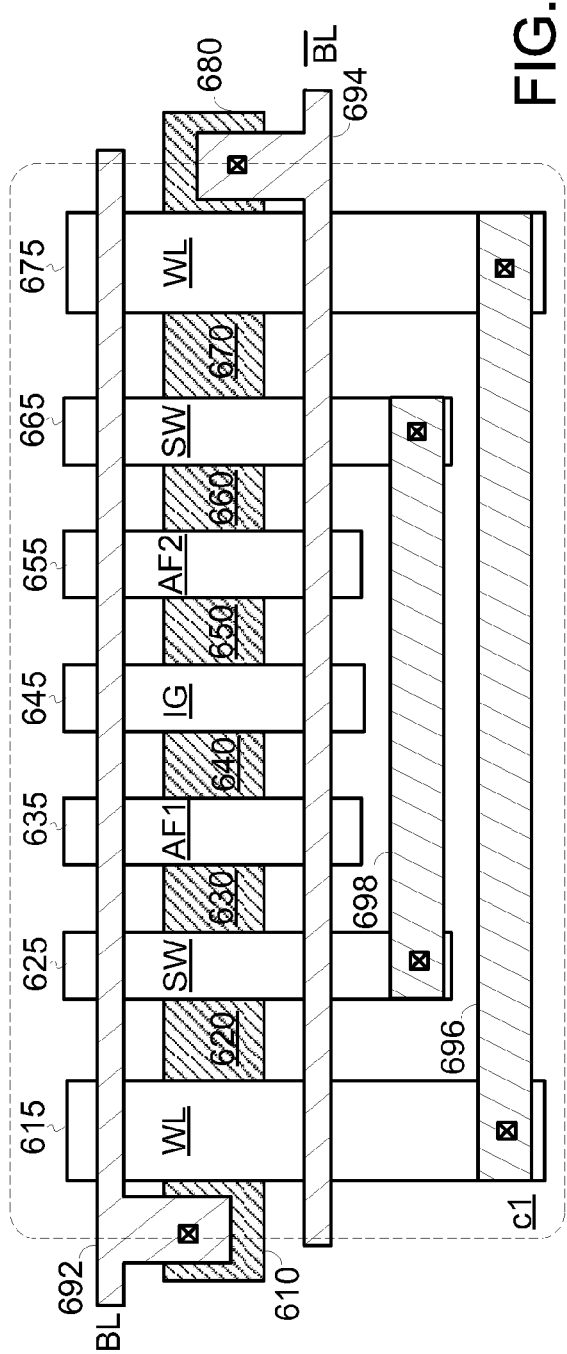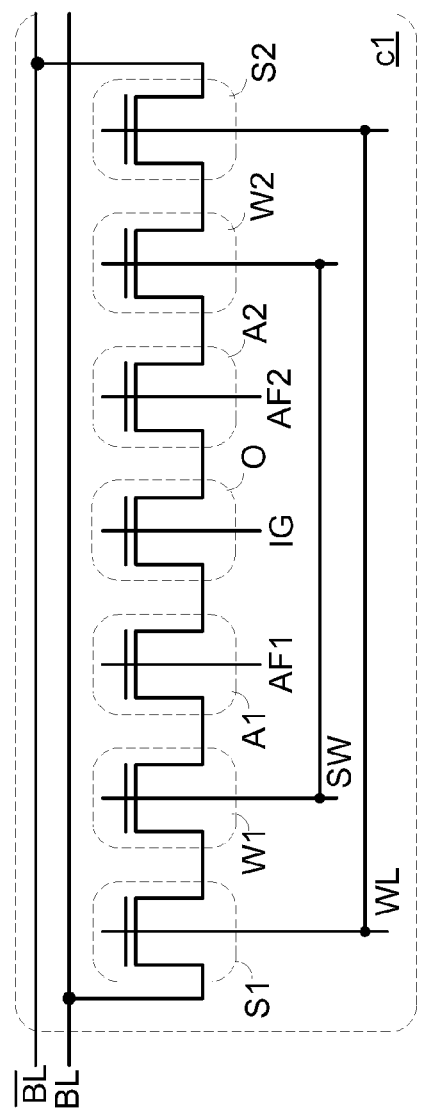
FIG. 17A
FIG. 17B

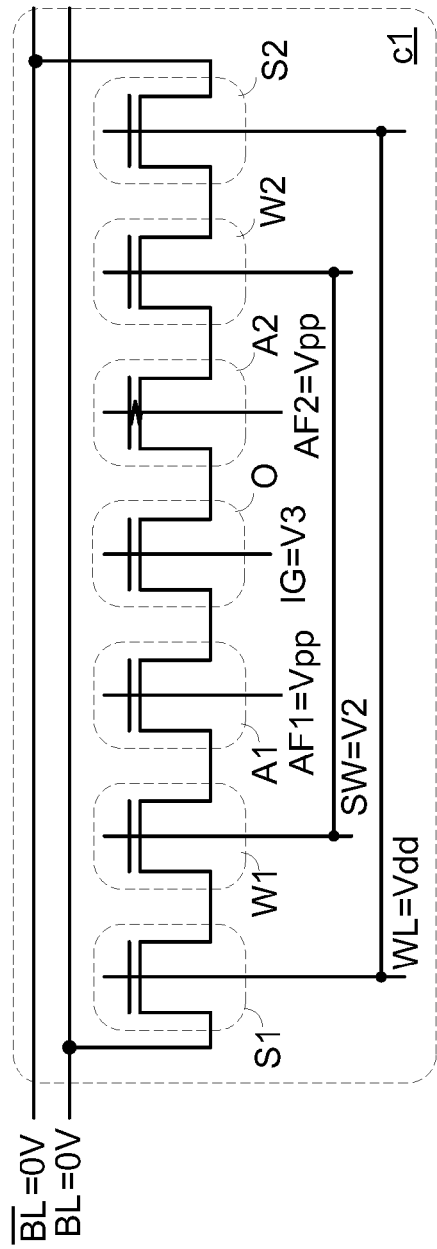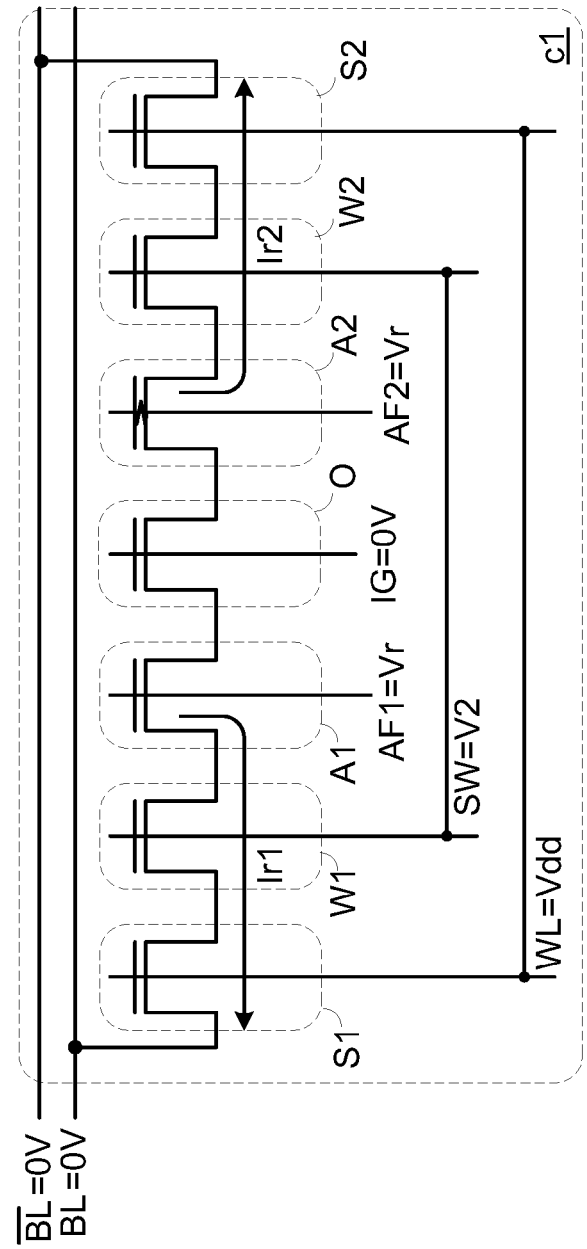

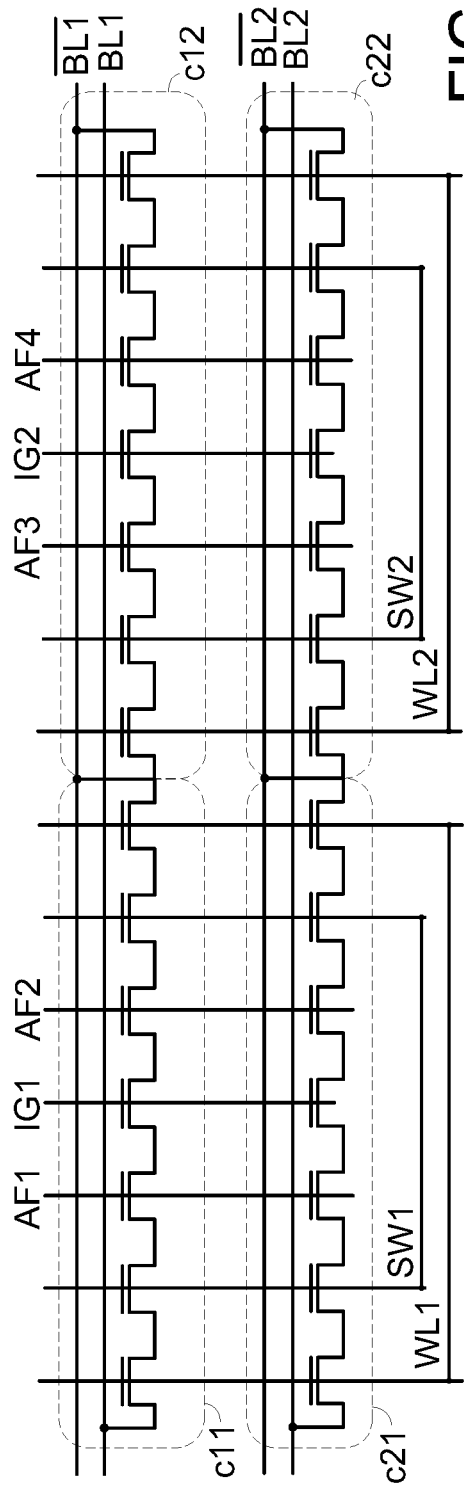
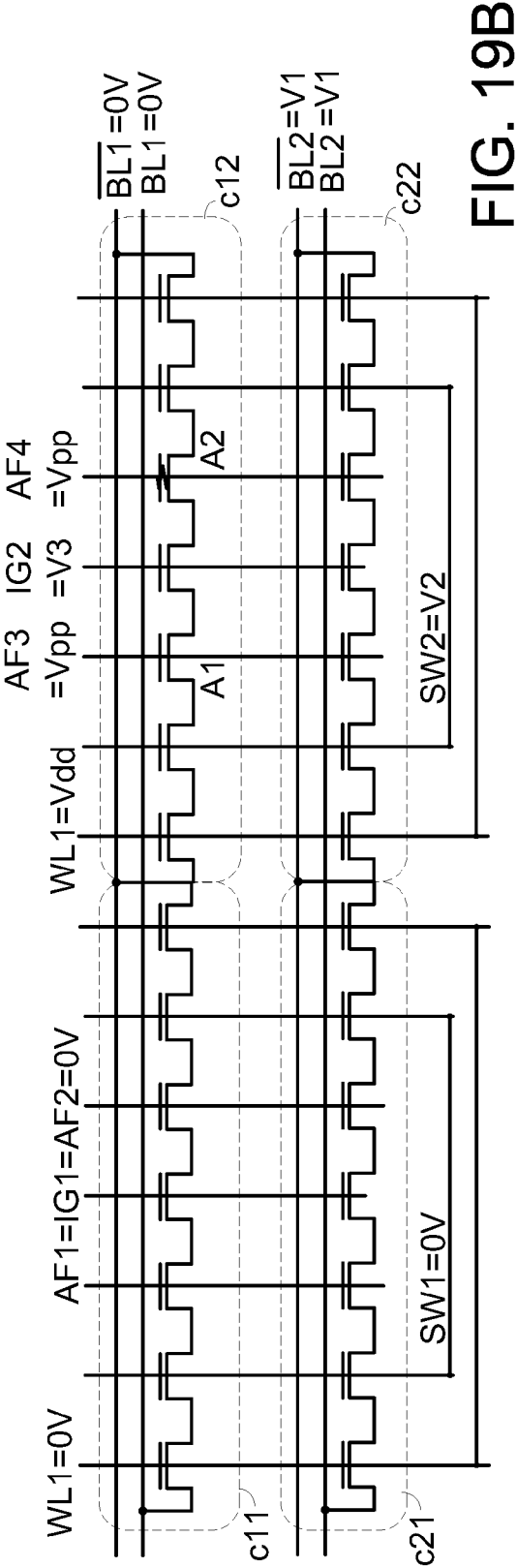
FIG. 19A
FIG. 19B

US 9,613,714 B1

ONE TIME PROGRAMMING MEMORY CELL AND MEMORY ARRAY FOR PHYSICALLY UNCLONABLE FUNCTION TECHNOLOGY AND ASSOCIATED RANDOM CODE GENERATING METHOD

This application claims the benefit of U.S. provisional application Ser. No. 62/280,137, filed Jan. 19, 2016, the subject matter of which is incorporated herein by reference.

FIELD OF THE INVENTION

The present invention relates to a memory cell and a memory array, and more particularly to a one time programming memory cell and a memory array for a physically unclonable function (PUF) technology and associated random code generating method.

BACKGROUND OF THE INVENTION

A physically unclonable function (PUF) technology is a novel method for protecting the data of a semiconductor chip. That is, the use of the PUF technology can prevent the data of the semiconductor chip from being stolen. In accordance with the PUF technology, the semiconductor chip is capable of providing a random code. This random code is used as a unique identity code (ID code) of the semiconductor chip to achieve the protecting function.

Generally, the PUF technology acquires the random code of the semiconductor chip according to the manufacturing variation of the semiconductor chip. This manufacturing variation includes semiconductor process variation. That is, even if the PUF semiconductor chip is produced by a precise fabricating process, the random code cannot be duplicated. Consequently, the PUF semiconductor chip is suitably used in the applications with high security requirements.

SUMMARY OF THE INVENTION

The present invention provides a one time programming memory cell and a memory array for a physically unclonable function (PUF) technology. The one time programming memory cell and the memory array capable of generating random codes are designed. After the program cycle, the random codes corresponding to the one time programming memory cell and a memory array are determined.

An embodiment of the present invention provides a one time programming memory cell. The one time programming memory cell includes a selecting circuit, a first antifuse storing circuit and a second antifuse storing circuit. The selecting circuit is connected with a bit line and a word line. The first antifuse storing circuit is connected between a first antifuse control line and the selecting circuit. The second antifuse storing circuit is connected between a second antifuse control line and the selecting circuit. During a program cycle, a select voltage is provided to the word line, a ground voltage is provided to the bit line, and a program voltage is provided to the first antifuse control line and the second antifuse control line. The selecting circuit provides the ground voltage to the first antifuse storing circuit and the second antifuse storing circuit, and the program voltage is applied to both of the first antifuse storing circuit and the second antifuse storing circuit, so that a storing state of the first antifuse storing circuit or the second antifuse storing circuit is changed. During a read cycle, the select voltage is provided to the word line, the ground voltage is provided to the bit line, a read voltage is provided to the first antifuse control line, and the ground voltage is provided to the second antifuse control line, so that the first antifuse storing circuit generates a first read current to the bit line. The first antifuse storing circuit is judged to have a first storing state or a second storing state according to the first read current, and one bit of a random code for a physically unclonable function technology is realized according to the first storing state or the second storing state of the first antifuse storing circuit.

Another embodiment of the present invention provides a one time programming memory cell. The one time programming memory cell includes a selecting circuit, an isolation circuit, a first antifuse storing circuit and a second antifuse storing circuit. The selecting circuit is connected with a bit line, an inverted bit line and a word line. The isolation circuit is connected with an isolation control line. The first antifuse storing circuit is connected with a first antifuse control line, the isolation circuit and the selecting circuit. The second antifuse storing circuit is connected with a second antifuse control line, the isolation circuit and the selecting circuit. During a program cycle, a select voltage is provided to the word line, a ground voltage is provided to the bit line and the inverted bit line, an on voltage is provided to the isolation control line, and a program voltage is provided to the first antifuse control line and the second antifuse control line. The isolation circuit is connected with the first antifuse storing circuit and the second antifuse storing circuit. The selecting circuit provides the ground voltage to the first antifuse storing circuit and the second antifuse storing circuit, and the program voltage is applied to both of the first antifuse storing circuit and the second antifuse storing circuit, so that a storing state of the first antifuse storing circuit or the second antifuse storing circuit is changed. During a read cycle, the select voltage is provided to the word line, the ground voltage is provided to the bit line and the inverted bit line, a read voltage is provided to the first antifuse control line and the second antifuse control line, and an off voltage is provided to the isolation control line. Consequently, the first antifuse storing circuit generates a first read current to the bit line, and the second antifuse storing circuit generates a second read current to the inverted bit line. The first antifuse storing circuit is judged to have a first storing state while the second antifuse storing circuit is judged to have a second storing state according to the first read current and the second read current. Moreover, one bit of a random code for a physically unclonable function technology is realized according to the first storing state of the first antifuse storing circuit.

Another embodiment of the present invention provides a one time programming memory cell. The one time programming memory cell includes a first antifuse transistor and a second antifuse transistor. A first drain/source terminal of the first antifuse transistor is connected with a bit line. A gate terminal of the first antifuse transistor is connected with a first antifuse control line. The gate terminal of the first antifuse transistor includes a gate oxide layer with a first part and a second part, wherein the first part is thinner than the second part. A first drain/source terminal of the second antifuse transistor is connected with a second drain/source terminal of the first antifuse transistor. A gate terminal of the second antifuse transistor is connected with a second antifuse control line. A second drain/source terminal of the second antifuse transistor is connected with the bit line. The gate terminal of the second antifuse transistor includes a gate oxide layer with a third part and a fourth part, wherein the third part is thinner than the fourth part. During a program cycle, a ground voltage is provided to the bit line, and a program voltage is provided to the first antifuse control line and the second antifuse control line. The program voltage is applied to both of the first antifuse transistor and the second antifuse transistor, so that a storing state of the first antifuse transistor or the second antifuse transistor is changed. During a read cycle, the ground voltage is provided to the bit line, a read voltage is provided to the first antifuse control line, and the ground voltage is provided to the second antifuse control line, so that the first antifuse transistor generates a first read current to the bit line. The first antifuse transistor is judged to have a first storing state or a second storing state according to the first read current, and one bit of a random code for a physically unclonable function technology is realized according to the first storing state or the second storing state of the first antifuse storing circuit.

Another embodiment of the present invention provides a one time programming memory cell. The one time programming memory cell includes a first antifuse transistor, an isolation transistor and a second antifuse transistor. A first drain/source terminal of the first antifuse transistor is connected with a bit line. A gate terminal of the first antifuse transistor is connected with a first antifuse control line. The gate terminal of the first antifuse transistor includes a gate oxide layer with a first part and a second part, wherein the first part is thinner than the second part. A first drain/source terminal of the isolation transistor is connected with a second drain/source terminal of the first antifuse transistor. A gate terminal of the isolation transistor is connected with an isolation control line. A first drain/source terminal of the second antifuse transistor is connected with a second drain/source terminal of the isolation transistor. A gate terminal of the second antifuse transistor is connected with a second antifuse control line. A second drain/source terminal of the second antifuse transistor is connected with an inverted bit line. The gate terminal of the second antifuse transistor includes a gate oxide layer with a third part and a fourth part, wherein the third part is thinner than the fourth part. During a program cycle, a ground voltage is provided to the bit line and the inverted bit line, an on voltage is provided to the isolation control line, and a program voltage is provided to the first antifuse control line and the second antifuse control line. The isolation transistor is connected with the first antifuse transistor and the second antifuse transistor. The program voltage is applied to both of the first antifuse transistor and the second antifuse transistor, so that a storing state of the first antifuse transistor or the second antifuse transistor is changed. During a read cycle, the ground voltage is provided to the bit line and the inverted bit line, a read voltage is provided to the first antifuse control line and the second antifuse control line, and an off voltage is provided to the isolation control line. Consequently, the first antifuse transistor generates a first read current to the bit line and the second antifuse transistor generates a second read current to the inverted bit line. The first antifuse transistor is judged to have a first storing state while the second antifuse transistor is judged to have a second storing state according to the first read current and the second read current. Moreover, one bit of a random code for a physically unclonable function technology is realized according to the first storing state of the first antifuse transistor.

Another embodiment of the present invention provides a memory array. The memory array is connected with a first bit line, a first word line, a first antifuse control line and a second antifuse control line. The memory array includes a first one time programming memory cell and a second one time programming memory cell. The first one time programming memory cell includes a first selecting circuit, a first antifuse storing circuit and a second antifuse storing circuit. The first selecting circuit is connected with the first bit line and the first word line. The first antifuse storing circuit is connected between the first antifuse control line and the first selecting circuit. The second antifuse storing circuit is connected between the second antifuse control line and the first selecting circuit. The second one time programming memory cell includes a second selecting circuit, a third antifuse storing circuit and a fourth antifuse storing circuit. The second selecting circuit is connected with the first bit line and a second word line. The third antifuse storing circuit is connected between a third antifuse control line and the second selecting circuit. The fourth antifuse storing circuit is connected between a fourth antifuse control line and the second selecting circuit. During a program cycle, a select voltage is provided to the first word line, a ground voltage is provided to the first bit line, and a program voltage is provided to the first antifuse control line and the second antifuse control line. The first selecting circuit provides the ground voltage to the first antifuse storing circuit and the second antifuse storing circuit, and the program voltage is applied to both of the first antifuse storing circuit and the second antifuse storing circuit. Consequently, a storing state of the first antifuse storing circuit or the second antifuse storing circuit is changed. During a read cycle, the select voltage is provided to the first word line, the ground voltage is provided to the first bit line, a read voltage is provided to the first antifuse control line, and the ground voltage is provided to the second antifuse control line. Consequently, the first antifuse storing circuit generates a first read current to the first bit line. The first antifuse storing circuit is judged to have a first storing state or a second storing state according to the first read current, and one bit of a random code for a physically unclonable function technology is realized according to the first storing state or the second storing state of the first antifuse storing circuit.

Another embodiment of the present invention provides a memory array. The memory array is connected with a first bit line, a first inverted bit line, a first word line, a first isolation line, a first antifuse control line and a second antifuse control line. The memory array includes a first one time programming memory cell and a second one time programming memory cell. The first one time programming memory cell includes a first selecting circuit, a first isolation circuit, a first antifuse storing circuit and a second antifuse storing circuit. The first selecting circuit is connected with the first bit line, the first inverted bit line and the first word line. The first isolation circuit is connected with the first isolation control line. The first antifuse storing circuit is connected with the first antifuse control line, the first isolation circuit and the first selecting circuit. The second antifuse storing circuit is connected with the second antifuse control line, the first isolation circuit and the first selecting circuit. The second one time programming memory cell includes a second selecting circuit, a second isolation circuit, a third antifuse storing circuit and a fourth antifuse storing circuit. The second selecting circuit is connected with the first bit line, the first inverted bit line and a second word line. The second isolation circuit is connected with a second isolation control line. The third antifuse storing circuit is connected with a third antifuse control line, the second isolation circuit and the second selecting circuit. The fourth antifuse storing circuit is connected with a fourth antifuse control line, the second isolation circuit and the second selecting circuit. During a program cycle, a select voltage is provided to the first word line, a ground voltage is provided to the first bit line and the first inverted bit line, an on voltage is provided to the first isolation control line, and a program voltage is provided to the first antifuse control line and the second antifuse control line. The first isolation circuit is connected with the first antifuse storing circuit and the second antifuse storing circuit. The first selecting circuit provides the ground voltage to the first antifuse storing circuit and the second antifuse storing circuit. The program voltage is applied to both of the first antifuse storing circuit and the second antifuse storing circuit. Consequently, a storing state of the first antifuse storing circuit or the second antifuse storing circuit is changed. During a read cycle, the select voltage is provided to the first word line, the ground voltage is provided to the first bit line and the first inverted bit line, a read voltage is provided to the first antifuse control line and the second antifuse control line, and an off voltage is provided to the first isolation control line. Consequently, the first antifuse storing circuit generates a first read current to the first bit line and the second antifuse storing circuit generates a second read current to the first inverted bit line. The first antifuse storing circuit is judged to have a first storing state while the second antifuse storing circuit is judged to have a second storing state according to the first read current and the second read current. Moreover, one bit of a random code for a physically unclonable function technology is realized according to the first storing state of the first antifuse storing circuit.

Another embodiment of the present invention provides a method. The method for generating a random code, comprising steps of: providing a non-volatile memory cell comprising at least two antifuse storing circuits; programming the antifuse storing circuits with a same predetermined program voltage difference; recording the ruptured conditions of the programmed antifuse storing circuits in the non-volatile memory cell; and generating the random code in response to the ruptured conditions.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 14A is a schematic top view of a one time programming memory cell according to a fifth embodiment of the present invention;

FIG. 14B is a schematic cross-sectional view of the antifuse-type one time programming memory cell of FIG. 14A and taken along a line AA';

FIG. 17A is a schematic top view of a one time programming memory cell according to a sixth embodiment of the present invention;

FIG. 17B is a schematic equivalent circuit diagram of the one time programming memory cell according to the sixth embodiment of the present invention;

FIGS. 18A~18B schematically illustrate associated voltage signals for programming and reading the memory array for the PUF technology according to the sixth embodiment of the present invention;

FIG. 19A is a schematic equivalent circuit diagram illustrating a memory array of OTP memory cells according to the sixth embodiment of the present invention;

FIGS. 19B~19C schematically illustrate associated voltage signals for programming and reading the memory array for the PUF technology according to the sixth embodiment of the present invention;

DETAILED DESCRIPTION OF PREFERRED EMBODIMENTS

As is well known, a non-volatile memory is able to continuously retain data after the supplied power is interrupted. A one time programming memory (also referred as an OTP memory) is one kind of non-volatile memory. The OTP memory can be programmed once. After the OTP memory is programmed, the stored data fails to be modified.

Moreover, depending on the characteristics, the OTP memories may be classified into two types, i.e., a fuse-type OTP memory and an antifuse-type OTP memory. Before a memory cell of the antifuse-type OTP memory is programmed, the memory cell has a high-resistance storage state. After the memory cell of the antifuse-type OTP memory is programmed, the memory cell has a low-resistance storage state. The present invention related to a novel antifuse-type OTP memory. Some examples of the antifuse-type OTP memory will be illustrated as follows.

Figure 1A:
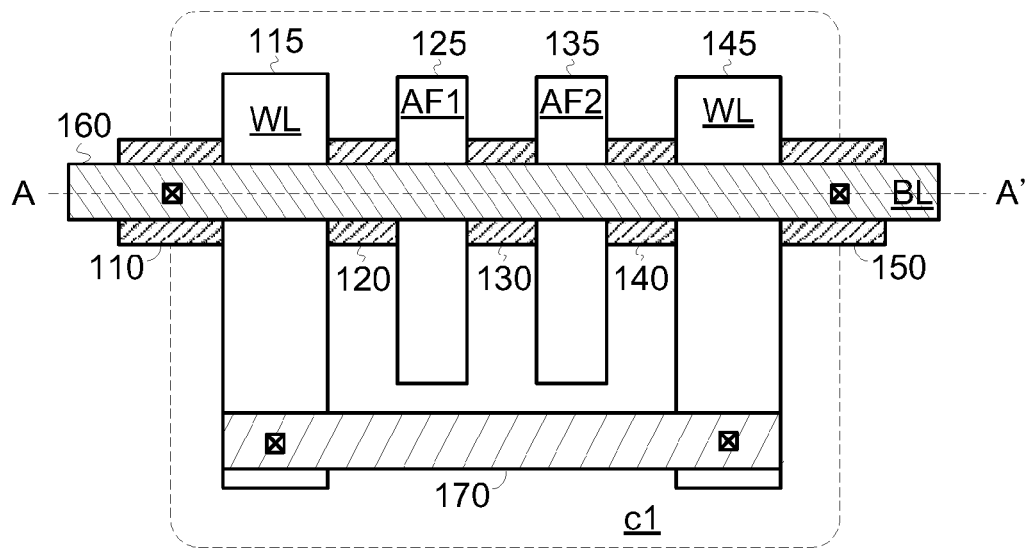
FIG. 1A is a schematic top view of a one time programming memory cell according to a first embodiment of the present invention.
Figure 1B:
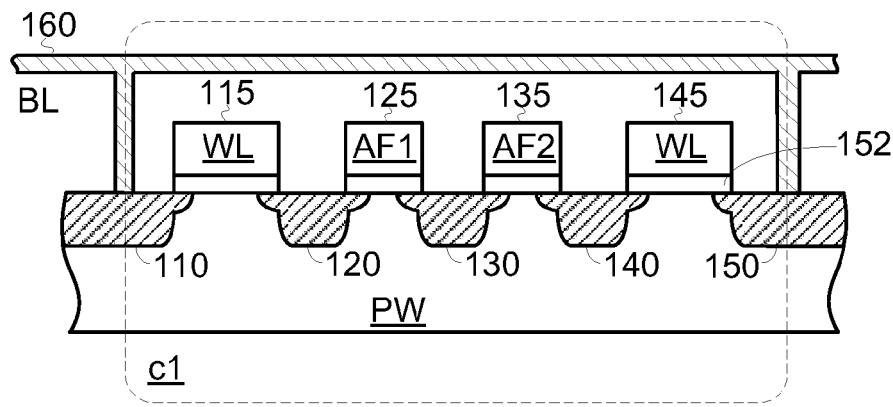
FIG. 1B is a schematic cross-sectional view of the antifuse-type one time programming memory cell of FIG. 1A and taken along a line AA'.
Figure 1C:
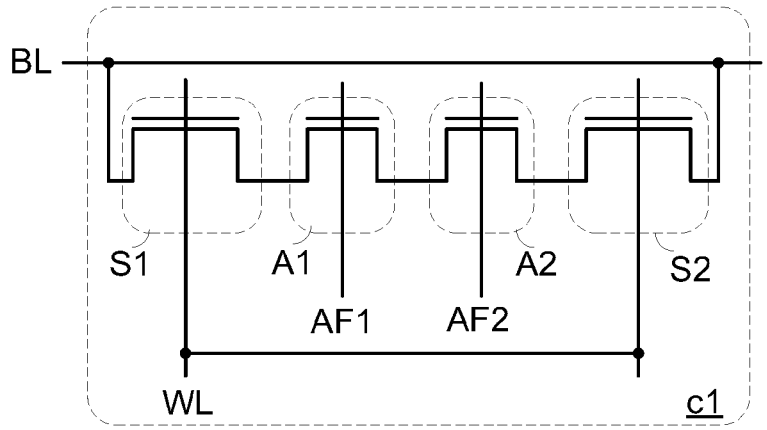
FIG. 1C is a schematic equivalent circuit diagram of the one time programming memory cell according to the first embodiment of the present invention.

FIG. 1A is a schematic top view of a one time programming memory cell according to a first embodiment of the present invention. FIG. 1B is a schematic cross-sectional view of the antifuse-type one time programming memory cell of FIG. 1A and taken along a line AA'. FIG. 1C is a schematic equivalent circuit diagram of the one time programming memory cell according to the first embodiment of the present invention. In this context, the one time programming memory cell is also referred as an OTP memory cell.

As shown in FIGS. 1A and 1B, the OTP memory cell c1 is constructed in a P-well region PW. A gate oxide layer 152 covers the top surface of the P-well region PW. After an etching process to form openings, a first doped region 110, a second doped region 120, a third doped region 130, a fourth doped region 140 and a fifth doped region 150 are formed under a top surface of the P-well region PW. In this embodiment, the first doped region 110, the second doped region 120, the third doped region 130, the fourth doped region 140 and the fifth doped region 150 are N-type doped regions. In this embodiment, the OTP memory cell c1 is constructed in the P-well region PW. It is noted that numerous modifications and alterations may be made while retaining the teachings of the invention. For example, in another embodiment, the OTP memory cell c1 is constructed in an N-well region NW, and the five doped regions are P-type doped regions.

A first gate 115 is formed on the gate oxide layer 152 and spanned over the first doped region 110 and the second doped region 120. Moreover, the first gate 115 is connected with a word line WL of the memory cell c1. A second gate 125 is formed on the gate oxide layer 152 and spanned over the second doped region 120 and the third doped region 130. Moreover, the second gate 125 is connected with a first antifuse control line AF1 of the memory cell c1. A third gate 135 is formed on the gate oxide layer 152 and spanned over the third doped region 130 and the fourth doped region 140. Moreover, the third gate 135 is connected with a second antifuse control line AF2 of the memory cell c1. A fourth gate 145 is formed on the gate oxide layer 152 and spanned over the fourth doped region 140 and the fifth doped region 150. Moreover, the fourth gate 145 is connected with the word line WL of the memory cell c1. In this embodiment, the four gates 115, 125, 135 and 145 are polysilicon gates or metal gates.

A first metal layer 160 is disposed over the four gates 115, 125, 135 and 145. Moreover, the first metal layer 160 is connected with the first doped region 110 and the fifth doped region 150 through two vias. The first metal layer 160 is used as a bit line BL of the memory cell c1. Moreover, the first gate 115 and the fourth gate 145 are connected with each other through a second metal layer 170.

Please refer to FIG. 10. The first doped region 110, the second doped region 120 and the first gate 115 are collaboratively formed as a first select transistor S1. The second doped region 120, the third doped region 130 and the second gate 125 are collaboratively formed as a first antifuse transistor A1. The third doped region 130, the fourth doped region 140 and the third gate 135 are collaboratively formed as a second antifuse transistor A2. The fourth doped region 140, the fifth doped region 150 and the fourth gate 145 are collaboratively formed as a second select transistor S2.

The first drain/source terminal of the first select transistor S1 is connected with the bit line BL. The gate terminal of the first select transistor S1 is connected with the word line WL. The first drain/source terminal of the first antifuse transistor A1 is connected with the second drain/source terminal of the first select transistor S1. The gate terminal of the first antifuse transistor A1 is connected with a first antifuse control line AF1. The first drain/source terminal of the second antifuse transistor A2 is connected with the second drain/source terminal of the first antifuse transistor A1. The gate terminal of the second antifuse transistor A2 is connected with a second antifuse control line AF2. The first drain/source terminal of the second select transistor S2 is connected with the second drain/source terminal of the second antifuse transistor A2. The gate terminal of the second select transistor S2 is connected with the word line WL. The second drain/source terminal of the second select transistor S2 is connected with the bit line BL.

In accordance with the first embodiment, the OTP memory cell c1 comprises two storing circuits. That is, the first antifuse transistor A1 is a first storing circuit, and the second antifuse transistor A2 is a second storing circuit. During the program cycle of the OTP memory cell c1, the high voltage stress is applied to both of the first antifuse transistor A1 and the second antifuse transistor A2. Under this circumstance, the gate oxide layer of one of the first antifuse transistor A1 and the second antifuse transistor A2 is ruptured. Consequently, the storing state of the first antifuse transistor A1 or the second antifuse transistor A2 is changed. During the read cycle, the storing states of the first antifuse transistor A1 and the second antifuse transistor A2 are sequentially read, and the storing state of the first antifuse transistor A1 is used as the random code of the PUF technology. It is noted that the storing state is capable of indicating the ruptured condition of the antifuse transistor. For example, a first storing state means the gate oxide layer of the antifuse transistor is not ruptured, and a second storing state means the gate oxide layer of the antifuse transistor is ruptured.

Figure 2A:
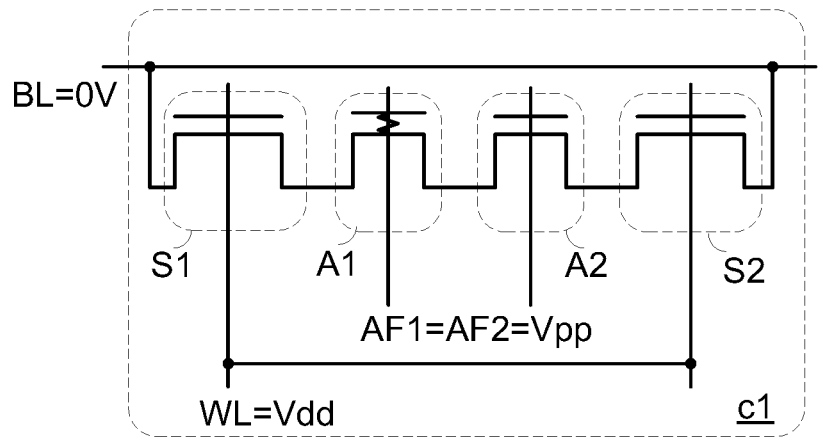
FIGS. 2A~2C schematically illustrate associated voltage signals for programming and reading the OTP memory cell for the PUF technology according to the first embodiment of the present invention.
Figure 2B:
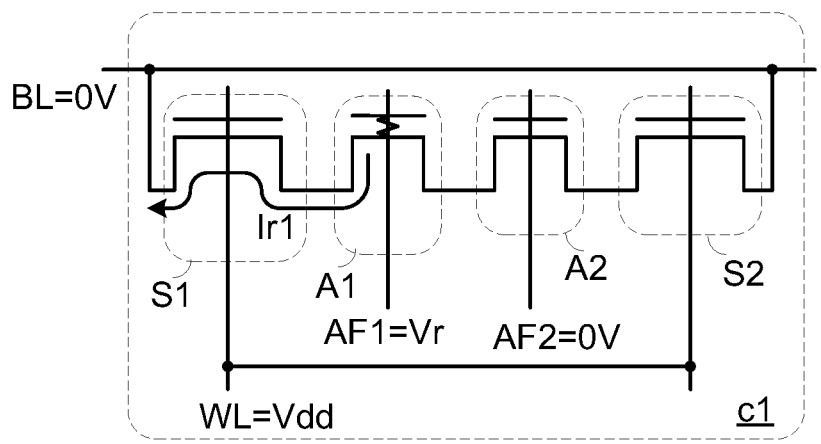
Figure 2C:
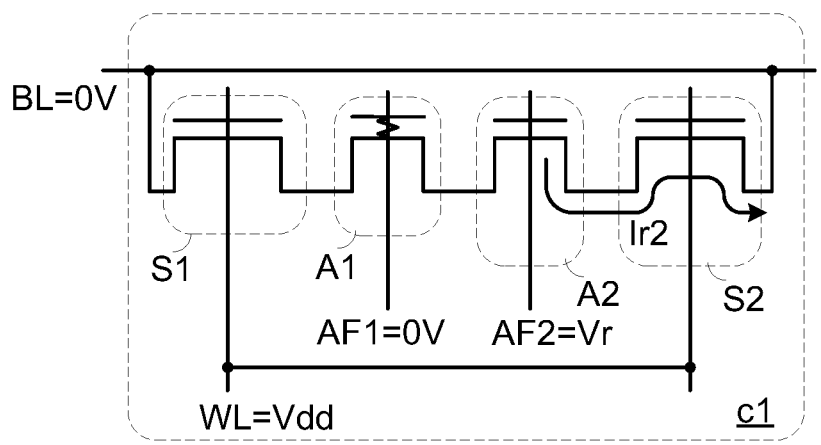

FIGS. 2A~2C schematically illustrate associated voltage signals for programming and reading the OTP memory cell for the PUF technology according to the first embodiment of the present invention.

Please refer to FIG. 2A. For programming the OTP memory cell, a ground voltage (0V) is provided to the bit line BL, a select voltage Vdd is provided to the word line WL, and a program voltage Vpp is provided to the first antifuse control line AF1 and the second antifuse control line AF2. In an embodiment, the select voltage Vdd is in the range between 0.75V and 3.6V, and the program voltage Vpp is in the range between 3.6V and 11V.

When the select voltage Vdd is provided to the word line WL and the ground voltage is provided to the bit line BL, the first select transistor S1 and the second select transistor S2 are turned on. Consequently, a bias voltage Vpp is applied to the gate oxide layer of the first antifuse transistor A1 and the gate oxide layer of the second antifuse transistor A2. Since the program voltage Vpp is beyond the withstanding voltage range of the gate oxide layer, the gate oxide layer of one of the first antifuse transistor A1 and the second antifuse transistor A2 is ruptured. The ruptured gate oxide layer may be considered as a resistor with a low resistance value.

Due to the manufacturing variation of the OTP memory cell c1, the gate oxide layer of which antifuse transistor is ruptured during the program cycle cannot be realized. Consequently, the OTP memory cell c1 can utilize the PUF technology. Take the OTP memory cell c1 of FIG. 2A as an example. During the program cycle, the gate oxide layer of the first antifuse transistor A1 is ruptured, but the gate oxide layer of the second antifuse transistor A2 is not ruptured. That is to say, the ruptured conditions are determined based on the manufacturing variation of the programmed antifuse transistors.

After the OTP memory cell c1 is programmed, two read actions are performed to judge the storing states of the two storing circuits. Please refer to FIG. 2B. During the first read cycle, the ground voltage (0V) is provided to the bit line BL, the select voltage Vdd is provided to the word line WL, a read voltage Vr is provided to the first antifuse control line AF1, and the ground voltage (0V) is provided to the second antifuse control line AF2. In an embodiment, the read voltage Vr is in the range between 0.75V and 3.6V.

Since the gate oxide layer of the first antifuse transistor A1 is ruptured, a first read current Ir1 flowing through the bit line BL has a large value. According to the first read current Ir1, the first antifuse transistor A1 (i.e., the first storing circuit) is verified to have a first storing state corresponding to the low resistance value.

Please refer to FIG. 2C. During the second read cycle, the ground voltage (0V) is provided to the bit line BL, the select voltage Vdd is provided to the word line WL, the ground voltage (0V) is provided to the first antifuse control line AF1, and the read voltage Vr is provided to the second antifuse control line AF2.

Since the gate oxide layer of the second antifuse transistor A2 is not ruptured, a second read current Ir2 flowing through the bit line BL has a small value (i.e., nearly zero). According to the second read current Ir2, the second antifuse transistor A2 (i.e., the second storing circuit) is verified to have a second storing state corresponding to the high resistance value.

Then, according to the storing states of the first antifuse transistor A1 (i.e., the first storing circuit) and the second antifuse transistor A2 (i.e., the second storing circuit), one bit of the random code is determined and applied to the PUF technology.

From the above descriptions, two read actions are performed to confirm the storing states of the two storing circuits and determine one bit of the random code. However, since the storing states are complementary to each other, one bit of the random code can be determined by reading the storing state of only one storing circuit.

Figure 3A:
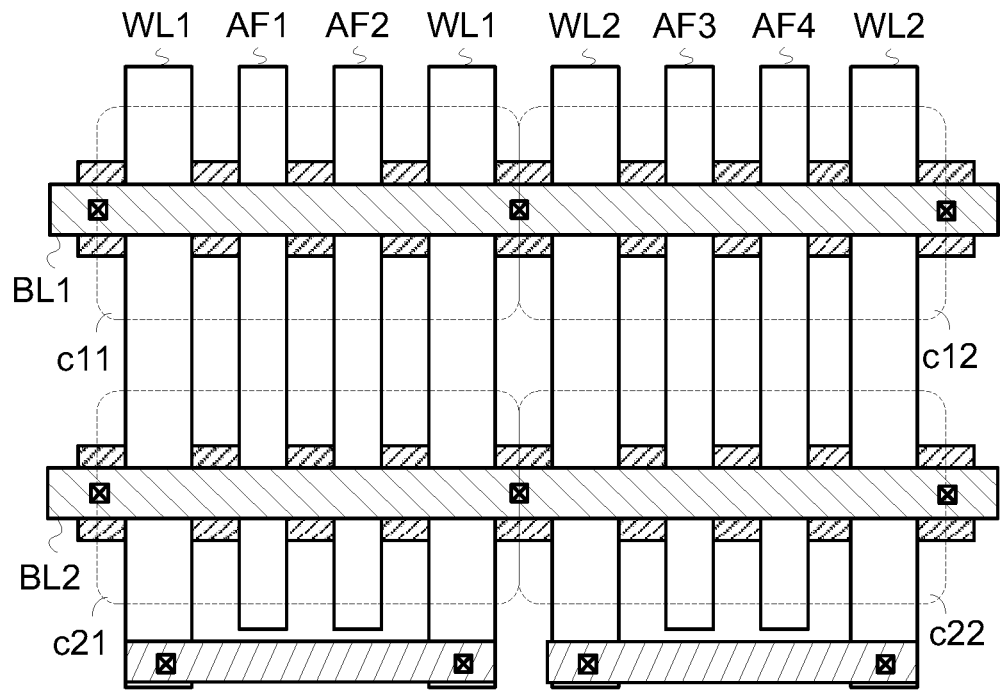
FIG. 3A is a schematic top view illustrating a memory array of OTP memory cells according to the first embodiment of the present invention.
Figure 3B:
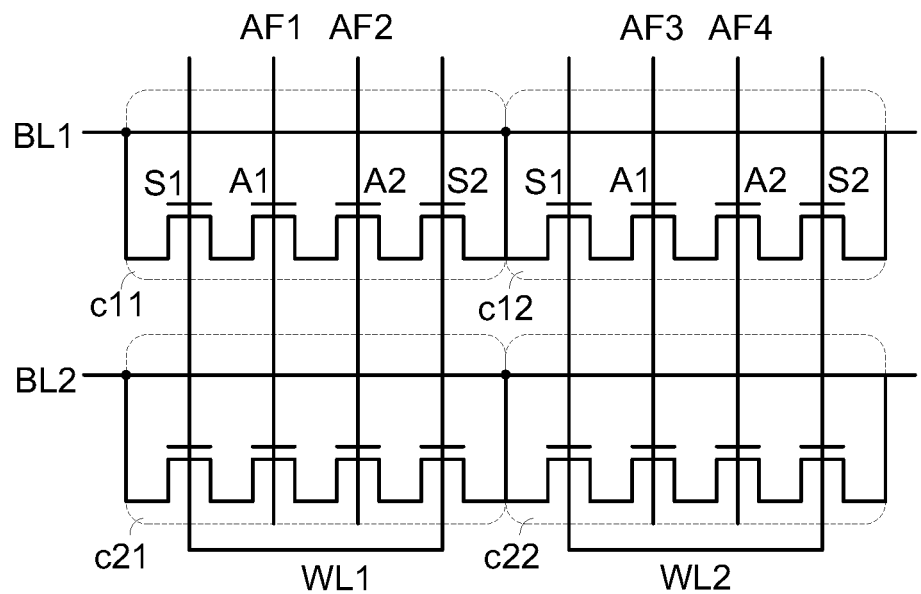
FIG. 3B is a schematic equivalent circuit diagram of the memory array of FIG. 3A.

FIG. 3A is a schematic top view illustrating a memory array of OTP memory cells according to the first embodiment of the present invention. FIG. 3B is a schematic equivalent circuit diagram of the memory array of FIG. 3A.

As shown in FIGS. 3A and 3B, the memory array comprises OTP memory cells c11~c22 in a 2×2 array. The structure of each of the OTP memory cells c11~c22 is similar to the structure of the OTP memory cell as shown in FIG. 1A. In this embodiment, each of the OTP memory cells c11~c22 comprises a first select transistor S1, a second select transistor S2, a first antifuse transistor A1 and a second antifuse transistor A2.

In this embodiment, the OTP memory cells c11 and c12 in the first row are connected with a first bit line BL1, and the OTP memory cells c21 and c22 in the second row are connected with a second bit line BL2. The relationships between the OTP memory cells c21 and c22 are similar to the relationships between the OTP memory cells c11 and c12. For brevity, only the relationships between the OTP memory cells c11 and c12 will be illustrated as follows.

Please refer to FIG. 3B. The OTP memory cell c11 has the following structures. The first drain/source terminal of the first select transistor S1 is connected with the first bit line BL1. The gate terminal of the first select transistor S1 is connected with a first word line WL1. The first drain/source terminal of the first antifuse transistor A1 is connected with the second drain/source terminal of the first select transistor S1. The gate terminal of the first antifuse transistor A1 is connected with the first antifuse control line AF1. The first drain/source terminal of the second antifuse transistor A2 is connected with the second drain/source terminal of the first antifuse transistor A1. The gate terminal of the second antifuse transistor A2 is connected with the second antifuse control line AF2. The first drain/source terminal of the second select transistor S2 is connected with the second drain/source terminal of the second antifuse transistor A2. The gate terminal of the second select transistor S2 is connected with the first word line WL1. The second drain/source terminal of the second select transistor S2 is connected with the first bit line BL1.

The OTP memory cell c12 has the following structure. The first drain/source terminal of the first select transistor S1 is connected with the first bit line BL1. The gate terminal of the first select transistor S1 is connected with a second word line WL2. The first drain/source terminal of the first antifuse transistor A1 is connected with the second drain/source terminal of the first select transistor S1. The gate terminal of the first antifuse transistor A1 is connected with a third first antifuse control line AF3. The first drain/source terminal of the second antifuse transistor A2 is connected with the second drain/source terminal of the first antifuse transistor A1. The gate terminal of the second antifuse transistor A2 is connected with a fourth antifuse control line AF4. The first drain/source terminal of the second select transistor S2 is connected with the second drain/source terminal of the second antifuse transistor A2. The gate terminal of the second select transistor S2 is connected with the second word line WL2. The second drain/source terminal of the second select transistor S2 is connected with the first bit line BL1.

Figure 4A:
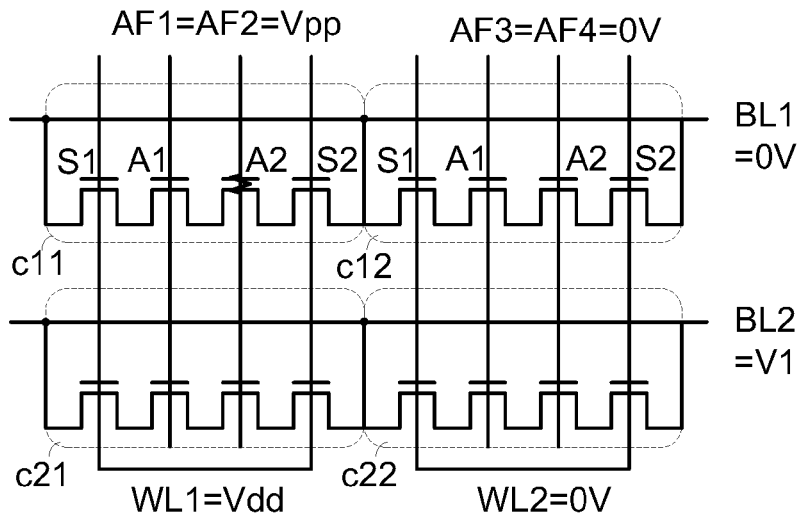
FIGS. 4A~4C schematically illustrate associated voltage signals for programming and reading the memory array for the PUF technology according to the first embodiment of the present invention.
Figure 4B:
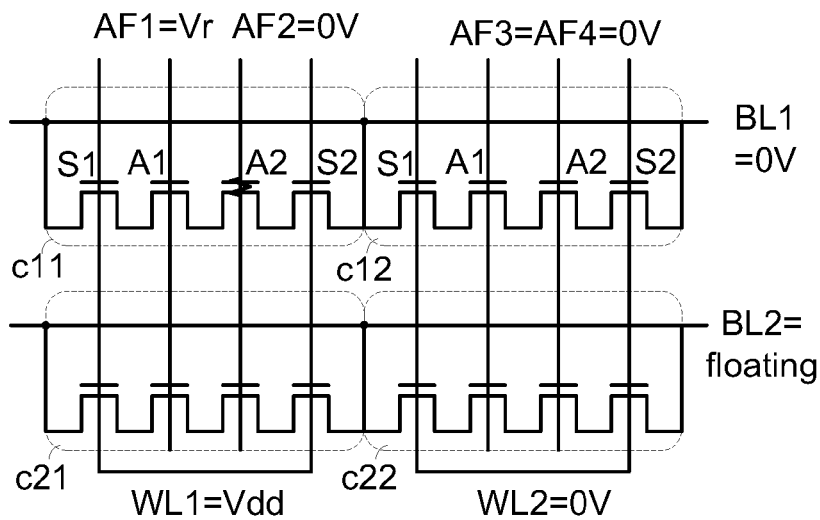
Figure 4C:
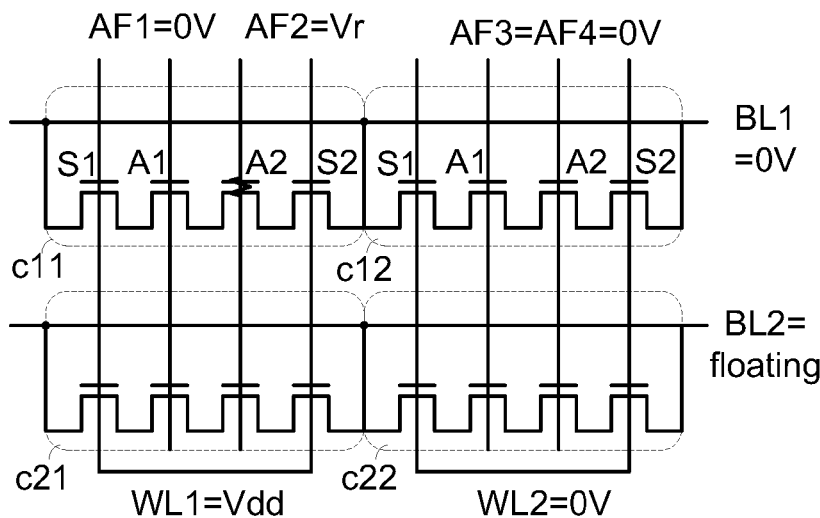

FIGS. 4A~4C schematically illustrate associated voltage signals for programming and reading the memory array for the PUF technology according to the first embodiment of the present invention. For example, the OTP memory cell c11 is a selected memory cell.

Please refer to FIG. 4A. For programming the selected OTP memory cell c11, a ground voltage (0V) is provided to the first bit line BL1, a select voltage Vdd is provided to the first word line WL1, and a program voltage Vpp is provided to the first antifuse control line AF1 and the second antifuse control line AF2. In an embodiment, the select voltage Vdd is in the range between 0.75V and 3.6V, and the program voltage Vpp is in the range between 3.6V and 11V.

The memory cells c12, c21 and c22 are unselected memory cells. For these unselected memory cells, a first voltage V1 is provided to the second bit line BL2, the ground voltage (0V) is provided to the second word line WL2, and the ground voltage (0V) is provided to the third antifuse control line AF3 and the fourth antifuse control line AF4. In an embodiment, the first voltage V1 is equal to or larger than the select voltage Vdd, and the first voltage V1 is smaller than a half of the program voltage Vpp (i.e., Vdd≤V1<Vpp/2).

Please refer to FIG. 4A again. Since the memory cell c11 is the selected memory cell, the bias voltage Vpp is applied to the gate oxide layer of the first antifuse transistor A1 and the gate oxide layer of the second antifuse transistor A2. Consequently, the gate oxide layer of one of the first antifuse transistor A1 and the second antifuse transistor A2 is ruptured. The ruptured gate oxide layer may be considered as a resistor with a low resistance value. For example, in the memory cell c11 as shown in FIG. 4A, the gate oxide layer of the first antifuse transistor A1 is not ruptured, but the gate oxide layer of the second antifuse transistor A2 is ruptured.

In case that the OTP memory cell c12, c21 or c22 is the selected memory cell, the bias voltages for performing the programming process are similar to those for the memory cell c11. The detailed description thereof is not redundantly described herein.

After the selected memory cell c11 is programmed, two read actions are performed to judge the storing states of the two storing circuits of the selected memory cell c11. Please refer to FIG. 4B. During the first read cycle of the selected memory cell c11, the ground voltage (0V) is provided to the first bit line BL1, the select voltage Vdd is provided to the first word line WL1, a read voltage Vr is provided to the first antifuse control line AF1, and the ground voltage (0V) is provided to the second antifuse control line AF2. In an embodiment, the read voltage Vr is in the range between 0.75V and 3.6V.

For the unselected memory cells c12, c21 and c22, the second bit line BL2 is in a floating state, the ground voltage (0V) is provided to the second word line WL2, and the ground voltage (0V) is provided to the third antifuse control line AF3 and the fourth antifuse control line AF4.

In the selected memory cell c11, since the gate oxide layer of the first antifuse transistor A1 is not ruptured, a first read current Ir1 flowing through the first bit line BL1 has a small value (i.e., nearly zero). According to the first read current Ir1, the first antifuse transistor A1 (i.e., the first storing circuit) is verified to have a second storing state corresponding to the high resistance value.

Please refer to FIG. 4C. During the second read cycle of the selected memory cell c11, the ground voltage (0V) is provided to the first bit line BL1, the select voltage Vdd is provided to the first word line WL1, the ground voltage (0V) is provided to the first antifuse control line AF1, and the read voltage Vr is provided to the second antifuse control line AF2. The read voltage Vr is in the range between 0.75V and 3.6V.

For the unselected memory cells c12, c21 and c22, the second bit line BL2 is in a floating state, the ground voltage (0V) is provided to the second word line WL2, and the ground voltage (0V) is provided to the third antifuse control line AF3 and the fourth antifuse control line AF4.

In the selected memory cell c11, since the gate oxide layer of the second antifuse transistor A2 is ruptured, a second read current Ir2 flowing through the first bit line BL1 has a larger value. According to the second read current Ir2, the second antifuse transistor A2 (i.e., the second storing circuit) is verified to have a first storing state corresponding to the low resistance value.

Then, according to the storing states of the first antifuse transistor A1 (i.e., the second storing circuit) and the second antifuse transistor A2 (i.e., the first storing circuit), one bit of the random code is determined and applied to the PUF technology.

From the above descriptions, two read actions are performed to confirm the storing states of the two storing circuits and determine one bit of the random code. However, since the storing states are complementary to each other, one bit of the random code can be determined by reading the storing state of only one storing circuit.

Moreover, after the program actions and the read actions of the four memory cells c11~c22 are performed, a four-bit random code for the PUF technology is generated.

Figure 5A:
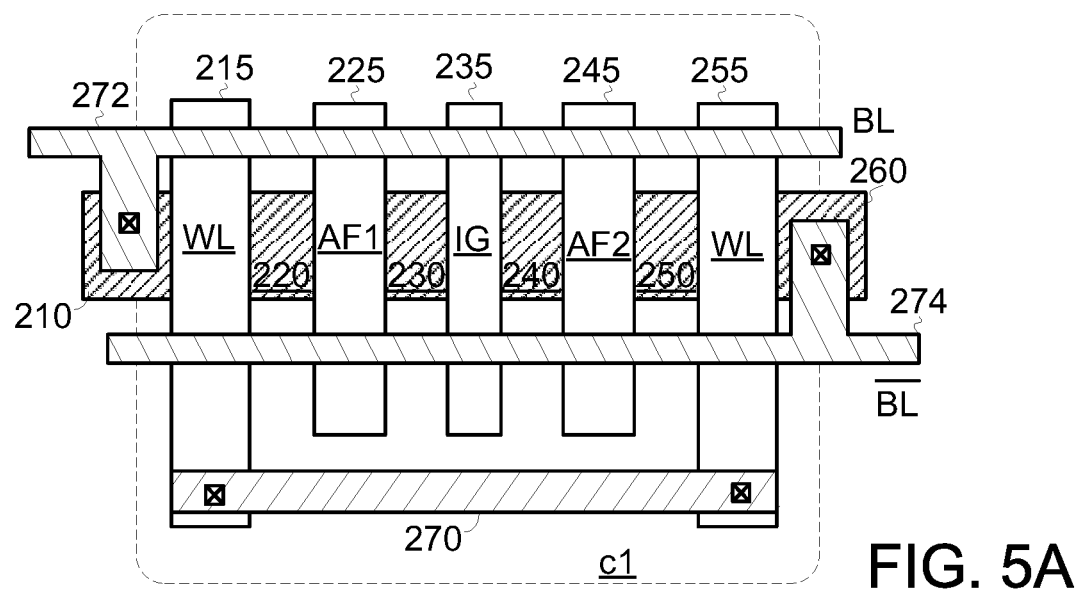
FIG. 5A is a schematic top view of a one time programming memory cell according to a second embodiment of the present invention.
Figure 5B:
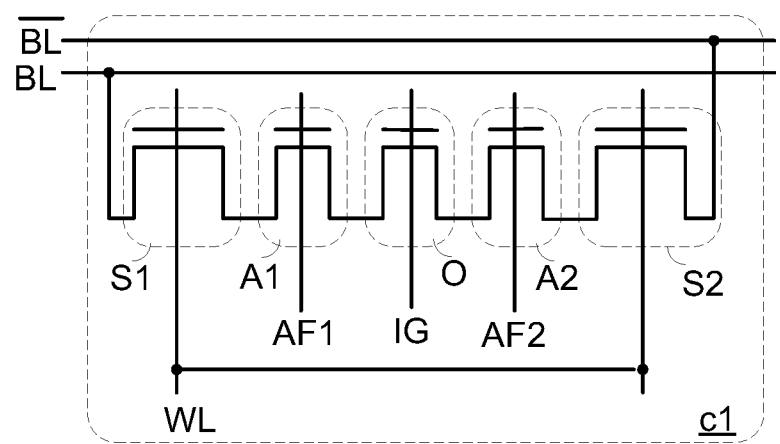
FIG. 5B is a schematic equivalent circuit diagram of the one time programming memory cell according to the second embodiment of the present invention.

FIG. 5A is a schematic top view of a one time programming memory cell according to a second embodiment of the present invention. FIG. 5B is a schematic equivalent circuit diagram of the one time programming memory cell according to the second embodiment of the present invention. In comparison with the first embodiment, the OTP memory cell of this embodiment is a differential memory cell.

As shown in FIG. 5A, the OTP memory cell c1 comprises a first doped region 210, a second doped region 220, a third doped region 230, a fourth doped region 240, a fifth doped region 250 and a sixth doped region 260. A first gate 215 is formed on a gate oxide layer (not shown) and spanned over the first doped region 210 and the second doped region 220. Moreover, the first gate 215 is connected with a word line WL of the memory cell c1. A second gate 225 is formed on the gate oxide layer and spanned over the second doped region 220 and the third doped region 230. Moreover, the second gate 225 is connected with a first antifuse control line AF1 of the memory cell c1. A third gate 235 is formed on the gate oxide layer and spanned over the third doped region 230 and the fourth doped region 240. Moreover, the third gate 235 is connected with an isolation control line IG of the memory cell c1. A fourth gate 245 is formed on the gate oxide layer and spanned over the fourth doped region 240 and the fourth doped region 250. Moreover, the fourth gate 245 is connected with a second antifuse control line AF2 of the memory cell c1. A fifth gate 255 is formed on the gate oxide layer and spanned over the fifth doped region 250 and the sixth doped region 260. Moreover, the fifth gate 255 is connected with the word line WL of the memory cell c1. In this embodiment, the five gates 215, 225, 235, 245 and 255 are polysilicon gates or metal gates.

A first metal layer 272 is connected with the first doped region 210 through a via. Moreover, first metal layer 272 is used as a bit line BL of the memory cell c1. A second metal layer 274 is connected with the sixth doped region 260 through another via. Moreover, the second metal layer 274 is used as an inverted bit line $\overline{BL}$ of the memory cell c1. A third metal layer 270 is connected with the first gate 215 and the fifth gate 255.

Please refer to FIG. 5B. The first doped region 210, the second doped region 220 and the first gate 215 are collaboratively formed as a first select transistor S1. The second doped region 220, the third doped region 230 and the second gate 225 are collaboratively formed as a first antifuse transistor A1. The third doped region 230, the fourth doped region 240 and the third gate 235 are collaboratively formed as an isolation transistor O. The fourth doped region 240, the fifth doped region 250 and the fourth gate 245 are collaboratively formed as a second antifuse transistor A2. The fifth doped region 250, the sixth doped region 260 and the fifth gate 255 are collaboratively formed as a second select transistor S2.

The first select transistor S1, the first antifuse transistor A1, the isolation transistor O, the second antifuse transistor A2 and the second select transistor S2 are serially connected between the bit line BL and the inverted bit line $\overline{BL}$. The gate terminal of the first select transistor S1 is connected with the word line WL. The gate terminal of the first antifuse transistor A1 is connected with a first antifuse control line AF1. The gate terminal of the isolation transistor O is connected with an isolation control line IG. The gate terminal of the second antifuse transistor A2 is connected with a second antifuse control line AF2. The gate terminal of the second select transistor S2 is connected with the word line WL.

In accordance with the second embodiment, the OTP memory cell c1 comprises two storing circuits. That is, the first antifuse transistor A1 is a first storing circuit, and the second antifuse transistor A2 is a second storing circuit. During the program cycle of the OTP memory cell c1, the high voltage stress is applied to both of the first antifuse transistor A1 and the second antifuse transistor A2. Under this circumstance, the gate oxide layer of one of the first antifuse transistor A1 and the second antifuse transistor A2 is ruptured. Consequently, the storing state of the first antifuse transistor A1 or the second antifuse transistor A2 is changed. During the read cycle of the OTP memory cell c1, the storing states of the first antifuse transistor A1 and the second antifuse transistor A2 are directly read, and the storing states thereof are used as the random code of the PUF technology.

Figure 6A:
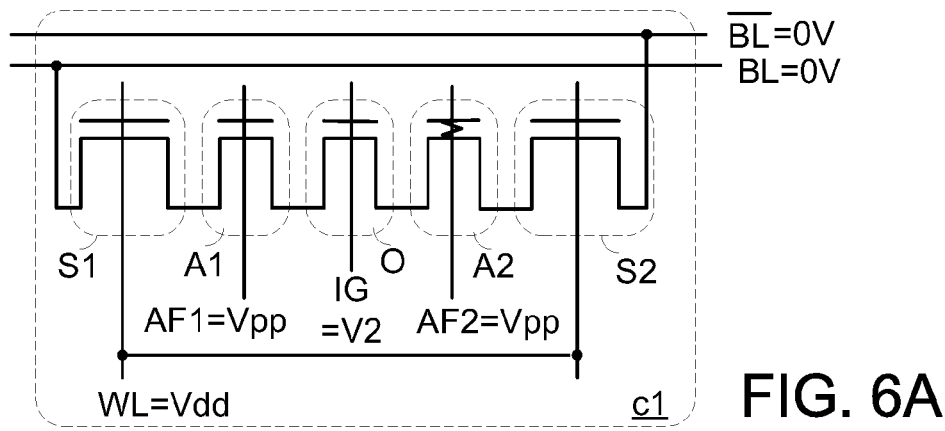
FIGS. 6A~6B schematically illustrate associated voltage signals for programming and reading the memory array for the PUF technology according to the second embodiment of the present invention.
Figure 6B:
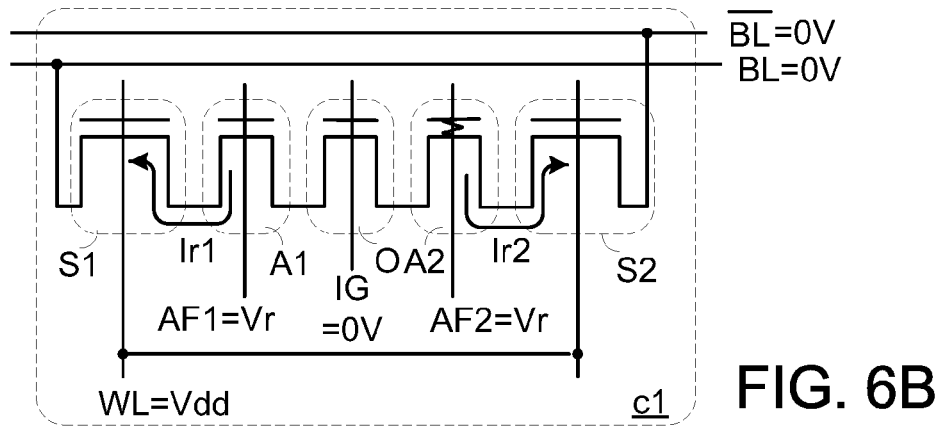

FIGS. 6A~6B schematically illustrate associated voltage signals for programming and reading the memory array for the PUF technology according to the second embodiment of the present invention.

Please refer to FIG. 6A. For programming the selected OTP memory cell c1, a ground voltage (0V) is provided to the bit line BL and the inverted bit line $\overline{BL}$, a select voltage Vdd is provided to the word line WL, a program voltage Vpp is provided to the first antifuse control line AF1 and the second antifuse control line AF2, and a second voltage V2 is provided to the isolation line IG. In an embodiment, the select voltage Vdd is in the range between 0.75V and 3.6V, and the program voltage Vpp is in the range between 3.6V and 11V. Moreover, the second voltage V2 is larger than or equal to the select voltage Vdd and smaller than three-fourths of the program voltage Vpp (i.e., Vdd≤V2<3Vpp/4).

During the program cycle, the third doped region 230 and the fourth doped region 240 are connected to each other by turning on the isolation transistor O. Consequently, a bias voltage Vpp is applied to the gate oxide layer of the first antifuse transistor A1 and the gate oxide layer of the second antifuse transistor A2. Since the program voltage Vpp is beyond the withstanding voltage range of the gate oxide layer, the gate oxide layer of one of the first antifuse transistor A1 and the second antifuse transistor A2 is ruptured. The ruptured gate oxide layer may be considered as a resistor with a low resistance value.

Due to the manufacturing variation of the OTP memory cell c1, the gate oxide layer of which antifuse transistor is ruptured during the program cycle cannot be realized. Consequently, the OTP memory cell c1 can utilize the PUF technology. Take the OTP memory cell c1 of FIG. 6A as an example. During the program cycle, the gate oxide layer of the first antifuse transistor A1 is not ruptured, but the gate oxide layer of the second antifuse transistor A2 is ruptured.

After the OTP memory cell c1 is programmed, one read action is performed to judge the storing states of the two storing circuits. Please refer to FIG. 6B. During the read cycle of the OTP memory cell c1, the ground voltage (0V) is provided to the bit line BL and the inverted bit line $\overline{BL}$, the select voltage Vdd is provided to the word line WL, a read voltage Vr is provided to the first antifuse control line AF1 and the second antifuse control line AF2, and the ground voltage (0V) is provided to the isolation control line IG. In an embodiment, the read voltage Vr is in the range between 0.75V and 3.6V.

Since the third doped region 230 and the fourth doped region 240 are isolated by turning off the isolation transistor O, a first read current Ir1 having a small value (i.e., nearly zero) is provided from the first antifuse transistor A1 to the bit line BL, and a second read current Ir2 having a higher value is provided from the second antifuse transistor A2 to the inverted bit line $\overline{BL}$. According to the first read current Ir1 and the second read current Ir2, the first antifuse transistor A1 (i.e., the first storing circuit) is verified to have a second storing state corresponding to the high resistance value, and the second antifuse transistor A2 (i.e., the second storing circuit) is verified to have a first storing state corresponding to the low resistance value.

Then, according to the storing states of the first antifuse transistor A1 (i.e., the first storing circuit) and the second antifuse transistor A2 (i.e., the second storing circuit), one bit of the random code is determined and applied to the PUF technology.

Alternatively, one bit of the random code can be determined by using a differential sensing operation. For example, if the first read current Ir1 is larger than the second read current Ir2, the OTP memory cell c1 is defined as a first storing state; and if the first read current Ir1 is smaller than the second read current Ir2, the OTP memory cell c1 is defined as a second storing state.

Figure 7A:
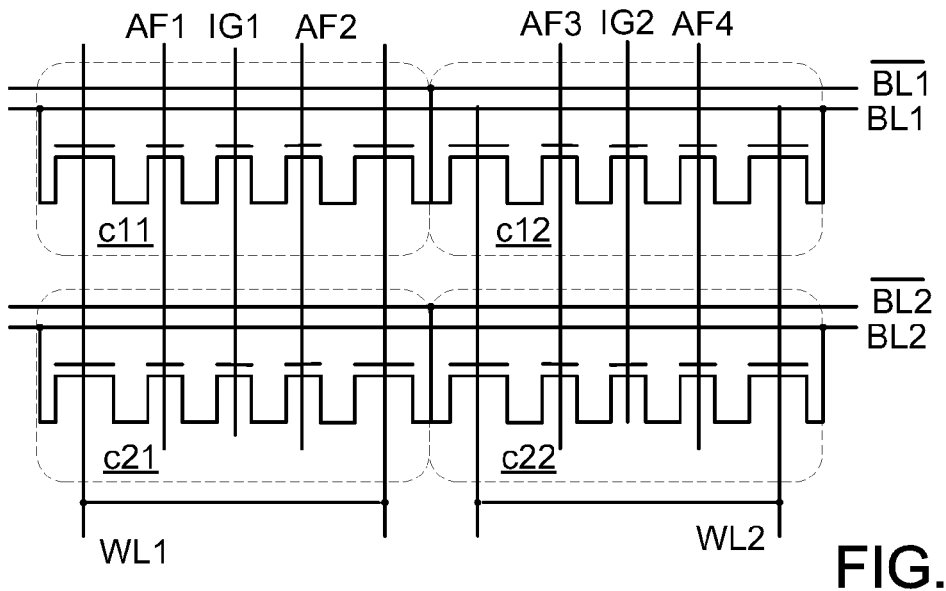
FIG. 7A is a schematic equivalent circuit diagram illustrating a memory array of OTP memory cells according to the second embodiment of the present invention.

FIG. 7A is a schematic equivalent circuit diagram illustrating a memory array of OTP memory cells according to the second embodiment of the present invention. As shown in FIG. 7A, the memory array comprises OTP memory cells c11~c22 in a 2×2 array. The structure of each of the OTP memory cells c11~c22 is similar to the structure of the OTP memory cell as shown in FIG. 6A. In this embodiment, each of the OTP memory cells c11~c22 comprises a first select transistor S1, a second select transistor S2, a first antifuse transistor A1, a second antifuse transistor A2 and an isolation transistor O.

Figure 7B:
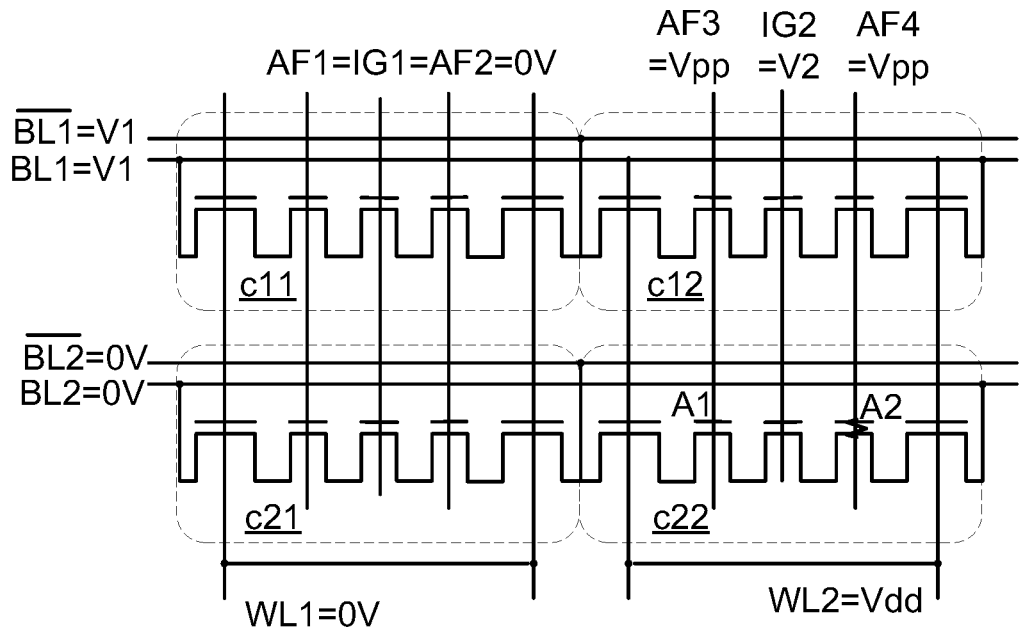
FIGS. 7B~7C schematically illustrate associated voltage signals for programming and reading the memory array for the PUF technology according to the second embodiment of the present invention.
Figure 7C:
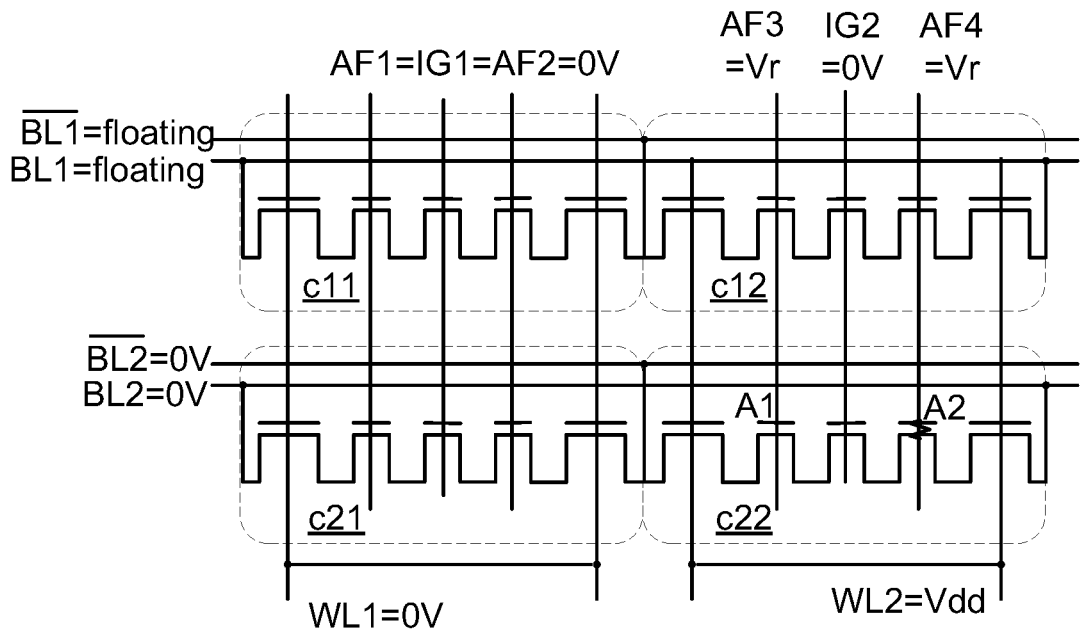

FIGS. 7B~7C schematically illustrate associated voltage signals for programming and reading the memory array for the PUF technology according to the second embodiment of the present invention. For example, the OTP memory cell c22 is a selected memory cell.

Please refer to FIG. 7B. For programming the selected OTP memory cell c22, a ground voltage (0V) is provided to a second bit line BL2 and a second inverted bit line $\overline{BL2}$, a select voltage Vdd is provided to a second word line WL2, a program voltage Vpp is provided to a third antifuse control line AF3 and a fourth antifuse control line AF4, and a second voltage V2 is provided to a second isolation control line IG2. In an embodiment, the select voltage Vdd is in the range between 0.75V and 3.6V, and the program voltage Vpp is in the range between 3.6V and 11V. Moreover, the second voltage V2 is larger than or equal to the select voltage Vdd and smaller than three-fourths of the program voltage Vpp (i.e., Vdd≤V2<3Vpp/4).

The memory cells c12, c21 and c22 are unselected memory cells. For these unselected memory cells, a first voltage V1 is provided to a first bit line BL1 and a first inverted bit line $\overline{BL1}$, the ground voltage (0V) is provided to a first word line WL1, and the ground voltage (0V) is provided to a first antifuse control line AF1, a second antifuse control line AF2 and a first isolation control line IG1. In an embodiment, the first voltage V1 is equal to or larger than the select voltage Vdd, and the first voltage V1 is smaller than a half of the program voltage Vpp (i.e., Vdd≤V1<Vpp/2).

Please refer to FIG. 7B again. Since the memory cell c22 is the selected memory cell, the bias voltage Vpp is applied to the gate oxide layer of the first antifuse transistor A1 and the gate oxide layer of the second antifuse transistor A2. Consequently, the gate oxide layer of one of the first antifuse transistor A1 and the second antifuse transistor A2 is ruptured. The ruptured gate oxide layer may be considered as a resistor with a low resistance value. For example, in the memory cell c22 as shown in FIG. 7B, the gate oxide layer of the first antifuse transistor A1 is not ruptured, but the gate oxide layer of the second antifuse transistor A2 is ruptured.

In case that the OTP memory cell c11, c12 or c21 is the selected memory cell, the bias voltages for performing the programming process are similar to those for the memory cell c22. The detailed description thereof is not redundantly described herein.

After the memory cell c22 is completely programmed, one read action is performed to confirm the storing states of the two storing circuits of the memory cell c22. Please refer to FIG. 7C. During the read cycle of the selected memory cell c22, a ground voltage (0V) is provided to the second bit line BL2 and the second inverted bit line $\overline{BL2}$, the select voltage Vdd is provided to a second word line WL2, a read voltage Vr is provided to the first antifuse control line AF1 and the second antifuse control line AF2, and the ground voltage (0V) is provided to a second isolation control line IG2. In an embodiment, the read voltage Vr is in the range between 0.75V and 3.6V.

For the unselected memory cells c11, c12 and c21, the first bit line BL1 and the first inverted bit line $\overline{BL1}$ are in a floating state, the ground voltage (0V) is provided to the first word line WL1, and the ground voltage (0V) is provided to the first antifuse control line AF1, the second antifuse control line AF2 and the first isolation control line IG1.

In the selected memory cell c22, since the gate oxide layer of the first antifuse transistor A1 is not ruptured, a first read current Ir1 flowing through the second bit line BL2 has a small value (i.e., nearly zero) and a second read current Ir2 flowing through the second inverted bit line $\overline{BL2}$ has a higher value. According to the first read current Ir1 and the second read current Ir2, the first antifuse transistor A1 (i.e., the first storing circuit) is verified to have a second storing state corresponding to the high resistance value, and the second antifuse transistor A2 (i.e., the second storing circuit) is verified to have a first storing state corresponding to the low resistance value.

From the above descriptions, one read action is performed to confirm the storing states of the two storing circuits and determine one bit of the random code.

Moreover, after the program actions and the read actions of the four memory cells c11~c22 are performed, a four-bit random code for the PUF technology is generated.

Figure 8A:
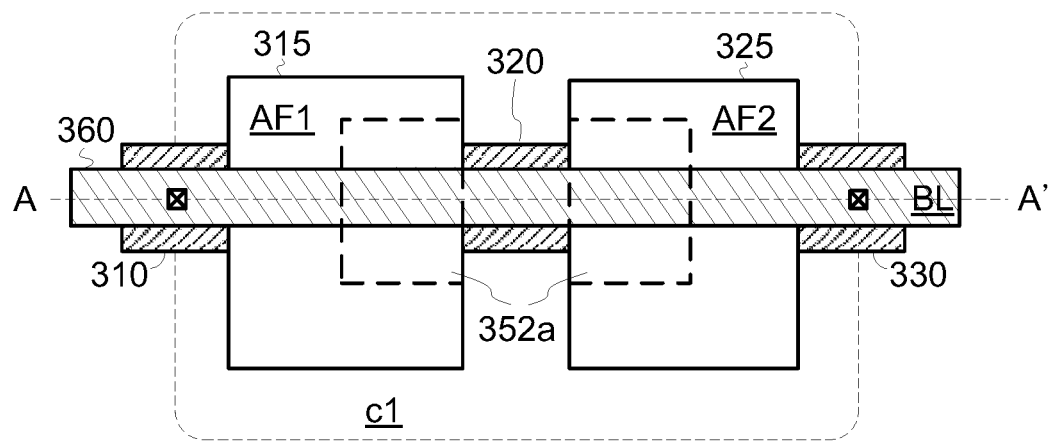
FIG. 8A is a schematic top view of a one time programming memory cell according to a third embodiment of the present invention.
Figure 8B:
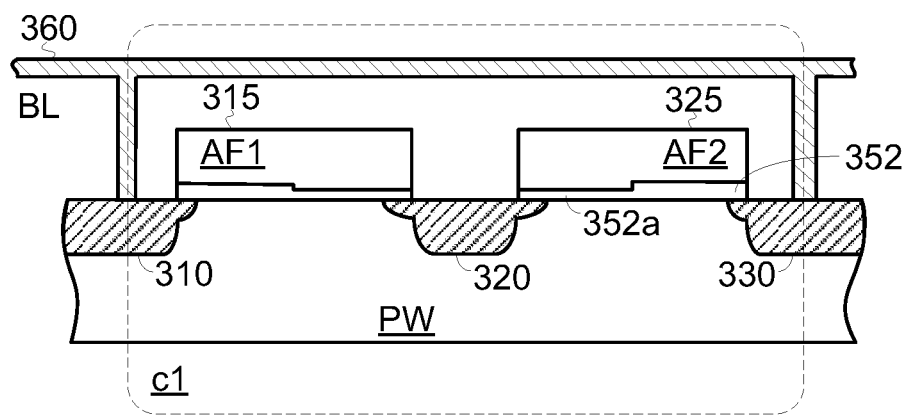
FIG. 8B is a schematic cross-sectional view of the antifuse-type one time programming memory cell of FIG. 8A and taken along a line AA'.
Figure 8C:
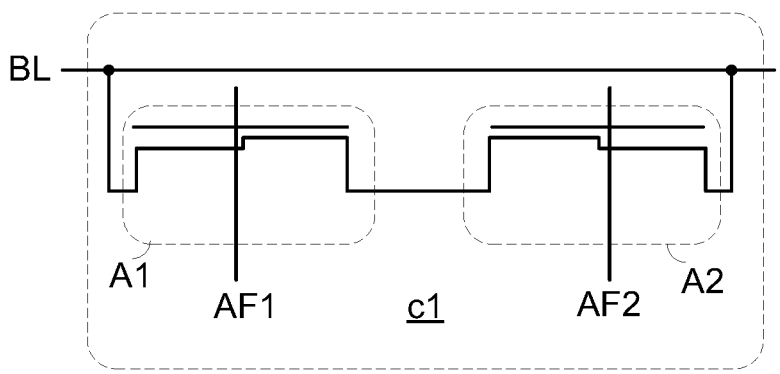
FIG. 8C is a schematic equivalent circuit diagram of the one time programming memory cell according to the third embodiment of the present invention.

FIG. 8A is a schematic top view of a one time programming memory cell according to a third embodiment of the present invention. FIG. 8B is a schematic cross-sectional view of the antifuse-type one time programming memory cell of FIG. 8A and taken along a line AA'. FIG. 8C is a schematic equivalent circuit diagram of the one time programming memory cell according to the third embodiment of the present invention.

As shown in FIGS. 8A and 8B, the OTP memory cell c1 is constructed in a P-well region PW. A gate oxide layer 352 covers the top surface of the P-well region PW. After a first etching process to thin out the gate oxide layer 352 and a second etching process to form openings, a first doped region 310, a second doped region 320 and a third doped region 330 are formed under a top surface of the P-well region PW. In this embodiment, the gate oxide layer 352 has a thinner part 352a. Moreover, the first doped region 310, the second doped region 320 and the third doped region 330 are N-type doped regions.

A first gate 315 is formed on the gate oxide layer 352 and spanned over the first doped region 310 and the second doped region 320. Moreover, the first gate 315 is connected with a first antifuse control line AF1 of the memory cell c1. A second gate 325 is formed on the gate oxide layer 352 and spanned over the second doped region 320 and the third doped region 330. Moreover, the second gate 325 is connected with a second antifuse control line AF2 of the memory cell c1. In this embodiment, the two gates 315 and 325 are polysilicon gates or metal gates.

A metal layer 360 is disposed over the two gates 315 and 325. Moreover, the metal layer 360 is connected with the first doped region 310 and the third doped region 330 through two vias. The metal layer 360 is used as a bit line BL of the memory cell c1.

Please refer to FIG. 8C. The first doped region 310, the second doped region 320 and the first gate 315 are collaboratively formed as a first antifuse transistor A1. The second doped region 320, the third doped region 330 and the second gate 325 are collaboratively formed as a second antifuse transistor A2. The gate oxide layer 352 comprises a first part and a second part. The second part is the thinner part 352a. That is, the second part is thinner than the first part. In this embodiment, the first gate 315 covers the first part and the second part of the gate oxide layer 352. Similarly, the second gate 325 covers the first part and the second part of the gate oxide layer 352.

The first drain/source terminal of the first antifuse transistor A1 is connected with the bit line BL. The gate terminal of the first antifuse transistor A1 is connected with a first antifuse control line AF1. The first drain/source terminal of the second antifuse transistor A2 is connected with the second drain/source terminal of the first antifuse transistor A1. The gate terminal of the second antifuse transistor A2 is connected with a second antifuse control line AF2. The second drain/source terminal of the second antifuse transistor A2 is connected with the bit line BL.

In accordance with the third embodiment, the OTP memory cell c1 comprises two storing circuits. That is, the first antifuse transistor A1 is a first storing circuit, and the second antifuse transistor A2 is a second storing circuit. During the program cycle of the OTP memory cell c1, the high voltage stress is applied to both of the first antifuse transistor A1 and the second antifuse transistor A2. Under this circumstance, the gate oxide layer of one of the first antifuse transistor A1 and the second antifuse transistor A2 is ruptured. Consequently, the storing state of the first antifuse transistor A1 or the second antifuse transistor A2 is changed. Generally, the second part (i.e., the thinner part 352a) of the gate oxide layer 352 is ruptured more easily than the first part (i.e., the thicker part) of the gate oxide layer 352.

During the read cycle, the storing states of the first antifuse transistor A1 and the second antifuse transistor A2 are sequentially read, and the storing state of the first antifuse transistor A1 is used as the random code of the PUF technology.

Figure 9A:
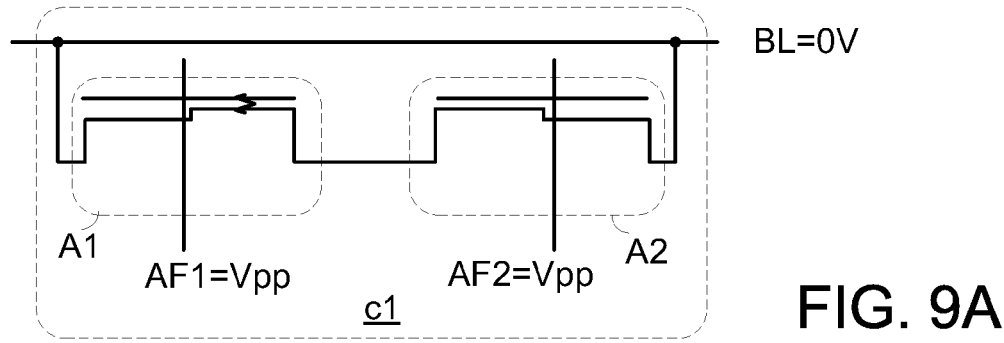
FIGS. 9A~9C schematically illustrate associated voltage signals for programming and reading the OTP memory cell for the PUF technology according to the third embodiment of the present invention.
Figure 9B:
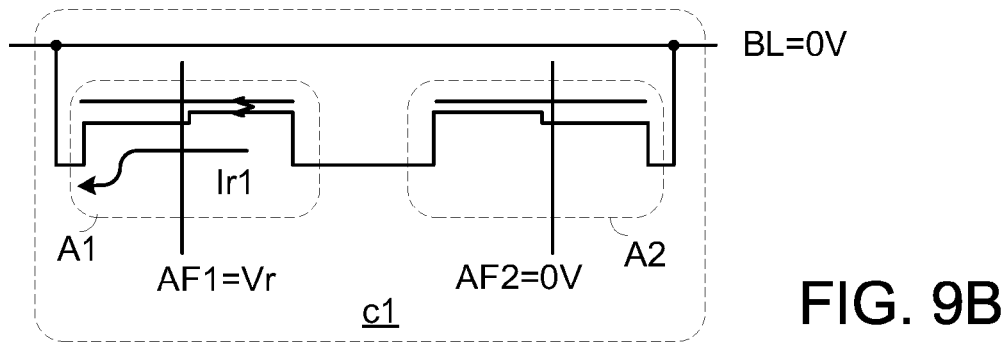
Figure 9C:
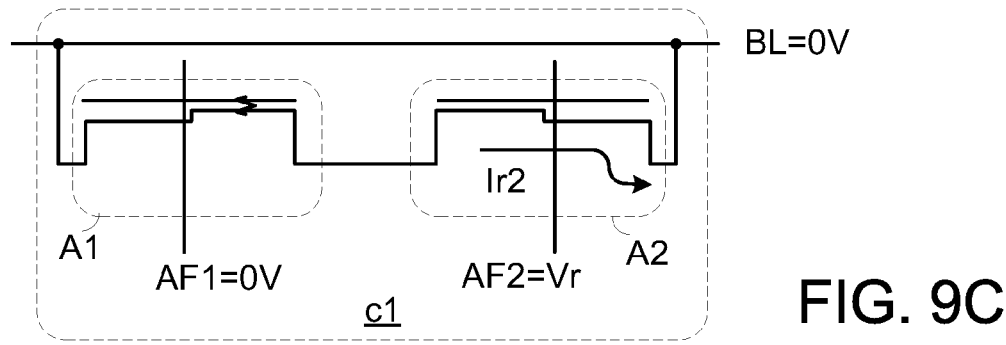

FIGS. 9A~9C schematically illustrate associated voltage signals for programming and reading the OTP memory cell for the PUF technology according to the third embodiment of the present invention.

Please refer to FIG. 9A. For programming the OTP memory cell, a ground voltage (0V) is provided to the bit line BL, and a program voltage Vpp is provided to the first antifuse control line AF1 and the second antifuse control line AF2. In an embodiment, the program voltage Vpp is in the range between 3.6V and 11V.

Since the program voltage Vpp is beyond the withstanding voltage range of the gate oxide layer, the gate oxide layer of one of the first antifuse transistor A1 and the second antifuse transistor A2 is ruptured. The ruptured gate oxide layer may be considered as a resistor with a low resistance value. When the second part (i.e., the thinner part) of the gate oxide layer 352 is ruptured, it means that the gate oxide layer 352 is ruptured.

Due to the manufacturing variation of the OTP memory cell c1, the gate oxide layer of which antifuse transistor is ruptured during the program cycle cannot be realized. Consequently, the OTP memory cell c1 can utilize the PUF technology. Take the OTP memory cell c1 of FIG. 9A as an example. During the program cycle, the gate oxide layer of the first antifuse transistor A1 is ruptured, but the gate oxide layer of the second antifuse transistor A2 is not ruptured.

After the OTP memory cell c1 is programmed, two read actions are performed to judge the storing states of the two storing circuits. Please refer to FIG. 9B. During the first read cycle, the ground voltage (0V) is provided to the bit line BL, a read voltage Vr is provided to the first antifuse control line AF1, and the ground voltage (0V) is provided to the second antifuse control line AF2. In an embodiment, the read voltage Vr is in the range between 0.75V and 3.6V.

Since the gate oxide layer of the first antifuse transistor A1 is ruptured, a first read current Ir1 flowing through the bit line BL has a larger value. According to the first read current Ir1, the first antifuse transistor A1 (i.e., the first storing circuit) is verified to have a first storing state corresponding to the low resistance value.

Please refer to FIG. 9C. During the second read cycle, the ground voltage (0V) is provided to the bit line BL, and the ground voltage (0V) is provided to the first antifuse control line AF1, and the read voltage Vr is provided to the second antifuse control line AF2.

Since the gate oxide layer of the second antifuse transistor A2 is not ruptured, a second read current Ir2 flowing through the bit line BL has a small value (i.e., nearly zero). According to the second read current Ir2, the second antifuse transistor A2 (i.e., the second storing circuit) is verified to have a second storing state corresponding to the high resistance value.

Then, according to the storing states of the first antifuse transistor A1 (i.e., the first storing circuit) and the second antifuse transistor A2 (i.e., the second storing circuit), one bit of the random code is determined and applied to the PUF technology.

From the above descriptions, two read actions are performed to confirm the storing states of the two storing circuits and determine one bit of the random code. However, since the storing states are complementary to each other, one bit of the random code can be determined by reading the storing state of only one storing circuit.

Figure 10A:
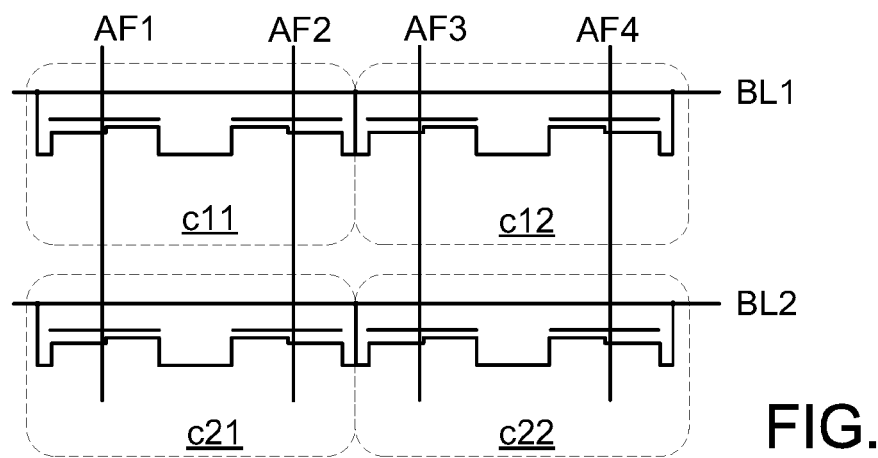
FIG. 10A is a schematic equivalent circuit diagram illustrating a memory array of OTP memory cells according to the third embodiment of the present invention.

FIG. 10A is a schematic equivalent circuit diagram illustrating a memory array of OTP memory cells according to the third embodiment of the present invention. As shown in FIG. 10A, the memory array comprises OTP memory cells c11~c22 in a 2×2 array. The structure of each of the OTP memory cells c11~c22 is similar to the structure of the OTP memory cell as shown in FIG. 9A. In this embodiment, each of the OTP memory cells c11~c22 comprises a first antifuse transistor A1 and a second antifuse transistor A2.

Figure 10B:
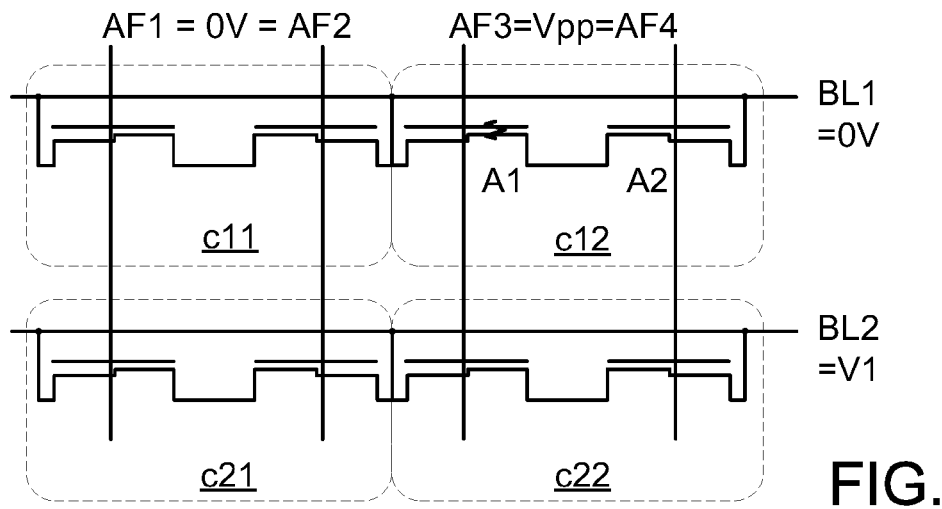
FIGS. 10B~10D schematically illustrate associated voltage signals for programming and reading the memory array for the PUF technology according to the third embodiment of the present invention.
Figure 10C:
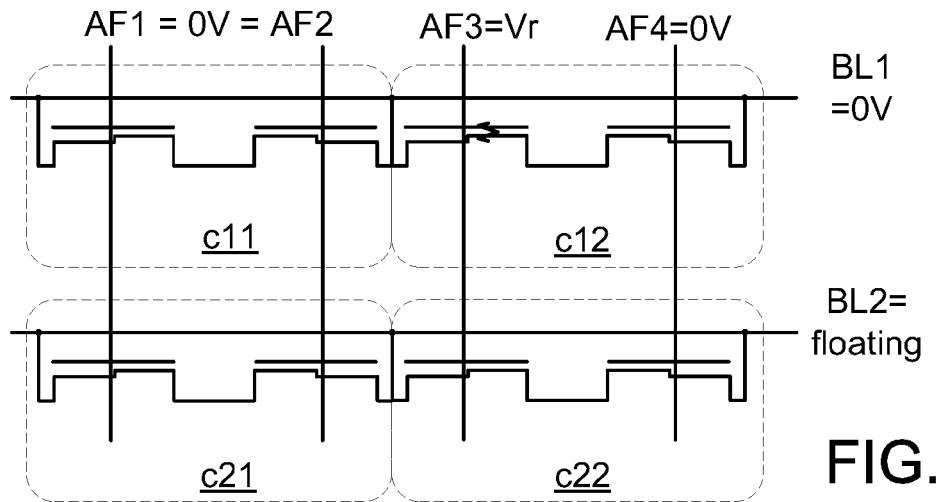
Figure 10D:
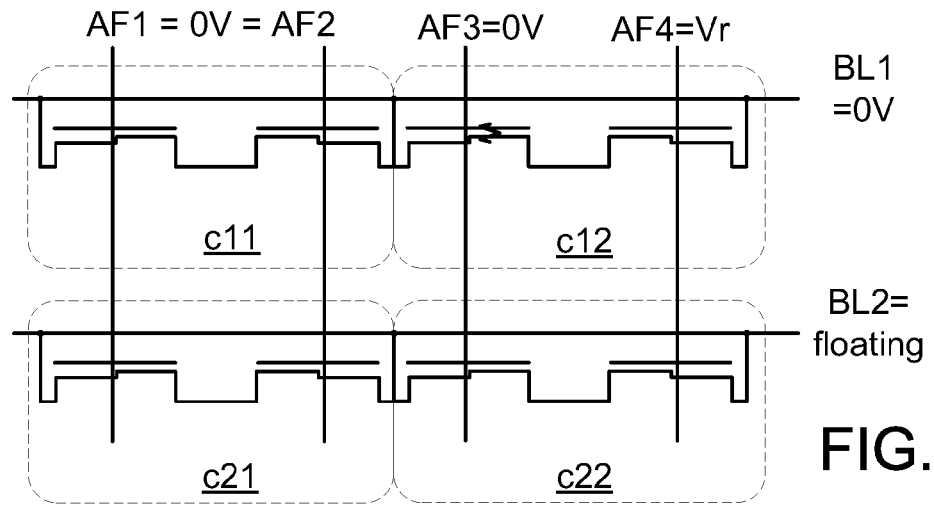

FIGS. 10B~10D schematically illustrate associated voltage signals for programming and reading the memory array for the PUF technology according to the third embodiment of the present invention. For example, the OTP memory cell c12 is a selected memory cell.

Please refer to FIG. 10B. For programming the selected OTP memory cell c12, a ground voltage (0V) is provided to a first bit line BL1, and a program voltage Vpp is provided to a third antifuse control line AF3 and a fourth antifuse control line AF4. In an embodiment, the program voltage Vpp is in the range between 3.6V and 11V.

The memory cells c11, c21 and c22 are unselected memory cells. For these unselected memory cells, a first voltage V1 is provided to a second bit line BL2, and the ground voltage (0V) is provided to a first antifuse control line AF1 and a second antifuse control line AF2. In an embodiment, the first voltage V1 is about the program voltage Vpp.

Please refer to FIG. 10B again. Since the memory cell c12 is the selected memory cell, the bias voltage Vpp is applied to the gate oxide layer of the first antifuse transistor A1 and the gate oxide layer of the second antifuse transistor A2. Consequently, the gate oxide layer of one of the first antifuse transistor A1 and the second antifuse transistor A2 is ruptured. The ruptured gate oxide layer may be considered as a resistor with a low resistance value. For example, in the memory cell c12 as shown in FIG. 10B, the gate oxide layer of the first antifuse transistor A1 is ruptured, but the gate oxide layer of the second antifuse transistor A2 is not ruptured. When the second part (i.e., the thinner part) of the gate oxide layer 352 is ruptured, it means that the gate oxide layer 352 is ruptured.

In case that the OTP memory cell c11, c21 or c22 is the selected memory cell, the bias voltages for performing the programming process are similar to those for the memory cell c12. The detailed description thereof is not redundantly described herein.

After the selected memory cell c12 is programmed, two read actions are performed to judge the storing states of the two storing circuits of the selected memory cell c12. Please refer to FIG. 10C. During the first read cycle of the selected memory cell c12, the ground voltage (0V) is provided to the first bit line BL1, a read voltage Vr is provided to the third antifuse control line AF3, and the ground voltage (0V) is provided to the fourth antifuse control line AF4. In an embodiment, the read voltage Vr is in the range between 0.75V and 3.6V.

For the unselected memory cells c11, c21 and c22, the second bit line BL2 is in a floating state, and the ground voltage (0V) is provided to the first antifuse control line AF1 and the second antifuse control line AF2.

In the selected memory cell c12, since the gate oxide layer of the first antifuse transistor A1 is ruptured, a first read current Ir1 flowing through the first bit line BL1 has a larger value. According to the first read current Ir1, the first antifuse transistor A1 (i.e., the first storing circuit) is verified to have a first storing state corresponding to the low resistance value.

Please refer to FIG. 10D. During the second read cycle of the selected memory cell c12, the ground voltage (0V) is provided to the first bit line BL1, the ground voltage (0V) is provided to the third antifuse control line AF3, and a read voltage Vr is provided to the fourth antifuse control line AF4.

For the unselected memory cells c11, c21 and c22, the second bit line BL2 is in the floating state, and the ground voltage (0V) is provided to the first antifuse control line AF1 and the second antifuse control line AF2.

In the selected memory cell c12, since the gate oxide layer of the second antifuse transistor A2 is not ruptured, a second read current Ir2 flowing through the first bit line BL1 has a small value (i.e., nearly zero). According to the second read current Ir2, the second antifuse transistor A2 (i.e., the second storing circuit) is verified to have a second storing state corresponding to the high resistance value.

Then, according to the storing states of the first antifuse transistor A1 (i.e., the first storing circuit) and the second antifuse transistor A2 (i.e., the second storing circuit), one bit of the random code is determined and applied to the PUF technology.

From the above descriptions, two read actions are performed to confirm the storing states of the two storing circuits and determine one bit of the random code. However, since the storing states are complementary to each other, one bit of the random code can be determined by reading the storing state of only one storing circuit.

Moreover, after the program actions and the read actions of the four memory cells c11~c22 are performed, a four-bit random code for the PUF technology is generated.

Figure 11A:
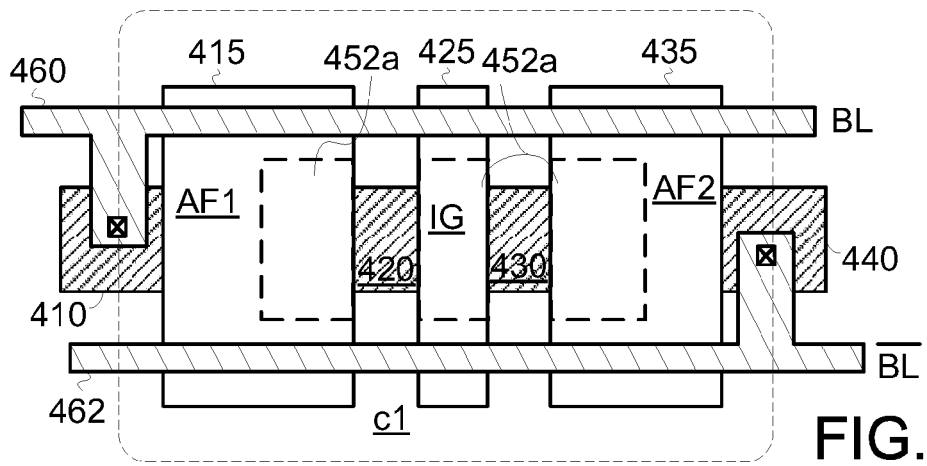
FIG. 11A is a schematic top view of a one time programming memory cell according to a fourth embodiment of the present invention.
Figure 11B:
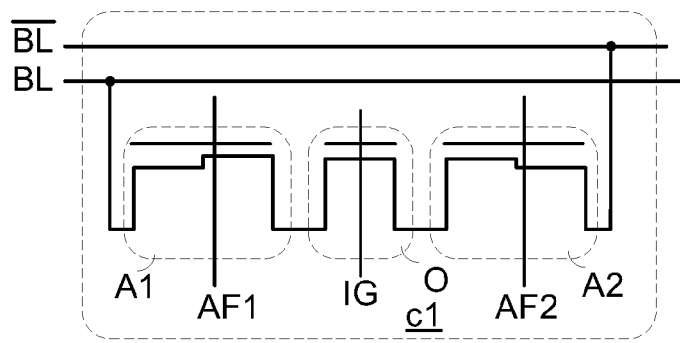
FIG. 11B is a schematic equivalent circuit diagram of the one time programming memory cell according to the fourth embodiment of the present invention.

FIG. 11A is a schematic top view of a one time programming memory cell according to a fourth embodiment of the present invention. FIG. 11B is a schematic equivalent circuit diagram of the one time programming memory cell according to the fourth embodiment of the present invention. In comparison with the third embodiment, the OTP memory cell of this embodiment is a differential memory cell.

As shown in FIG. 11A, the OTP memory cell c1 comprises a first doped region 410, a second doped region 420, a third doped region 430 and a fourth doped region 440. A first gate 415 is formed on a gate oxide layer (not shown) and spanned over the first doped region 410 and the second doped region 420. Moreover, the first gate 415 is connected with a first antifuse control line AF1 of the memory cell c1. A second gate 425 is formed on the gate oxide layer and spanned over the second doped region 420 and the third doped region 430. Moreover, the second gate 425 is connected with an isolation control line IG of the memory cell c1. A third gate 435 is formed on the gate oxide layer and spanned over the third doped region 430 and the fourth doped region 440. Moreover, the third gate 435 is connected with a second antifuse control line AF2 of the memory cell c1. In this embodiment, the five gates 415, 425 and 435 are polysilicon gates or metal gates.

A first metal layer 460 is connected with the first doped region 410 through a via. Moreover, first metal layer 460 is used as a bit line BL of the memory cell c1. A second metal layer 462 is connected with the fourth doped region 440 through another via. Moreover, the second metal layer 462 is used as an inverted bit line $\overline{BL}$.

Please refer to FIG. 11B. The first doped region 410, the second doped region 420 and the first gate 415 are collaboratively formed as a first antifuse transistor A1. The second doped region 420, the third doped region 430 and the second gate 425 are collaboratively formed as an isolation transistor O. The third doped region 430, the fourth doped region 440 and the third gate 435 are collaboratively formed as a second antifuse transistor A2. The gate oxide layer comprises a first part and a second part. The second part is the thinner part 452a. That is, the second part is thinner than the first part. In this embodiment, the first gate 415 covers the first part and the second part of the gate oxide layer. Similarly, the third gate 435 covers the first part and the second part of the gate oxide layer.

The first antifuse transistor A1, the isolation transistor O and the second antifuse transistor A2 are serially connected between the bit line BL and the inverted bit line $\overline{BL}$. The gate terminal of the first antifuse transistor A1 is connected with a first antifuse control line AF1. The gate terminal of the isolation transistor O is connected with an isolation control line IG. The gate terminal of the second antifuse transistor A2 is connected with a second antifuse control line AF2.

In accordance with the fourth embodiment, the OTP memory cell c1 comprises two storing circuits. That is, the first antifuse transistor A1 is a first storing circuit, and the second antifuse transistor A2 is a second storing circuit. During the program cycle of the OTP memory cell c1, the high voltage stress is applied to both of the first antifuse transistor A1 and the second antifuse transistor A2. Under this circumstance, the gate oxide layer of one of the first antifuse transistor A1 and the second antifuse transistor A2 is ruptured. Consequently, the storing state of the first antifuse transistor A1 or the second antifuse transistor A2 is changed. Generally, the second part (i.e., the thinner part 452a) of the gate oxide layer is ruptured more easily than the first part (i.e., the thicker part) of the gate oxide layer.

During the read cycle, the storing states of the first antifuse transistor A1 and the second antifuse transistor A2 are directly read, and the storing states thereof are used as the random code of the PUF technology.

Figure 12A:
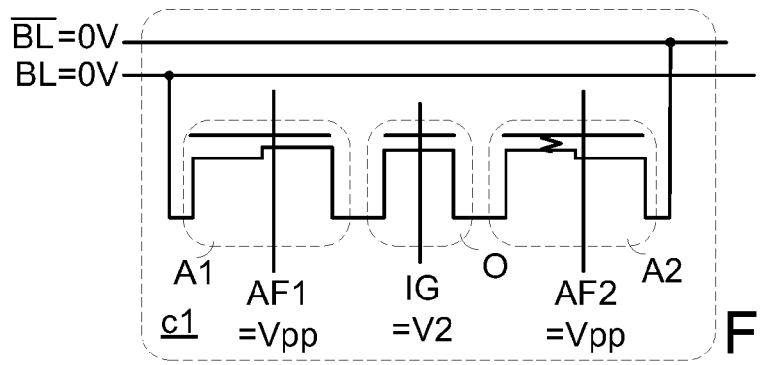
FIGS. 12A~12B schematically illustrate associated voltage signals for programming and reading the memory array for the PUF technology according to the fourth embodiment of the present invention.
Figure 12B:
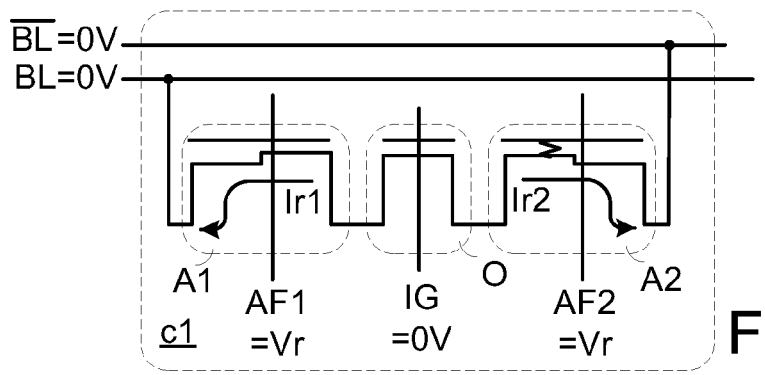

FIGS. 12A~12B schematically illustrate associated voltage signals for programming and reading the memory array for the PUF technology according to the fourth embodiment of the present invention.

Please refer to FIG. 12A. For programming the selected OTP memory cell c1, a ground voltage (0V) is provided to the bit line BL and the inverted bit line $\overline{BL}$, a program voltage Vpp is provided to the first antifuse control line AF1 and the second antifuse control line AF2, and a second voltage V2 is provided to the isolation line IG. In an embodiment, the program voltage Vpp is in the range between 3.6V and 11V. Moreover, the second voltage V2 is larger than or equal to the select voltage Vdd and smaller than three-fourths of the program voltage Vpp (i.e., Vdd≤V2<3Vpp/4).

Since the program voltage Vpp is beyond the withstanding voltage range of the gate oxide layer, the gate oxide layer of one of the first antifuse transistor A1 and the second antifuse transistor A2 is ruptured. The ruptured gate oxide layer may be considered as a resistor with a low resistance value. When the second part (i.e., the thinner part) of the gate oxide layer is ruptured, it means that the gate oxide layer is ruptured.

Due to the manufacturing variation of the OTP memory cell c1, the gate oxide layer of which antifuse transistor is ruptured during the program cycle cannot be realized. Consequently, the OTP memory cell c1 can utilize the PUF technology. Take the OTP memory cell c1 of FIG. 12A as an example. During the program cycle, the gate oxide layer of the first antifuse transistor A1 is not ruptured, but the gate oxide layer of the second antifuse transistor A2 is ruptured.

After the memory cell c1 is completely programmed, one read action is performed to confirm the storing states of the two storing circuits of the memory cell c1. After the OTP memory cell c1 is programmed, one read action is performed to judge the storing states of the two storing circuits. Please refer to FIG. 12B. During the read cycle, the ground voltage (0V) is provided to the bit line BL and the inverted bit line $\overline{BL}$, a read voltage Vr is provided to the first antifuse control line AF1 and the second antifuse control line AF2, and the ground voltage (0V) is provided to the isolation control line IG. In an embodiment, the read voltage Vr is in the range between 0.75V and 3.6V.

Since the gate oxide layer of the first antifuse transistor A1 is not ruptured but the gate oxide layer of the second antifuse transistor is ruptured, a first read current Ir1 flowing through the bit line BL has a small value (i.e., nearly zero) and a second read current Ir2 flowing through the inverted bit line $\overline{BL}$ has a larger value. According to the first read current Ir1 and the second read current Ir2, the first antifuse transistor A1 (i.e., the first storing circuit) is verified to have a second storing state corresponding to the high resistance value, and the second antifuse transistor A2 (i.e., the second storing circuit) is verified to have a first storing state corresponding to the low resistance value.

From the above descriptions, one read action is performed to confirm the storing states of the two storing circuits and determine one bit of the random code.

Alternatively, one bit of the random code can be determined by using a differential sensing operation. For example, if the first read current Ir1 is larger than the second read current Ir2, the OTP memory cell c1 is defined as a first storing state; and if the first read current Ir1 is smaller than the second read current Ir2, the OTP memory cell c1 is defined as a second storing state.

Figure 13A:
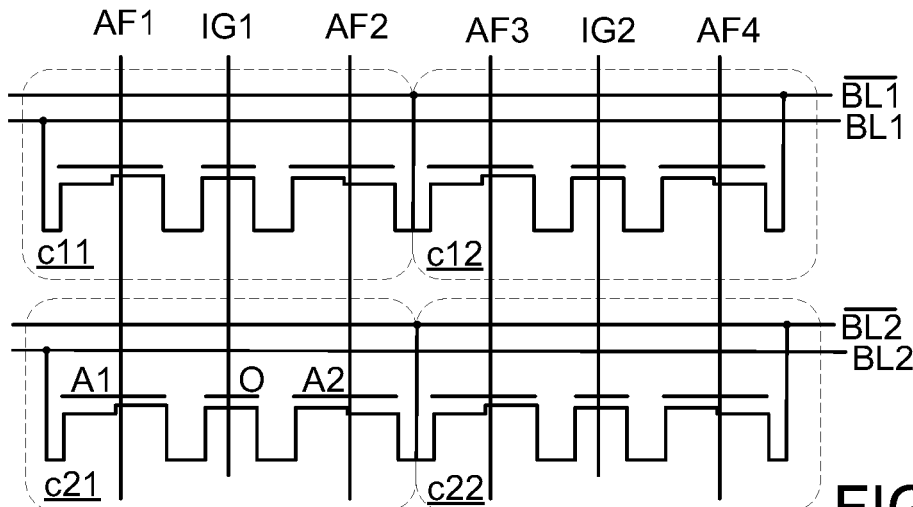
FIG. 13A is a schematic equivalent circuit diagram illustrating a memory array of OTP memory cells according to the fourth embodiment of the present invention.

FIG. 13A is a schematic equivalent circuit diagram illustrating a memory array of OTP memory cells according to the fourth embodiment of the present invention. As shown in FIG. 13A, the memory array comprises OTP memory cells c11~c22 in a 2×2 array. The structure of each of the OTP memory cells c11~c22 is similar to the structure of the OTP memory cell as shown in FIG. 11A. In this embodiment, each of the OTP memory cells c11~c22 comprises a first antifuse transistor A1, a second antifuse transistor A2 and an isolation transistor O.

Figure 13B:
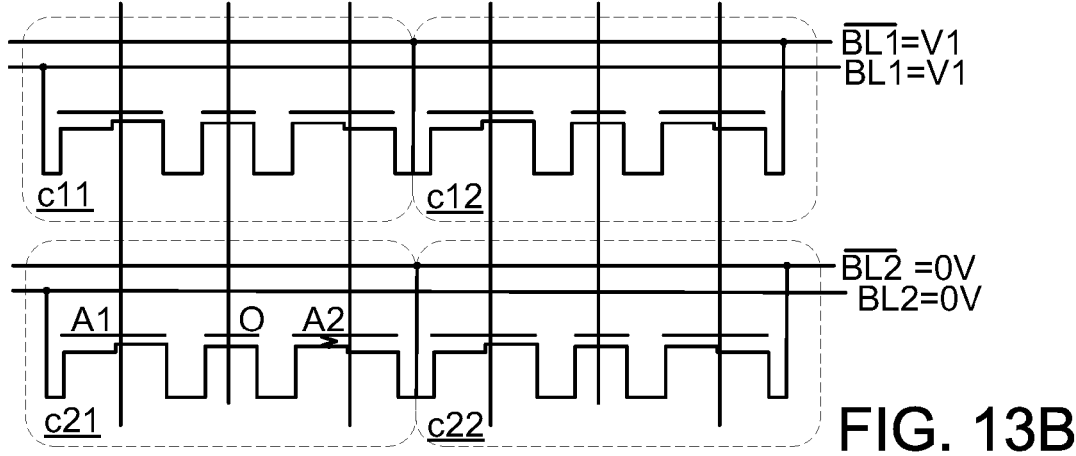
FIGS. 13B~13C schematically illustrate associated voltage signals for programming and reading the memory array for the PUF technology according to the fourth embodiment of the present invention.
Figure 13C:
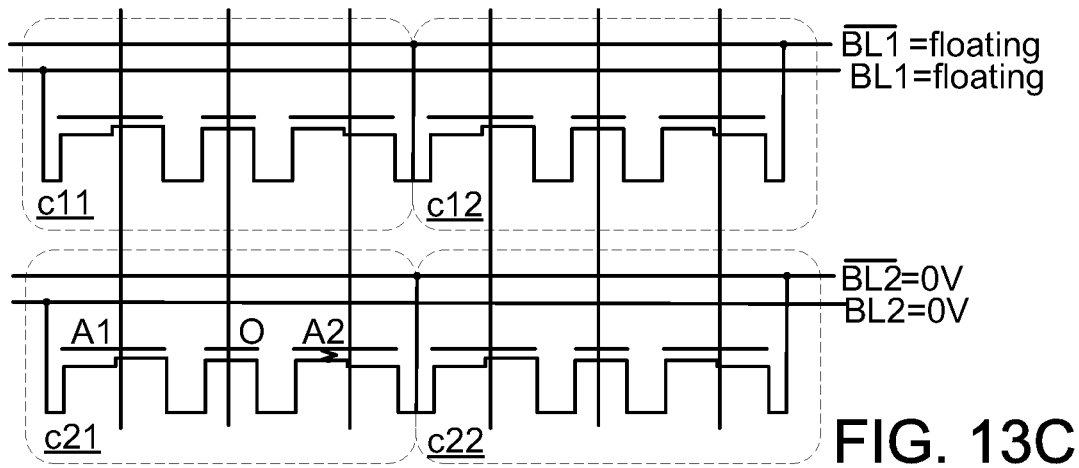

FIGS. 13B~13C schematically illustrate associated voltage signals for programming and reading the memory array for the PUF technology according to the fourth embodiment of the present invention. For example, the OTP memory cell c21 is a selected memory cell.

Please refer to FIG. 13B. For programming the selected OTP memory cell c21, a ground voltage (0V) is provided to a second bit line BL2 and a second inverted bit line $\overline{BL2}$, a program voltage Vpp is provided to a first antifuse control line AF1 and a second antifuse control line AF2, and a second voltage V2 is provided to a first isolation control line IG1. In an embodiment, the program voltage Vpp is in the range between 3.6V and 11V. Moreover, the second voltage V2 is larger than or equal to the select voltage Vdd and smaller than three-fourths of the program voltage Vpp (i.e., Vdd≤V2<3Vpp/4).

The memory cells c11, c12 and c22 are unselected memory cells. For these unselected memory cells, a first voltage V1 is provided to a first bit line BL1 and a first inverted bit line $\overline{BL1}$, and the ground voltage (0V) is provided to a third antifuse control line AF3, a fourth antifuse control line AF4 and a second isolation control line IG2. In an embodiment, the first voltage V1 is about the program voltage Vpp.

Please refer to FIG. 13B again. Since the memory cell c21 is the selected memory cell, the bias voltage Vpp is applied to the gate oxide layer of the first antifuse transistor A1 and the gate oxide layer of the second antifuse transistor A2. Consequently, the gate oxide layer of one of the first antifuse transistor A1 and the second antifuse transistor A2 is ruptured. The ruptured gate oxide layer may be considered as a resistor with a low resistance value. For example, in the memory cell c21 as shown in FIG. 13B, the gate oxide layer of the first antifuse transistor A1 is not ruptured, but the gate oxide layer of the second antifuse transistor A2 is ruptured. When the second part (i.e., the thinner part) of the gate oxide layer is ruptured, it means that the gate oxide layer is ruptured.

In case that the OTP memory cell c11, c12 or c22 is the selected memory cell, the bias voltages for performing the programming process are similar to those for the memory cell c21. The detailed description thereof is not redundantly described herein.

After the memory cell c21 is completely programmed, one read action is performed to confirm the storing states of the two storing circuits of the memory cell c21. Please refer to FIG. 13C. During the read cycle of the selected memory cell c21, a ground voltage (0V) is provided to the second bit line BL2 and the second inverted bit line $\overline{BL2}$, a read voltage Vr is provided to the first antifuse control line AF1 and the second antifuse control line AF2, and the ground voltage (0V) is provided to a first isolation control line IG1. In an embodiment, the read voltage Vr is in the range between 0.75V and 3.6V.

For the unselected memory cells c11, c12 and c22, the first bit line BL1 and the first inverted bit line $\overline{BL1}$ are in a floating state, and the ground voltage (0V) is provided to the third antifuse control line AF3, the fourth antifuse control line AF4 and the second isolation control line IG2.

In the selected memory cell c21, since the gate oxide layer of the first antifuse transistor A1 is not ruptured but the gate oxide layer of the second antifuse transistor is ruptured, a first read current Ir1 flowing through the second bit line BL2 has a small value (i.e., nearly zero) and a second read current Ir2 flowing through the second inverted bit line $\overline{BL2}$ has a larger value. According to the first read current Ir1 and the second read current Ir2, the first antifuse transistor A1 (i.e., the first storing circuit) is verified to have a second storing state corresponding to the high resistance value, and the second antifuse transistor A2 (i.e., the second storing circuit) is verified to have a first storing state corresponding to the low resistance value.

Then, according to the storing states of the first antifuse transistor A1 (i.e., the first storing circuit) and the second antifuse transistor A2 (i.e., the second storing circuit), one bit of the random code is determined and applied to the PUF technology.

Moreover, after the program actions and the read actions of the four memory cells c11~c22 are performed, a four-bit random code for the PUF technology is generated.

Figure 14C:
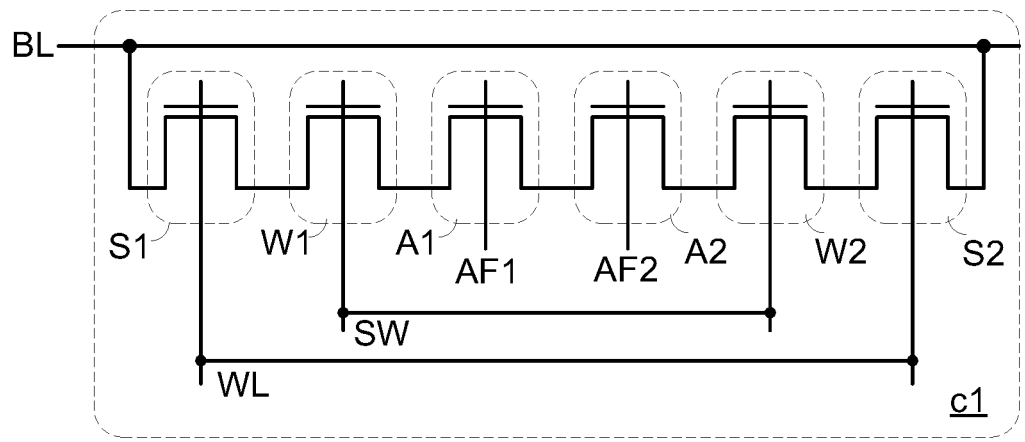
FIG. 14C is a schematic equivalent circuit diagram of the one time programming memory cell according to the fifth embodiment of the present invention.

FIG. 14A is a schematic top view of a one time programming memory cell according to a fifth embodiment of the present invention. FIG. 14B is a schematic cross-sectional view of the antifuse-type one time programming memory cell of FIG. 14A and taken along a line AA'. FIG. 14C is a schematic equivalent circuit diagram of the one time programming memory cell according to the fifth embodiment of the present invention.

As shown in FIGS. 14A and 14B, the OTP memory cell c1 is constructed in a P-well region PW. A gate oxide layer 580 covers the top surface of the P-well region PW. After an etching process to form openings, a first doped region 510, a second doped region 520, a third doped region 530, a fourth doped region 540, a fifth doped region 550, a sixth doped region 560 and a seventh doped region 570 are formed under a top surface of the P-well region PW. In this embodiment, the seven doped region 510, 520, 530, 540, 550, 560 and 570 are N-type doped regions.

A first gate 515 is formed on the gate oxide layer 580 and spanned over the first doped region 510 and the second doped region 520. Moreover, the first gate 515 is connected with a word line WL of the memory cell c1. A second gate 525 is formed on the gate oxide layer 580 and spanned over the second doped region 520 and the third doped region 530. Moreover, the second gate 525 is connected with a switch control line SW. A third gate 535 is formed on the gate oxide layer 580 and spanned over the third doped region 530 and the fourth doped region 540. Moreover, the third gate 535 is connected with a first antifuse control line AF1 of the memory cell c1. A fourth gate 545 is formed on the gate oxide layer 580 and spanned over the fourth doped region 540 and the fifth doped region 550. Moreover, the fourth gate 545 is connected with a second antifuse control line AF2 of the memory cell c1. A fifth gate 555 is formed on the gate oxide layer 580 and spanned over the fifth doped region 550 and the sixth doped region 560. Moreover, the fifth gate 555 is connected with the switch control line SW. A sixth gate 565 is formed on the gate oxide layer 580 and spanned over the sixth doped region 560 and the seventh doped region 570. Moreover, the sixth doped region 560 is connected with the word line WL of the memory cell c1.

A first metal layer 572 is disposed over the six gates 515, 525, 535, 545, 555 and 565. Moreover, the first metal layer 572 is connected with the first doped region 510 and the seventh doped region 570 through two vias. The first metal layer 572 is used as a bit line BL of the memory cell c1. Moreover, the first gate 515 and the sixth gate 565 are connected with each other through a second metal layer 574. Moreover, the second gate 525 and the fifth gate 555 are connected with each other through a third metal layer 576.

Please refer to FIG. 14C. The first doped region 510, the second doped region 520 and the first gate 515 are collaboratively formed as a first select transistor S1. The second doped region 520, the third doped region 530 and the second gate 525 are collaboratively formed as a first switch transistor W1. The third doped region 530, the fourth doped region 540 and the third gate 535 are collaboratively formed as a first antifuse transistor A1. The fourth doped region 540, the fifth doped region 550 and the fourth gate 545 are collaboratively formed as a second antifuse transistor A2. The fifth doped region 550, the sixth doped region 560 and the fifth gate 555 are collaboratively formed as a second switch transistor W2. The sixth doped region 560, the seventh doped region 570 and the sixth gate 565 are collaboratively formed as a second select transistor S2.

The gate terminal of the first select transistor S1 is connected with the word line WL. The gate terminal of the first switch transistor W1 is connected with the switch control line SW. The gate terminal of the first antifuse transistor A1 is connected with a first antifuse control line AF1. The gate terminal of the second antifuse transistor A2 is connected with a second antifuse control line AF2. The gate terminal of the second switch transistor W2 is connected with the switch control line SW. The gate terminal of the second select transistor S2 is connected with the word line WL.

In accordance with the fifth embodiment, the OTP memory cell c1 comprises two storing circuits. That is, the first antifuse transistor A1 is a first storing circuit, and the second antifuse transistor A2 is a second storing circuit. During the program cycle of the OTP memory cell c1, the high voltage stress is applied to both of the first antifuse transistor A1 and the second antifuse transistor A2. Under this circumstance, the gate oxide layer of one of the first antifuse transistor A1 and the second antifuse transistor A2 is ruptured. Consequently, the storing state of the first antifuse transistor A1 or the second antifuse transistor A2 is changed. During the read cycle, the storing states of the first antifuse transistor A1 and the second antifuse transistor A2 are sequentially read, and the storing state of the first antifuse transistor A1 is used as the random code of the PUF technology.

Figure 15A:
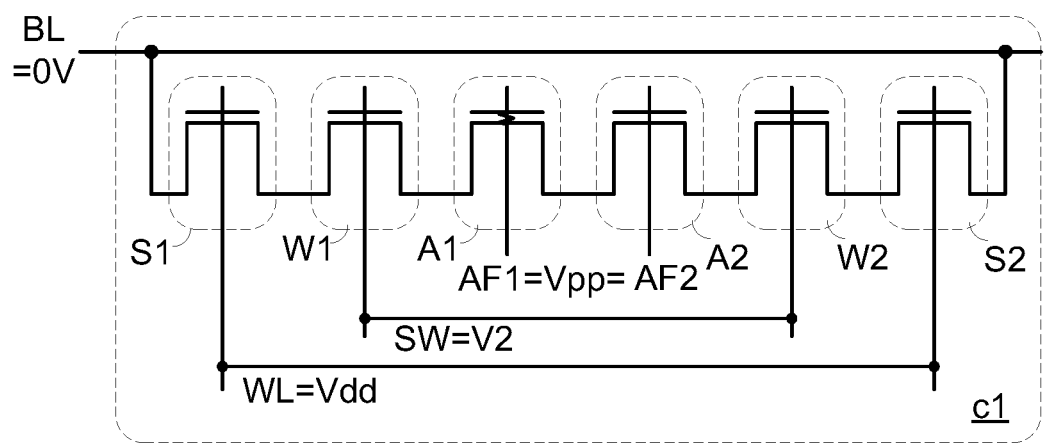
FIGS. 15A~15C schematically illustrate associated voltage signals for programming and reading the OTP memory cell for the PUF technology according to the fifth embodiment of the present invention.
Figure 15B:
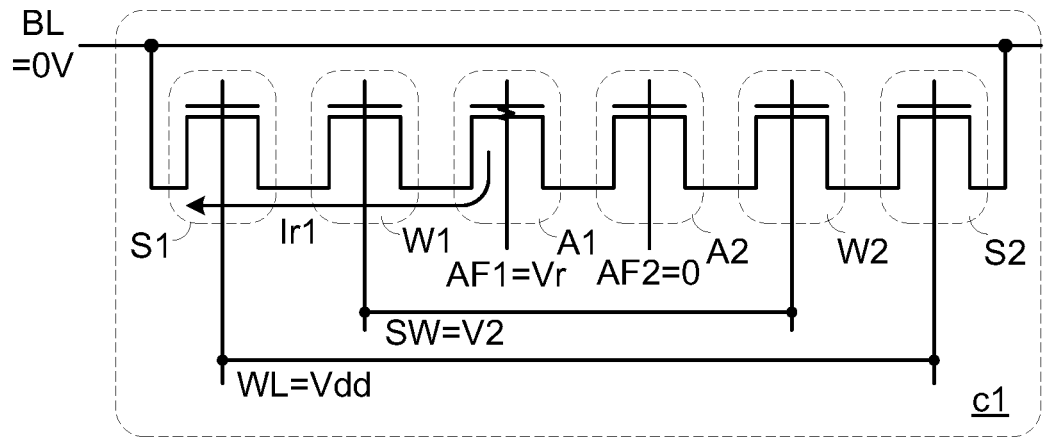
Figure 15C:
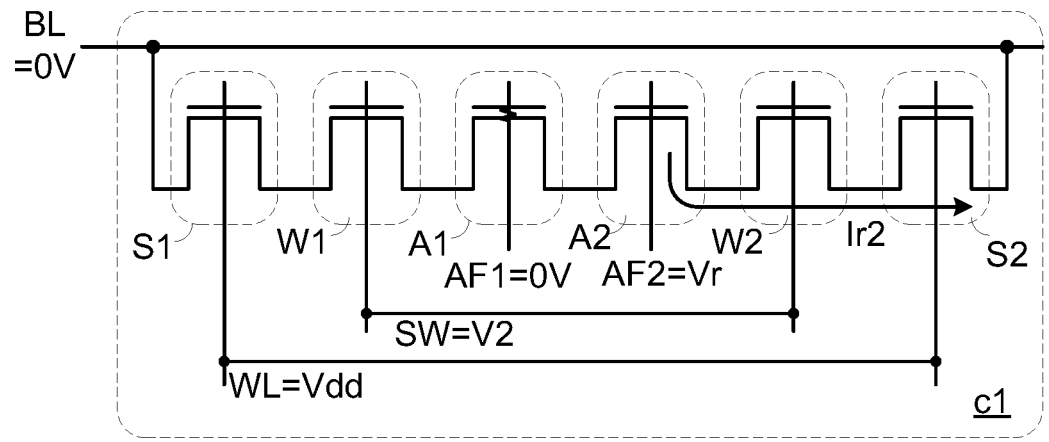

FIGS. 15A~15C schematically illustrate associated voltage signals for programming and reading the OTP memory cell for the PUF technology according to the fifth embodiment of the present invention.

Please refer to FIG. 15A. For programming the OTP memory cell, a ground voltage (0V) is provided to the bit line BL, a select voltage Vdd is provided to the word line WL, a second voltage V2 is provided to the switch control line SW, and a program voltage Vpp is provided to the first antifuse control line AF1 and the second antifuse control line AF2. In an embodiment, the select voltage Vdd is in the range between 0.75V and 3.6V, the program voltage Vpp is in the range between 3.6V and 11V, and the second voltage V2 is larger than or equal to the select voltage Vdd and smaller than three-fourths of the program voltage Vpp (i.e., Vdd≤V2<3Vpp/4).

When the select voltage Vdd is provided to the word line WL, the second voltage V2 is provided to the switch control line SW and the ground voltage is provided to the bit line BL, the first select transistor S1, the second select transistor S2, the first switch transistor W1 and the second switch transistor W2 are turned on. Consequently, a bias voltage Vpp is applied to the gate oxide layer of the first antifuse transistor A1 and the gate oxide layer of the second antifuse transistor A2. Since the program voltage Vpp is beyond the withstanding voltage range of the gate oxide layer, the gate oxide layer of one of the first antifuse transistor A1 and the second antifuse transistor A2 is ruptured. The ruptured gate oxide layer may be considered as a resistor with a low resistance value.

Due to the manufacturing variation of the OTP memory cell c1, the gate oxide layer of which antifuse transistor is ruptured during the program cycle cannot be realized. Consequently, the OTP memory cell c1 can utilize the PUF technology. Take the OTP memory cell c1 of FIG. 15A as an example. During the program cycle, the gate oxide layer of the first antifuse transistor A1 is ruptured, but the gate oxide layer of the second antifuse transistor A2 is not ruptured.

After the OTP memory cell c1 is programmed, two read actions are performed to judge the storing states of the two storing circuits. Please refer to FIG. 15B. During the first read cycle, the ground voltage (0V) is provided to the bit line BL, the select voltage Vdd is provided to the word line WL, the second voltage V2 is provided to the switch control line SW, a read voltage Vr is provided to the first antifuse control line AF1, and the ground voltage (0V) is provided to the second antifuse control line AF2. In an embodiment, the read voltage Vr is in the range between 0.75V and 3.6V.

Since the gate oxide layer of the first antifuse transistor A1 is ruptured, a first read current Ir1 flowing through the bit line BL has a larger value. According to the first read current Ir1, the first antifuse transistor A1 (i.e., the first storing circuit) is verified to have a first storing state corresponding to the low resistance value.

Please refer to FIG. 15C. During the second read cycle, the ground voltage (0V) is provided to the bit line BL, the select voltage Vdd is provided to the word line WL, the second voltage V2 is provided to the switch control line SW, the ground voltage (0V) is provided to the first antifuse control line AF1, and the read voltage Vr is provided to the second antifuse control line AF2.

Since the gate oxide layer of the second antifuse transistor A2 is not ruptured, a second read current Ir2 flowing through the bit line BL has a small value (i.e., nearly zero). According to the second read current Ir2, the second antifuse transistor A2 (i.e., the second storing circuit) is verified to have a second storing state corresponding to the high resistance value.

Then, according to the storing states of the first antifuse transistor A1 (i.e., the first storing circuit) and the second antifuse transistor A2 (i.e., the second storing circuit), one bit of the random code is determined and applied to the PUF technology.

From the above descriptions, two read actions are performed to confirm the storing states of the two storing circuits and determine one bit of the random code. However, since the storing states are complementary to each other, one bit of the random code can be determined by reading the storing state of only one storing circuit.

Figure 16A:
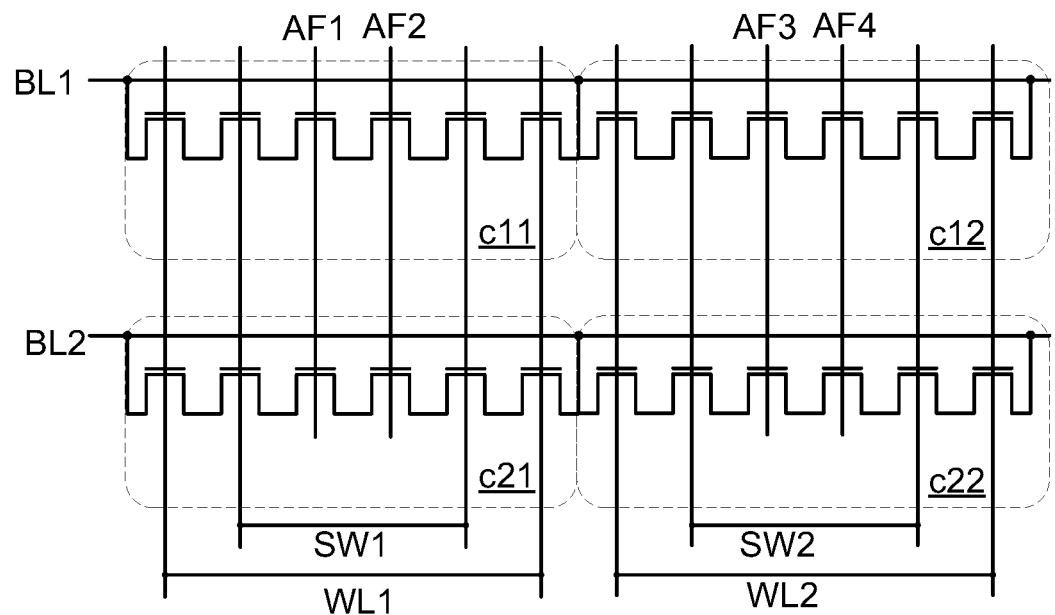
FIG. 16A is a schematic equivalent circuit diagram illustrating a memory array of OTP memory cells according to the fifth embodiment of the present invention.

FIG. 16A is a schematic equivalent circuit diagram illustrating a memory array of OTP memory cells according to the fifth embodiment of the present invention.

As shown in FIG. 16A, the memory array comprises OTP memory cells c11~c22 in a 2×2 array. The structure of each of the OTP memory cells c11~c22 is similar to the structure of the OTP memory cell as shown in FIG. 15A. In this embodiment, each of the OTP memory cells c11~c22 comprises a first select transistor S1, a second select transistor S2, a first antifuse transistor A1, a second antifuse transistor A2, a first switch transistor W1 and a second switch transistor W2.

Figure 16B:
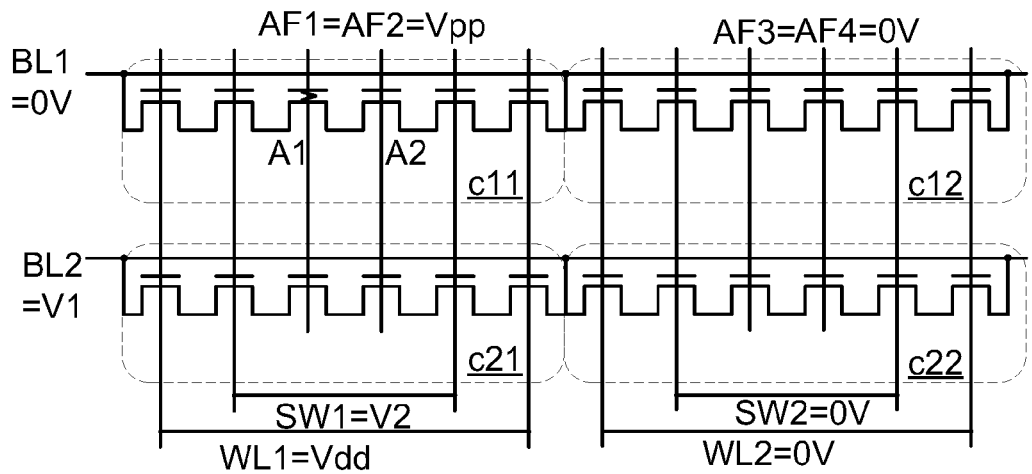
FIGS. 16B~16D schematically illustrate associated voltage signals for programming and reading the memory array for the PUF technology according to the fifth embodiment of the present invention.
Figure 16C:
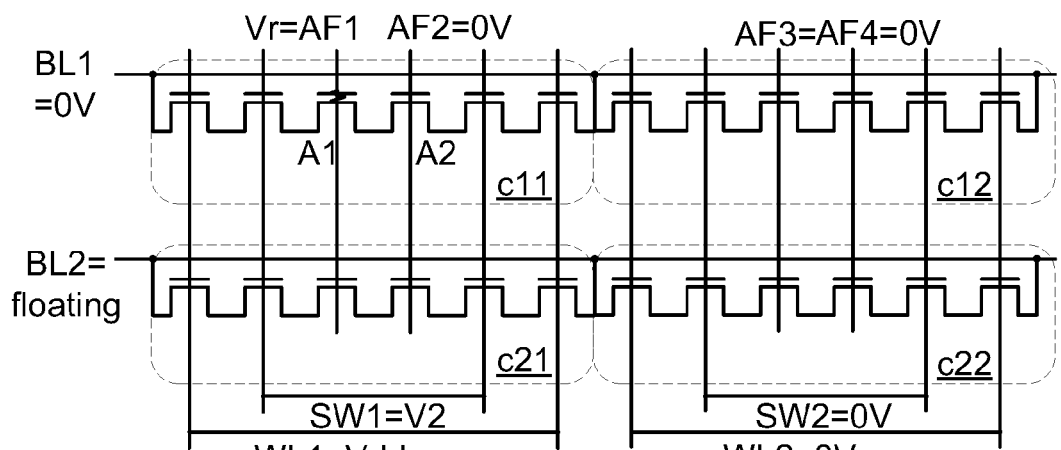
Figure 16D:
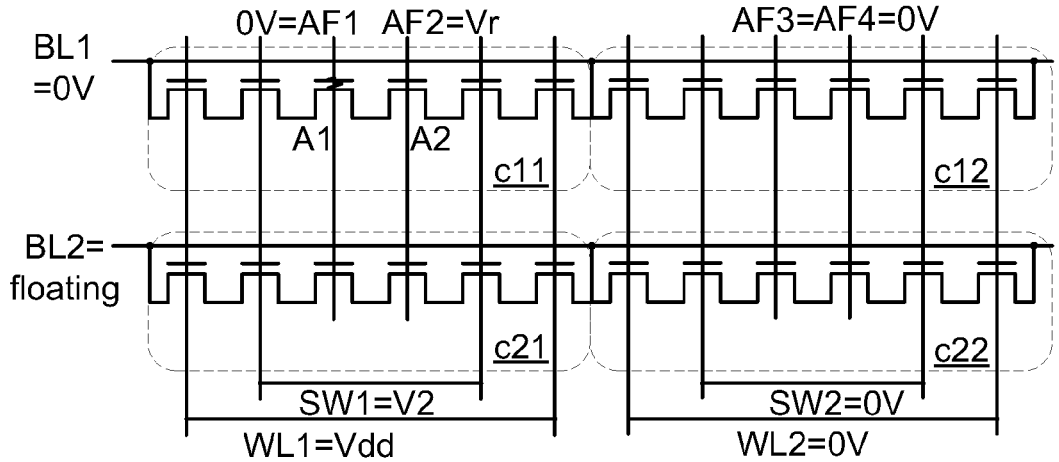

FIGS. 16B~16D schematically illustrate associated voltage signals for programming and reading the memory array for the PUF technology according to the fifth embodiment of the present invention. For example, the OTP memory cell c11 is a selected memory cell.

Please refer to FIG. 16B. For programming the selected OTP memory cell c11, a ground voltage (0V) is provided to the first bit line BL1, a select voltage Vdd is provided to the first word line WL1, a second voltage V2 is provided to a first switch control line SW1, and a program voltage Vpp is provided to the first antifuse control line AF1 and the second antifuse control line AF2. In an embodiment, the select voltage Vdd is in the range between 0.75V and 3.6V, the program voltage Vpp is in the range between 3.6V and 11V, and the second voltage V2 is larger than or equal to the select voltage Vdd and smaller than three-fourths of the program voltage Vpp (i.e., Vdd≤V2<3Vpp/4).

The memory cells c12, c21 and c22 are unselected memory cells. For these unselected memory cells, a first voltage V1 is provided to the second bit line BL2, the ground voltage (0V) is provided to the second word line WL2 and a second switch control line SW2, and the ground voltage (0V) is provided to the third antifuse control line AF3 and the fourth antifuse control line AF4. In an embodiment, the first voltage V1 is equal to or larger than the select voltage Vdd, and the first voltage V1 is smaller than a half of the program voltage Vpp (i.e., Vdd≤V1<Vpp/2).

Please refer to FIG. 16B again. Since the memory cell c11 is the selected memory cell, the bias voltage Vpp is applied to the gate oxide layer of the first antifuse transistor A1 and the gate oxide layer of the second antifuse transistor A2. Consequently, the gate oxide layer of one of the first antifuse transistor A1 and the second antifuse transistor A2 is ruptured. The ruptured gate oxide layer may be considered as a resistor with a low resistance value. For example, in the memory cell c11 as shown in FIG. 16B, the gate oxide layer of the first antifuse transistor A1 is ruptured, but the gate oxide layer of the second antifuse transistor A2 is not ruptured.

In case that the OTP memory cell c12, c21 or c22 is the selected memory cell, the bias voltages for performing the programming process are similar to those for the memory cell c11. The detailed description thereof is not redundantly described herein.

After the selected memory cell c11 is programmed, two read actions are performed to judge the storing states of the two storing circuits of the selected memory cell c11. Please refer to FIG. 16C. During the first read cycle of the selected memory cell c11, the ground voltage (0V) is provided to the first bit line BL1, the select voltage Vdd is provided to the first word line WL1, a second voltage V2 is provided to the first switch control line SW1, a read voltage Vr is provided to the first antifuse control line AF1, and the ground voltage (0V) is provided to the second antifuse control line AF2. In an embodiment, the read voltage Vr is in the range between 0.75V and 3.6V.

For the unselected memory cells c12, c21 and c22, the second bit line BL2 is in a floating state, the ground voltage (0V) is provided to the second word line WL2 and the second switch control line SW2, and the ground voltage (0V) is provided to the third antifuse control line AF3 and the fourth antifuse control line AF4.

In the selected memory cell c11, since the gate oxide layer of the first antifuse transistor A1 is ruptured, a first read current Ir1 flowing through the first bit line BL1 has a larger value. According to the first read current Ir1, the first antifuse transistor A1 (i.e., the first storing circuit) is verified to have a first storing state corresponding to the low resistance value.

Please refer to FIG. 16D. During the second read cycle of the selected memory cell c11, the ground voltage (0V) is provided to the first bit line BL1, the select voltage Vdd is provided to the first word line WL1, a second voltage V2 is provided to the first switch control line SW1, the ground voltage (0V) is provided to the first antifuse control line AF1, and the read voltage Vr is provided to the second antifuse control line AF2.

For the unselected memory cells c12, c21 and c22, the second bit line BL2 is in a floating state, the ground voltage (0V) is provided to the second word line WL2 and the second switch control line SW2, and the ground voltage (0V) is provided to the third antifuse control line AF3 and the fourth antifuse control line AF4.

In the selected memory cell c11, since the gate oxide layer of the second antifuse transistor A2 is not ruptured, a second read current Ir2 flowing through the first bit line BL1 has a small value (i.e., nearly zero). According to the second read current Ir2, the second antifuse transistor A2 (i.e., the second storing circuit) is verified to have a second storing state corresponding to the high resistance value.

Then, according to the storing states of the first antifuse transistor A1 (i.e., the first storing circuit) and the second antifuse transistor A2 (i.e., the second storing circuit), one bit of the random code is determined and applied to the PUF technology.

From the above descriptions, two read actions are performed to confirm the storing states of the two storing circuits and determine one bit of the random code. However, since the storing states are complementary to each other, one bit of the random code can be determined by reading the storing state of only one storing circuit.

Moreover, after the program actions and the read actions of the four memory cells c11~c22 are performed, a four-bit random code for the PUF technology is generated.

FIG. 17A is a schematic top view of a one time programming memory cell according to a sixth embodiment of the present invention. FIG. 17B is a schematic equivalent circuit diagram of the one time programming memory cell according to the sixth embodiment of the present invention. In comparison with the fifth embodiment, the OTP memory cell of this embodiment is a differential memory cell.

As shown in FIG. 17A, the OTP memory cell c1 comprises a first doped region 610, a second doped region 620, a third doped region 630, a fourth doped region 640, a fifth doped region 650, a sixth doped region 660, a sixth doped region 670 and an eighth doped region 680. A first gate 615 is formed on a gate oxide layer (not shown) and spanned over the first doped region 610 and the second doped region 620. Moreover, the first gate 615 is connected with a word line WL of the memory cell c1. A second gate 625 is formed on the gate oxide layer and spanned over the second doped region 620 and the third doped region 630. Moreover, the second gate 625 is connected with a switch control line SW of the memory cell c1. A third gate 635 is formed on the gate oxide layer and spanned over the third doped region 630 and the fourth doped region 640. Moreover, the third gate 635 is connected with a first antifuse control line AF1 of the memory cell c1. A fourth gate 645 is formed on the gate oxide layer and spanned over the fourth doped region 640 and the fourth doped region 650. Moreover, the fourth gate 645 is connected with an isolation control line IG of the memory cell c1. A fifth gate 655 is formed on the gate oxide layer and spanned over the fifth doped region 650 and the sixth doped region 660. Moreover, the fifth gate 655 is connected with a second antifuse control line AF2 of the memory cell c1. A sixth gate 665 is formed on the gate oxide layer and spanned over the sixth doped region 660 and the seventh doped region 670. Moreover, the sixth gate 665 is connected with the switch control line SW of the memory cell c1. A seventh gate 675 is formed on the gate oxide layer and spanned over the seventh doped region 670 and the eighth doped region 680. Moreover, the seventh gate 675 is connected with the word line WL of the memory cell c1.

A first metal layer 692 is connected with the first doped region 610 through a via. Moreover, first metal layer 692 is used as a bit line BL of the memory cell c1. A second metal layer 694 is connected with the eighth doped region 680 through another via. Moreover, the second metal layer 694 is used as an inverted bit line $\overline{BL}$. The first gate 615 and the fifth gate 675A are connected with each other through a third metal layer 696. The second gate 625 and the sixth gate 665 are connected with each other through a fourth metal layer 698.

Please refer to FIG. 17B. The first doped region 610, the second doped region 620 and the first gate 625 are collaboratively formed as a first select transistor S1. The second doped region 620, the third doped region 630 and the second gate 625 are collaboratively formed as a first switch transistor W1. The third doped region 630, the fourth doped region 640 and the third gate 635 are collaboratively formed as a first antifuse transistor A1. The fourth doped region 640, the fifth doped region 650 and the fourth gate 645 are collaboratively formed as an isolation transistor O. The fifth doped region 650, the sixth doped region 660 and the fifth gate 655 are collaboratively formed as a second antifuse transistor A2. The sixth doped region 660, the seventh doped region 670 and the sixth gate 665 are collaboratively formed as a second switch transistor W2. The seventh doped region 670, the eighth doped region 680 and the seventh gate 675 are collaboratively formed as a second select transistor S2.

The gate terminal of the first select transistor S1 is connected with the word line WL. The gate terminal of the first switch transistor W1 is connected with the switch control line SW. The gate terminal of the first antifuse transistor A1 is connected with a first antifuse control line AF1. The gate terminal of the isolation transistor O is connected with an isolation control line IG. The gate terminal of the second antifuse transistor A2 is connected with a second antifuse control line AF2. The gate terminal of the second switch transistor W2 is connected with the switch control line SW. The gate terminal of the second select transistor S2 is connected with the word line WL.

In accordance with the sixth embodiment, the OTP memory cell c1 comprises two storing circuits. That is, the first antifuse transistor A1 is a first storing circuit, and the second antifuse transistor A2 is a second storing circuit. During the program cycle of the OTP memory cell c1, the high voltage stress is applied to both of the first antifuse transistor A1 and the second antifuse transistor A2. Under this circumstance, the gate oxide layer of one of the first antifuse transistor A1 and the second antifuse transistor A2 is ruptured. Consequently, the storing state of the first antifuse transistor A1 or the second antifuse transistor A2 is changed. During the read cycle, the storing states of the first antifuse transistor A1 and the second antifuse transistor A2 are directly read, and the storing states thereof are used as the random code of the PUF technology.

FIGS. 18A~18B schematically illustrate associated voltage signals for programming and reading the memory array for the PUF technology according to the sixth embodiment of the present invention.

Please refer to FIG. 18A. For programming the selected OTP memory cell c1, a ground voltage (0V) is provided to the bit line BL and the inverted bit line $\overline{BL}$, a select voltage Vdd is provided to the word line WL, a program voltage Vpp is provided to the first antifuse control line AF1 and the second antifuse control line AF2, a second voltage V2 is provided to the switch control line SW, and a third voltage V3 is provided to the isolation line IG. In an embodiment, the select voltage Vdd is in the range between 0.75V and 3.6V, and the program voltage Vpp is in the range between 3.6V and 11V. Moreover, the second voltage V2 is larger than or equal to the select voltage Vdd and smaller than three-fourths of the program voltage Vpp (i.e., Vdd≤V2<3Vpp/4), and the third voltage V3 is larger than or equal to the select voltage Vdd and smaller than three-fourths of the program voltage Vpp (i.e., Vdd≤V3<3Vpp/4).

When the select voltage Vdd is provided to the word line WL, the second voltage V2 is provided to the switch control line SW, the third voltage V3 is provided to the isolation line IG and the ground voltage is provided to the bit line BL and the inverted bit line $\overline{BL}$, the first select transistor S1, the second select transistor S2, the first switch transistor W1, the second switch transistor W2 and the isolation transistor O are turned on. Consequently, a bias voltage Vpp is applied to the gate oxide layer of the first antifuse transistor A1 and the gate oxide layer of the second antifuse transistor A2. Since the program voltage Vpp is beyond the withstanding voltage range of the gate oxide layer, the gate oxide layer of one of the first antifuse transistor A1 and the second antifuse transistor A2 is ruptured. The ruptured gate oxide layer may be considered as a resistor with a low resistance value.

Due to the manufacturing variation of the OTP memory cell c1, the gate oxide layer of which antifuse transistor is ruptured during the program cycle cannot be realized. Consequently, the OTP memory cell c1 can utilize the PUF technology. Take the OTP memory cell c1 of FIG. 18A as an example. During the program cycle, the gate oxide layer of the first antifuse transistor A1 is not ruptured, but the gate oxide layer of the second antifuse transistor A2 is ruptured.

After the OTP memory cell c1 is programmed, one read action is performed to judge the storing states of the two storing circuits. Please refer to FIG. 18B. During the first read cycle, the ground voltage (0V) is provided to the bit line BL and the inverted bit line $\overline{BL}$, the select voltage Vdd is provided to the word line WL, the second voltage V2 is provided to the switch control line SW, a read voltage Vr is provided to the first antifuse control line AF1 and the second antifuse control line AF2, and the ground voltage (0V) is provided to the isolation control line IG. In an embodiment, the read voltage Vr is in the range between 0.75V and 3.6V.

Since the gate oxide layer of the first antifuse transistor A1 is not ruptured but the gate oxide layer of the second antifuse transistor A2 is ruptured, a first read current Ir1 flowing through the bit line BL has a small value (i.e., nearly zero) and a second read current Ir2 flowing through the inverted bit line $\overline{BL}$ has a larger value. According to the first read current Ir1 and the second read current Ir2, the first antifuse transistor A1 (i.e., the first storing circuit) is verified to have a second storing state corresponding to the high resistance value, and the second antifuse transistor A2 (i.e., the second storing circuit) is verified to have a first storing state corresponding to the low resistance value.

Then, according to the storing states of the first antifuse transistor A1 (i.e., the first storing circuit) and the second antifuse transistor A2 (i.e., the second storing circuit), one bit of the random code is determined and applied to the PUF technology.

Alternatively, one bit of the random code can be determined by using a differential sensing operation. For example, if the first read current Ir1 is larger than the second read current Ir2, the OTP memory cell c1 is defined as a first storing state; and if the first read current Ir1 is smaller than the second read current Ir2, the OTP memory cell c1 is defined as a second storing state.

FIG. 19A is a schematic equivalent circuit diagram illustrating a memory array of OTP memory cells according to the sixth embodiment of the present invention.

As shown in FIG. 19A, the memory array comprises OTP memory cells c11~c22 in a 2×2 array. The structure of each of the OTP memory cells c11~c22 is similar to the structure of the OTP memory cell as shown in FIG. 17A. In this embodiment, each of the OTP memory cells c11~c22 comprises a first select transistor S1, a second select transistor S2, a first antifuse transistor A1, a second antifuse transistor A2, a first switch transistor W1, a second switch transistor W2 and an isolation transistor O.

Figure 19C:
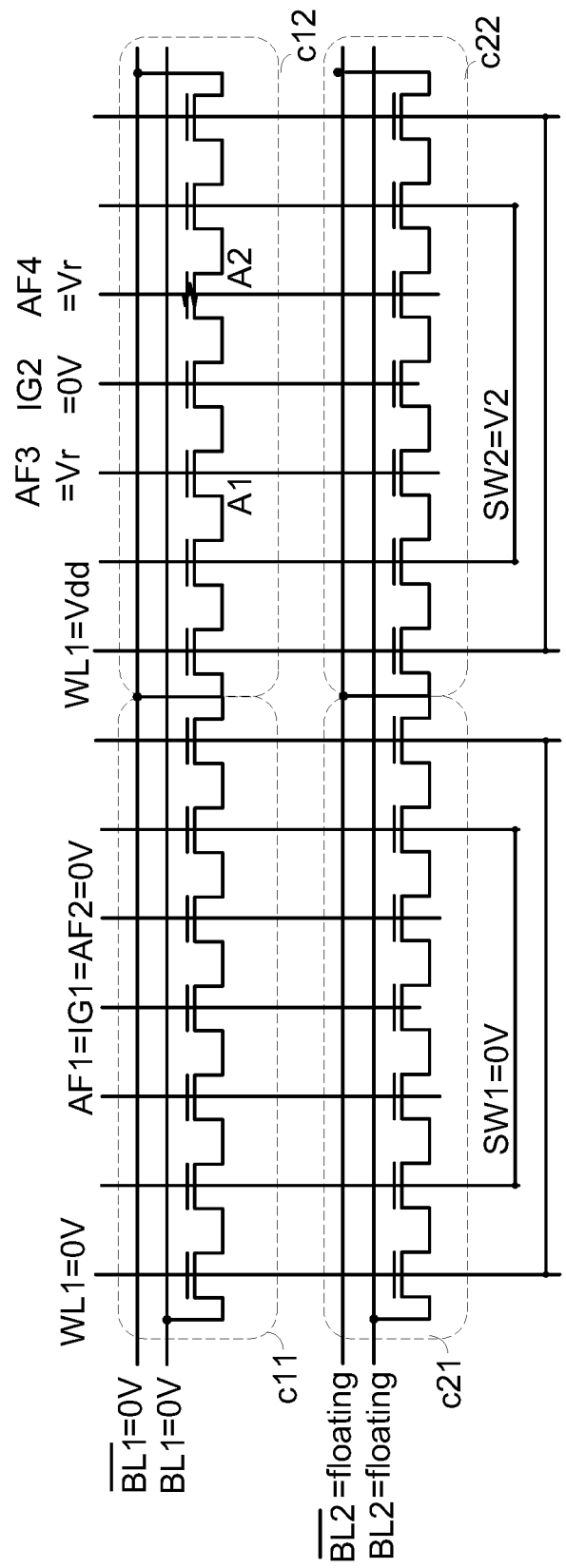

FIGS. 19B~19C schematically illustrate associated voltage signals for programming and reading the memory array for the PUF technology according to the sixth embodiment of the present invention. For example, the OTP memory cell c12 is a selected memory cell.

Please refer to FIG. 19B. For programming the selected OTP memory cell c12, a ground voltage (0V) is provided to a first bit line BL1 and a first inverted bit line $\overline{BL1}$, a select voltage Vdd is provided to a second word line WL2, a second voltage V2 is provided to a second switch control line SW2, a program voltage Vpp is provided to a third antifuse control line AF3 and a fourth antifuse control line AF4, and a third voltage V3 is provided to a second isolation control line IG2. In an embodiment, the select voltage Vdd is in the range between 0.75V~3.6V, and the program voltage Vpp is in the range between 3.6V and 11V. Moreover, the second voltage V2 is larger than or equal to the select voltage Vdd and smaller than three-fourths of the program voltage Vpp (i.e., Vdd≤V2<3Vpp/4) and the third voltage V3 is larger than or equal to the select voltage Vdd and smaller than three-fourths of the program voltage Vpp (i.e., Vdd≤V3<3Vpp/4).

The memory cells c11, c21 and c22 are unselected memory cells. For these unselected memory cells, a first voltage V1 is provided to a second bit line BL2 and a second inverted bit line $\overline{BL2}$, the ground voltage (0V) is provided to a first isolation control line IG1, a first word line WL1 and a first switch control line SW1, and the ground voltage (0V) is provided to a first antifuse control line AF1 and a second antifuse control line AF2. In an embodiment, the first voltage V1 is equal to or larger than the select voltage Vdd, and the first voltage V1 is smaller than a half of the program voltage Vpp (i.e., Vdd≤V1<Vpp/2).

Please refer to FIG. 19B again. Since the memory cell c12 is the selected memory cell, the bias voltage Vpp is applied to the gate oxide layer of the first antifuse transistor A1 and the gate oxide layer of the second antifuse transistor A2. Consequently, the gate oxide layer of one of the first antifuse transistor A1 and the second antifuse transistor A2 is ruptured. The ruptured gate oxide layer may be considered as a resistor with a low resistance value. For example, in the memory cell c12 as shown in FIG. 19B, the gate oxide layer of the first antifuse transistor A1 is not ruptured, but the gate oxide layer of the second antifuse transistor A2 is ruptured.

In case that the OTP memory cell c11, c21 or c22 is the selected memory cell, the bias voltages for performing the programming process are similar to those for the memory cell c12. The detailed description thereof is not redundantly described herein.

After the memory cell c12 is completely programmed, one read action is performed to confirm the storing states of the two storing circuits of the memory cell c12. Please refer to FIG. 19C. During the read cycle of the selected memory cell c12, the ground voltage (0V) is provided to the first bit line BL1 and the first inverted bit line $\overline{BL1}$, the select voltage Vdd is provided to the second word line WL2, the second voltage V2 is provided to the second switch control line SW2, the ground voltage (0V) is provided to the second isolation control line IG1, and a read voltage Vr is provided to the third antifuse control line AF3 and the fourth antifuse control line AF4. In an embodiment, the read voltage Vr is in the range between 0.75V and 3.6V.

For the unselected memory cells c11, c21 and c22, the second bit line BL2 and the second inverted bit line $\overline{BL2}$ are in a floating state, the ground voltage (0V) is provided to the second word line WL2 and the second switch control line SW2, and the ground voltage (0V) is provided to the first isolation control line IG1, the first antifuse control line AF1 and the second antifuse control line AF2.

In the selected memory cell c12, since the gate oxide layer of the first antifuse transistor A1 is not ruptured but the gate oxide layer of the second antifuse transistor is ruptured, a first read current Ir1 flowing through the second bit line BL2 has a small value (i.e., nearly zero) and a second read current Ir2 flowing through the second inverted bit line $\overline{BL2}$ has a larger value. According to the first read current Ir1 and the second read current Ir2, the first antifuse transistor A1 (i.e., the first storing circuit) is verified to have a second storing state corresponding to the high resistance value, and the second antifuse transistor A2 (i.e., the second storing circuit) is verified to have a first storing state corresponding to the low resistance value.

Then, according to the storing states of the first antifuse transistor A1 (i.e., the first storing circuit) and the second antifuse transistor A2 (i.e., the second storing circuit), one bit of the random code is determined and applied to the PUF technology.

Moreover, after the program actions and the read actions of the four memory cells c11~c22 are performed, a four-bit random code for the PUF technology is generated.

Figure 20A:
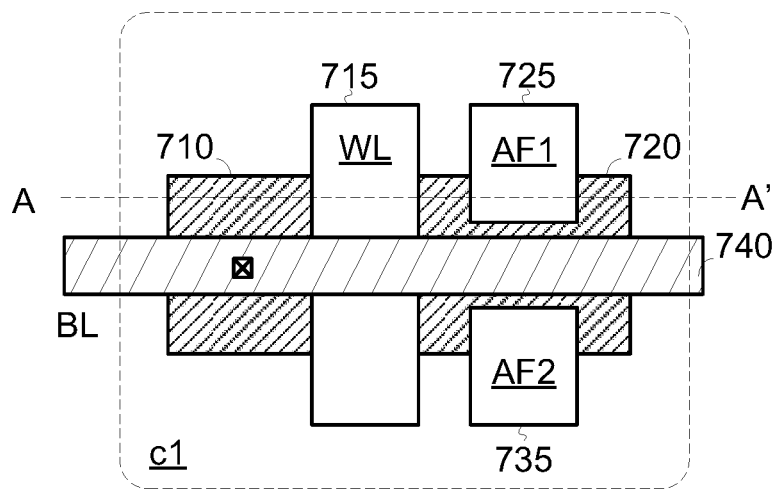
FIG. 20A is a schematic top view of a one time programming memory cell according to a seventh embodiment of the present invention.
Figure 20B:
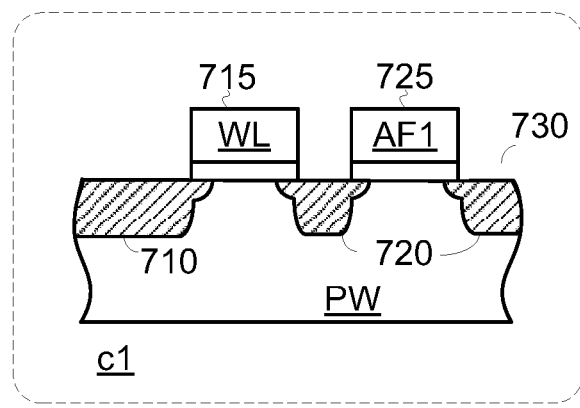
FIG. 20B is a schematic cross-sectional view of the antifuse-type one time programming memory cell of FIG. 20A and taken along a line AA'.
Figure 20C:
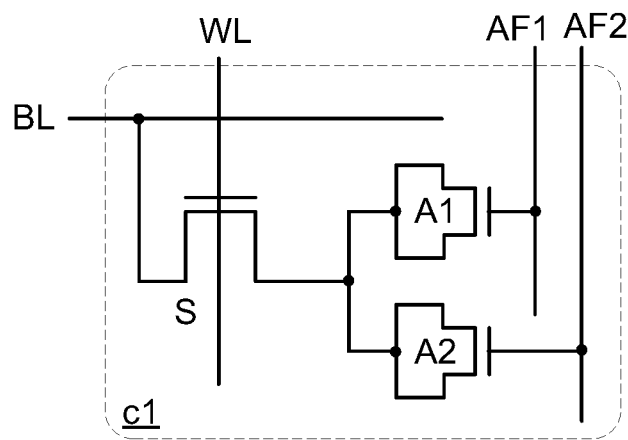
FIG. 20C is a schematic equivalent circuit diagram of the one time programming memory cell according to the seventh embodiment of the present invention.

FIG. 20A is a schematic top view of a one time programming memory cell according to a seventh embodiment of the present invention. FIG. 20B is a schematic cross-sectional view of the antifuse-type one time programming memory cell of FIG. 20A and taken along a line AA'. FIG. 20C is a schematic equivalent circuit diagram of the one time programming memory cell according to the seventh embodiment of the present invention.

As shown in FIGS. 20A and 20B, the OTP memory cell c1 is constructed in a P-well region PW. A gate oxide layer 730 covers the top surface of the P-well region PW. After an etching processes to form openings, a first doped region 710 and a second doped region 720 are formed under a top surface of the P-well region PW. In this embodiment, the first doped region 710 and the second doped region 720 are N-type doped regions. In this embodiment, the OTP memory cell c1 is constructed in the P-well region PW. It is noted that numerous modifications and alterations may be made while retaining the teachings of the invention. For example, in another embodiment, the OTP memory cell c1 is constructed in an N-well region PW, and the two doped regions are P-type doped regions.

A first gate 715 is formed on the gate oxide layer 730 and spanned over the first doped region 710 and the second doped region 720. Moreover, the first gate 715 is connected with a word line WL of the memory cell c1. A second gate 725 is formed on the gate oxide layer 730 and disposed over the second doped region 720. Moreover, the second gate 725 is connected with a first antifuse control line AF1 of the memory cell c1. A third gate 735 is formed on the gate oxide layer 730 and disposed over the second doped region 720. Moreover, the third gate 735 is connected with a second antifuse control line AF2 of the memory cell c1. In this embodiment, the three gates 715, 725 and 735 are polysilicon gates or metal gates.

Moreover, a first metal layer 740 is connected with the first doped region 710 through a via. The first metal layer 740 is used as a bit line BL of the memory cell c1.

Please refer to FIG. 20C. The first doped region 710, the second doped region 720 and the first gate 715 are collaboratively formed as a select transistor S. The second doped region 720 and the second gate 725 are collaboratively formed as a first antifuse transistor A1. The second doped region 720 and the third gate 735 are collaboratively formed as a second antifuse transistor A2. A drain terminal and a source terminal of the first antifuse transistor A1 are connected with each other. A drain terminal and a source terminal of the second antifuse transistor A2 are connected with each other. Because of the source terminal and the drain terminal are connected with each other, the first antifuse transistor A1 can be seen as a capacitor. The same, the second antifuse transistor A2 can be seen as another capacitor.

The first drain/source terminal of the select transistor S is connected with the bit line BL. The gate terminal of the select transistor S is connected with the word line WL. The first drain/source terminal and the second drain/source terminal of the first antifuse transistor A1 are connected with the second drain/source terminal of the select transistor S. The gate terminal of the first antifuse transistor A1 is connected with a first antifuse control line AF1. The first drain/source terminal and the second drain/source terminal of the second antifuse transistor A2 are connected with the second drain/source terminal of the select transistor S. The gate terminal of the second antifuse transistor A2 is connected with a second antifuse control line AF2.

In accordance with the seventh embodiment, the OTP memory cell c1 comprises two storing circuits. That is, the first antifuse transistor A1 is a first storing circuit, and the second antifuse transistor A2 is a second storing circuit. During the program cycle of the OTP memory cell c1, the high voltage stress is applied to both of the first antifuse transistor A1 and the second antifuse transistor A2. Under this circumstance, the gate oxide layer of one of the first antifuse transistor A1 and the second antifuse transistor A2 is ruptured. Consequently, the storing state of the first antifuse transistor A1 or the second antifuse transistor A2 is changed. During the read cycle, the storing states of the first antifuse transistor A1 and the second antifuse transistor A2 are sequentially read, and the storing state of the first antifuse transistor A1 is used as the random code of the PUF technology.

Figure 21A:
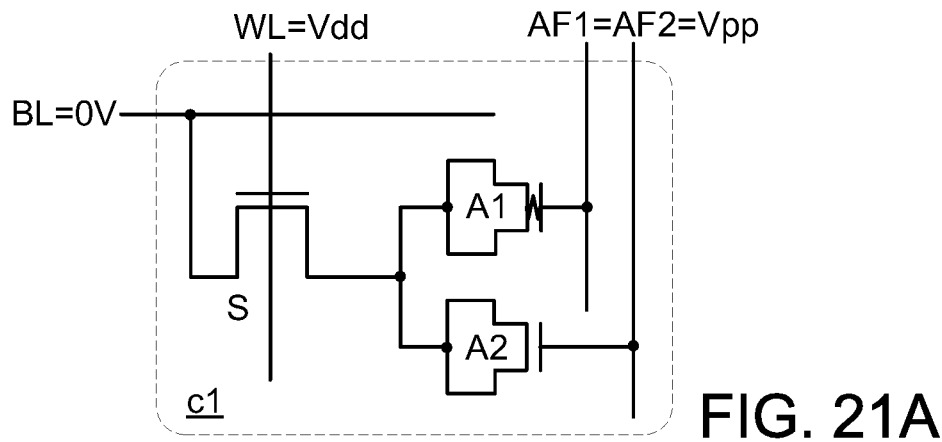
FIGS. 21A~21C schematically illustrate associated voltage signals for programming and reading the OTP memory cell for the PUF technology according to the seventh embodiment of the present invention.
Figure 21B:
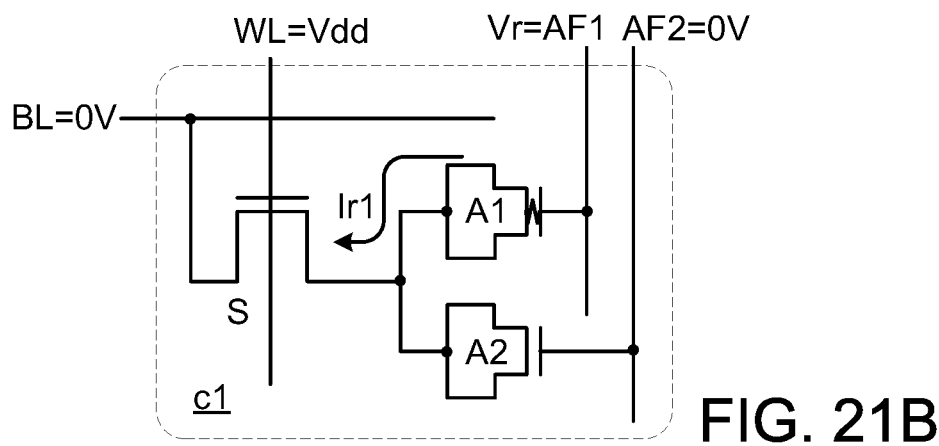
Figure 21C:
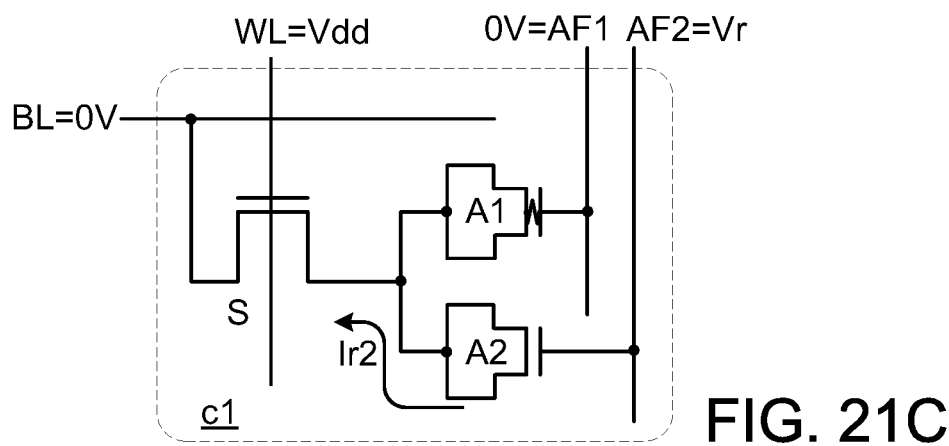

FIGS. 21A-21C schematically illustrate associated voltage signals for programming and reading the OTP memory cell for the PUF technology according to the seventh embodiment of the present invention.

Please refer to FIG. 21A. For programming the OTP memory cell, a ground voltage (0V) is provided to the bit line BL, a select voltage Vdd is provided to the word line WL, and a program voltage Vpp is provided to the first antifuse control line AF1 and the second antifuse control line AF2. In an embodiment, the select voltage Vdd is in the range between 0.75V and ⅔ Vpp, and the program voltage Vpp is in the range between 3.6V and 11V.

When the select voltage Vdd is provided to the word line WL and the ground voltage is provided to the bit line BL, the select transistor S is turned on. Consequently, a bias voltage Vpp is applied to the gate oxide layer of the first antifuse transistor A1 and the gate oxide layer of the second antifuse transistor A2. Since the program voltage Vpp is beyond the withstanding voltage range of the gate oxide layer, the gate oxide layer of one of the first antifuse transistor A1 and the second antifuse transistor A2 is ruptured. The ruptured gate oxide layer may be considered as a resistor with a low resistance value.

Due to the manufacturing variation of the OTP memory cell c1, the gate oxide layer of which antifuse transistor is ruptured during the program cycle cannot be realized. Consequently, the OTP memory cell c1 can utilize the PUF technology. Take the OTP memory cell c1 of FIG. 21A as an example. During the program cycle, the gate oxide layer of the first antifuse transistor A1 is ruptured, but the gate oxide layer of the second antifuse transistor A2 is not ruptured.

After the OTP memory cell c1 is programmed, two read actions are performed to judge the storing states of the two storing circuits. Please refer to FIG. 21B. During the first read cycle, the ground voltage (0V) is provided to the bit line BL, the select voltage Vdd is provided to the word line WL, a read voltage Vr is provided to the first antifuse control line AF1, and the ground voltage (0V) is provided to the second antifuse control line AF2. In an embodiment, the read voltage Vr is in the range between 0.75V and 3.6V.

Since the gate oxide layer of the first antifuse transistor A1 is ruptured, a first read current Ir1 flowing through the bit line BL has a larger value. According to the first read current Ir1, the first antifuse transistor A1 (i.e., the first storing circuit) is verified to have a first storing state corresponding to the low resistance value.

Please refer to FIG. 21C. During the second read cycle, the ground voltage (0V) is provided to the bit line BL, the select voltage Vdd is provided to the word line WL, the ground voltage (0V) is provided to the first antifuse control line AF1, and the read voltage Vr is provided to the second antifuse control line AF2.

Since the gate oxide layer of the second antifuse transistor A2 is not ruptured, a second read current Ir2 flowing through the bit line BL has a small value (i.e., nearly zero). According to the second read current Ir2, the second antifuse transistor A2 (i.e., the second storing circuit) is verified to have a second storing state corresponding to the high resistance value.

Then, according to the storing states of the first antifuse transistor A1 (i.e., the first storing circuit) and the second antifuse transistor A2 (i.e., the second storing circuit), one bit of the random code is determined and applied to the PUF technology.

From the above descriptions, two read actions are performed to confirm the storing states of the two storing circuits and determine one bit of the random code. However, since the storing states are complementary to each other, one bit of the random code can be determined by reading the storing state of only one storing circuit.

Figure 22A:
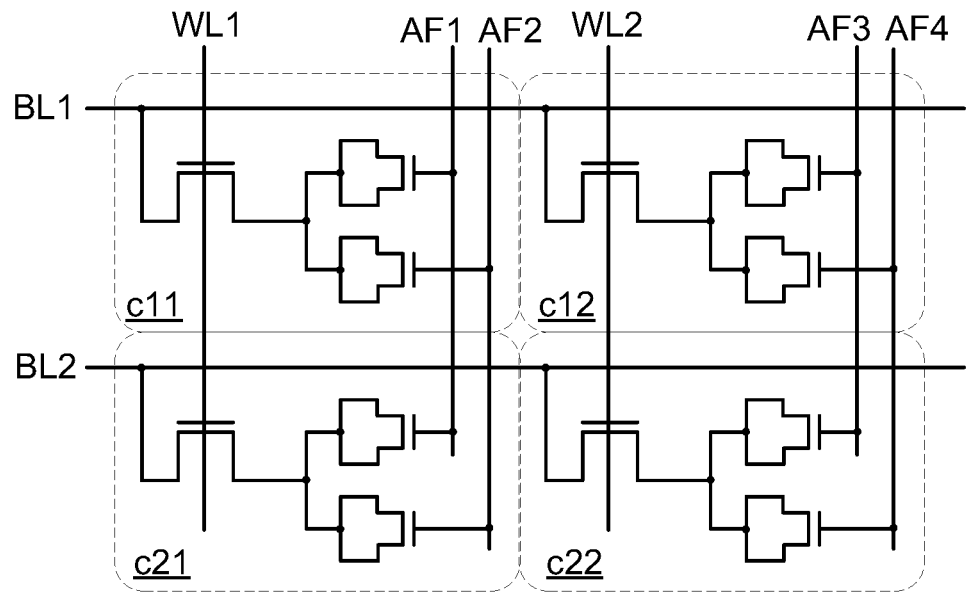
FIG. 22A is a schematic equivalent circuit diagram illustrating a memory array of OTP memory cells according to the seventh embodiment of the present invention.

FIG. 22A is a schematic equivalent circuit diagram illustrating a memory array of OTP memory cells according to the seventh embodiment of the present invention. As shown in FIG. 22A, the memory array comprises OTP memory cells c11~c22 in a 2×2 array. The structure of each of the OTP memory cells c11~c22 is similar to the structure of the OTP memory cell as shown in FIG. 20A. In this embodiment, each of the OTP memory cells c11~c22 comprises a select transistor S, a first antifuse transistor A1 and a second antifuse transistor A2.

Figure 22B:
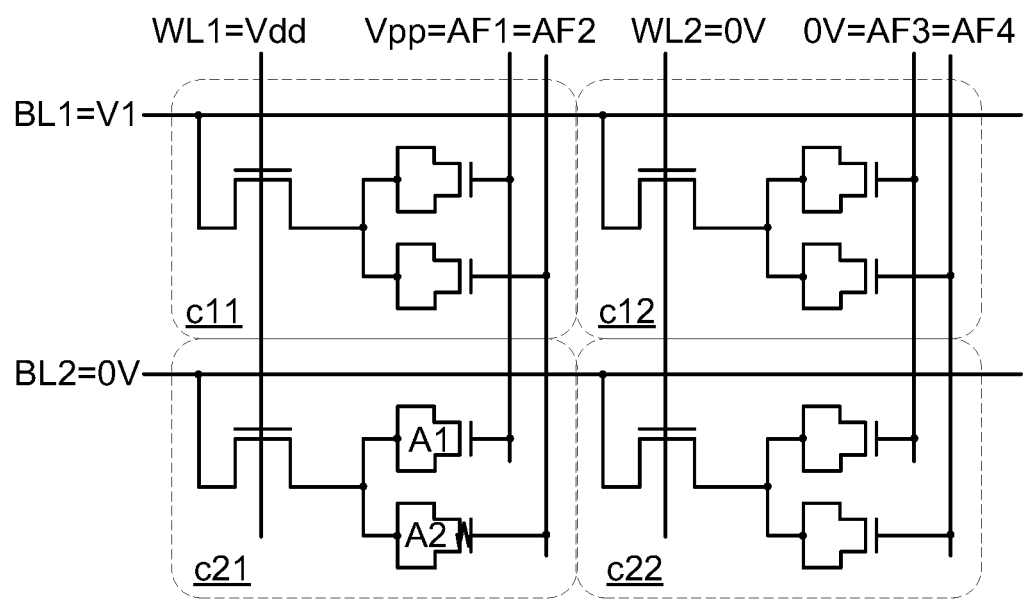
FIGS. 22B~22D schematically illustrate associated voltage signals for programming and reading the memory array for the PUF technology according to the seventh embodiment of the present invention.
Figure 22C:
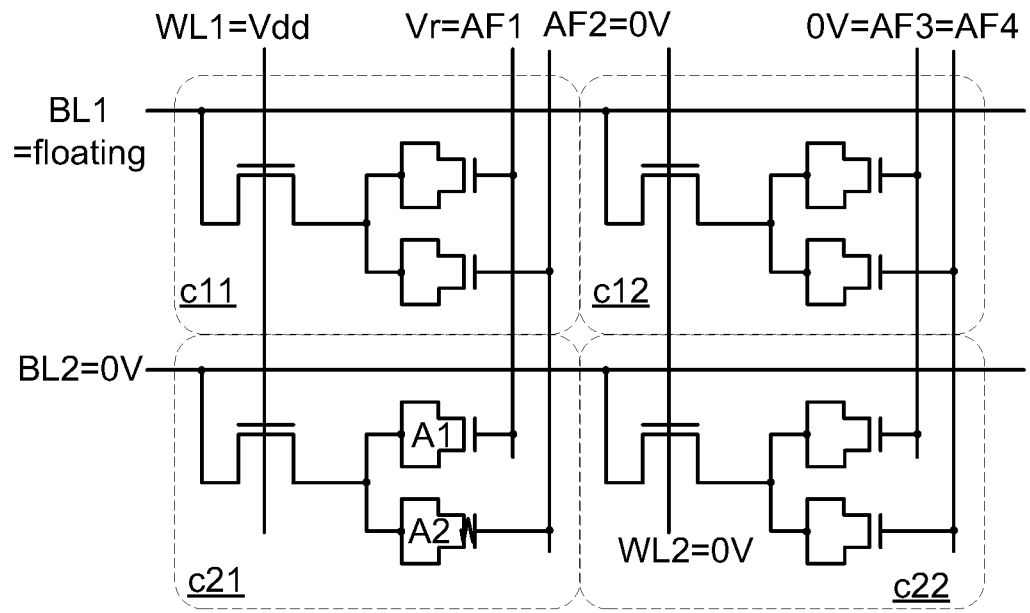
Figure 22D:
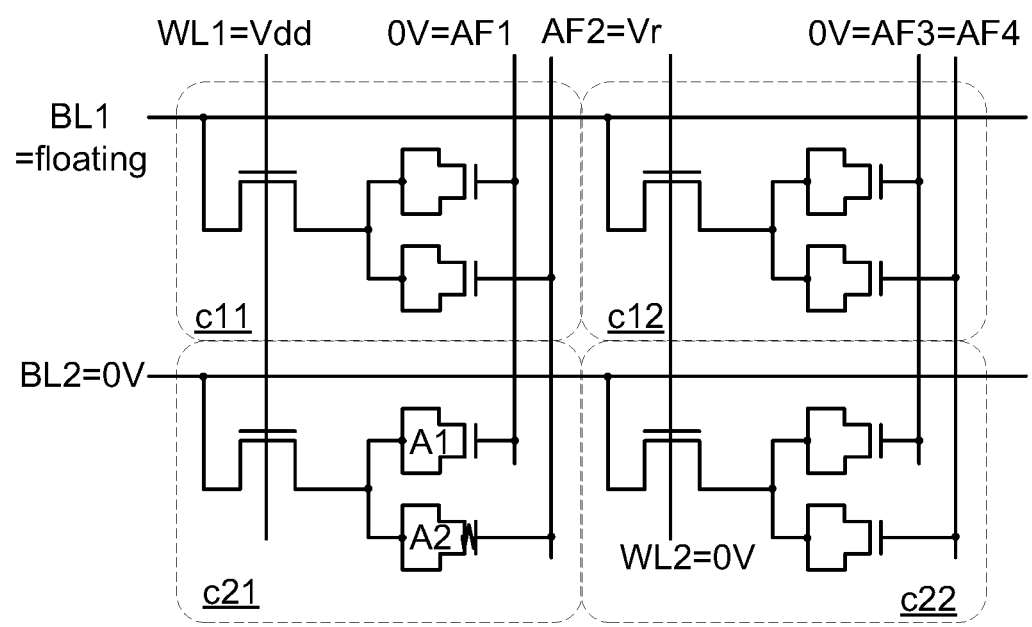

FIGS. 22B~22D schematically illustrate associated voltage signals for programming and reading the memory array for the PUF technology according to the seventh embodiment of the present invention. For example, the OTP memory cell c21 is a selected memory cell.

Please refer to FIG. 22B. For programming the selected OTP memory cell c21, a ground voltage (0V) is provided to a second bit line BL2, a select voltage Vdd is provided to a first word line WL1, and a program voltage Vpp is provided to the first antifuse control line AF1 and the second antifuse control line AF2. In an embodiment, the select voltage Vdd is in the range between 0.75V and ⅔ Vpp, and the program voltage Vpp is in the range between 3.6V and 11V.

The memory cells c11, c12 and c22 are unselected memory cells. For these unselected memory cells, a first voltage V1 is provided to a first bit line BL1, the ground voltage (0V) is provided to the second word line WL2, and the ground voltage (0V) is provided to the third antifuse control line AF3 and the fourth antifuse control line AF4. In an embodiment, the first voltage V1 is equal to or larger than the select voltage Vdd, and the first voltage V1 is smaller than a half of the program voltage Vpp (i.e., Vdd≤V1<Vpp/2).

Please refer to FIG. 22B again. Since the memory cell c21 is the selected memory cell, the bias voltage Vpp is applied to the gate oxide layer of the first antifuse transistor A1 and the gate oxide layer of the second antifuse transistor A2. Consequently, the gate oxide layer of one of the first antifuse transistor A1 and the second antifuse transistor A2 is ruptured. The ruptured gate oxide layer may be considered as a resistor with a low resistance value. For example, in the memory cell c21 as shown in FIG. 22B, the gate oxide layer of the first antifuse transistor A1 is not ruptured, but the gate oxide layer of the second antifuse transistor A2 is ruptured.

In case that the OTP memory cell c11, c12 or c22 is the selected memory cell, the bias voltages for performing the programming process are similar to those for the memory cell c21. The detailed description thereof is not redundantly described herein.

After the selected memory cell c21 is programmed, two read actions are performed to judge the storing states of the two storing circuits of the selected memory cell c21. Please refer to FIG. 22C. During the first read cycle of the selected memory cell c21, the ground voltage (0V) is provided to the second bit line BL2, the select voltage Vdd is provided to the first word line WL1, a read voltage Vr is provided to the first antifuse control line AF1, and the ground voltage (0V) is provided to the second antifuse control line AF2. In an embodiment, the read voltage Vr is in the range between 0.75V and 3.6V.

For the unselected memory cells c11, c12 and c22, the first bit line BL1 is in a floating state, the ground voltage (0V) is provided to the second word line WL2, and the ground voltage (0V) is provided to the third antifuse control line AF3 and the fourth antifuse control line AF4.

In the selected memory cell c21, since the gate oxide layer of the first antifuse transistor A1 is not ruptured, a first read current Ir1 flowing through the first bit line BL1 has a small value (i.e., nearly zero). According to the first read current Ir1, the first antifuse transistor A1 (i.e., the first storing circuit) is verified to have a second storing state corresponding to the high resistance value.

Please refer to FIG. 22D. During the second read cycle of the selected memory cell c21, the ground voltage (0V) is provided to the second bit line BL2, the select voltage Vdd is provided to the first word line WL1, the ground voltage (0V) is provided to the first antifuse control line AF1, and the read voltage Vr is provided to the second antifuse control line AF2.

For the unselected memory cells c11, c12 and c22, the first bit line BL1 is in a floating state, the ground voltage (0V) is provided to the second word line WL2, and the ground voltage (0V) is provided to the third antifuse control line AF3 and the fourth antifuse control line AF4.

In the selected memory cell c21, since gate oxide layer of the second antifuse transistor A2 is ruptured, a second read current Ir2 flowing through the first bit line BL1 has a larger value. According to the second read current Ir2, the second antifuse transistor A2 (i.e., the second storing circuit) is verified to have a first storing state corresponding to the low resistance value.

Then, according to the storing states of the first antifuse transistor A1 (i.e., the first storing circuit) and the second antifuse transistor A2 (i.e., the second storing circuit), one bit of the random code is determined and applied to the PUF technology.

From the above descriptions, two read actions are performed to confirm the storing states of the two storing circuits and determine one bit of the random code. However, since the storing states are complementary to each other, one bit of the random code can be determined by reading the storing state of only one storing circuit.

Moreover, after the program actions and the read actions of the four memory cells c11~c22 are performed, a four-bit random code for the PUF technology is generated.

Figure 23A:
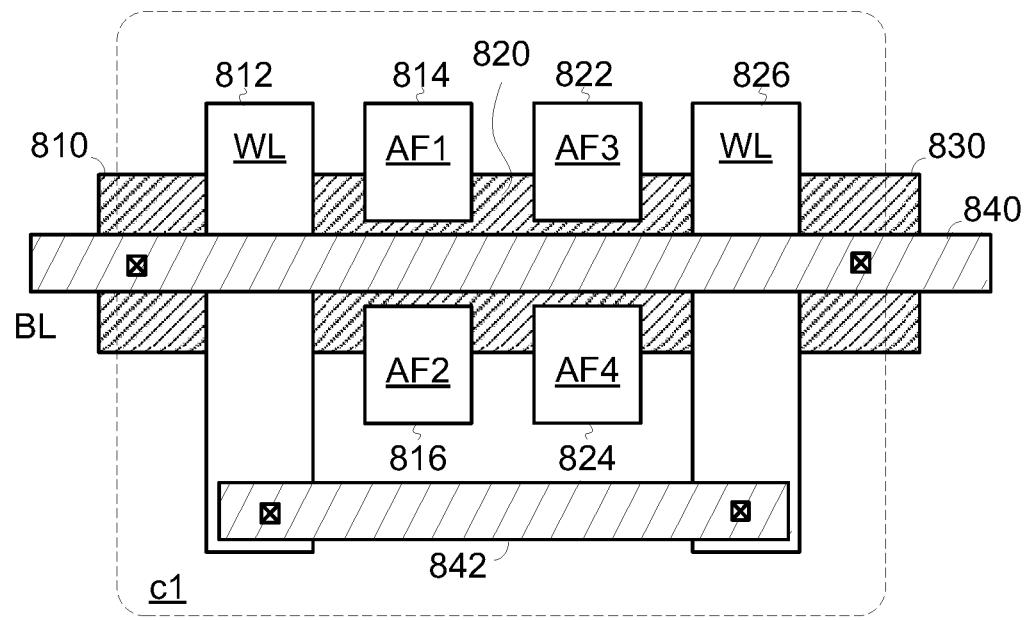
FIG. 23A is a schematic top view of a one time programming memory cell according to an eighth embodiment of the present invention.
Figure 23B:
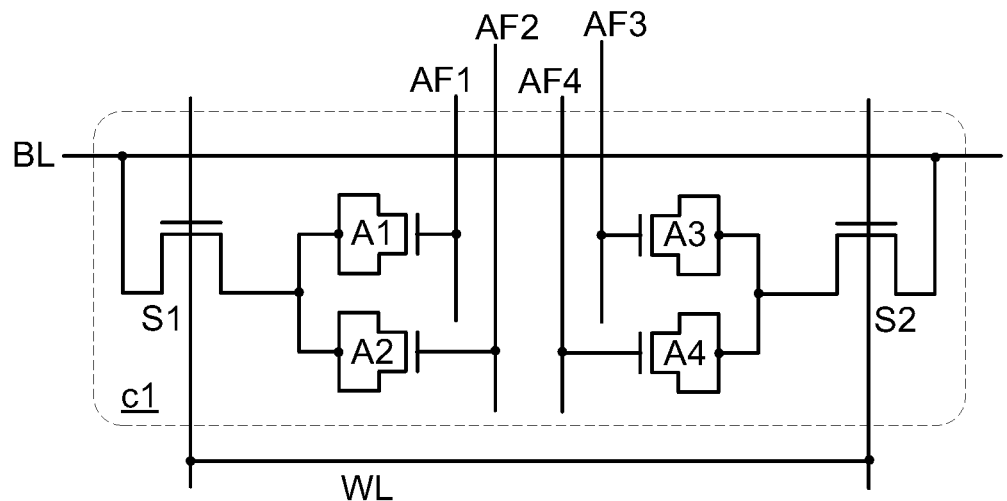
FIG. 23B is a schematic equivalent circuit diagram of the one time programming memory cell according to the eighth embodiment of the present invention.

FIG. 23A is a schematic top view of a one time programming memory cell according to an eighth embodiment of the present invention. FIG. 23B is a schematic equivalent circuit diagram of the one time programming memory cell according to the eighth embodiment of the present invention.

As shown in FIG. 23A, the OTP memory cell c1 is constructed in a P-well region PW. A gate oxide layer (not shown) covers the top surface of the P-well region PW. A first doped region 810, a second doped region 820 and a third doped region 830 are formed under a top surface of the P-well region PW. A first gate 812 is formed on the gate oxide layer and spanned over the first doped region 810 and the second doped region 820. Moreover, the first gate 812 is connected with a word line WL of the memory cell c1. A second gate 814 is formed on the gate oxide and disposed over the second doped region 820. Moreover, the second gate 814 is connected with a first antifuse control line AF1 of the memory cell c1. A third gate 816 is formed on the gate oxide and disposed over the second doped region 820. Moreover, the third gate 816 is connected with a second antifuse control line AF2 of the memory cell c1. A fourth gate 822 is formed on the gate oxide and disposed over the second doped region 820. Moreover, the fourth gate 822 is connected with a third antifuse control line AF3 of the memory cell c1. A fifth gate 824 is formed on the gate oxide and disposed over the second doped region 820. Moreover, the fifth gate 824 is connected with a fourth antifuse control line AF4 of the memory cell c1. A sixth gate 826 is formed on the gate oxide layer and spanned over the second doped region 820 and the third doped region 830. The sixth gate 826 is connected with a word line WL of the memory cell c1.

Moreover, a first metal layer 840 is connected with the first doped region 810 and the third doped region 830 through two vias. The first metal layer 840 is used as a bit line BL of the memory cell c1. Moreover, the first gate 812 and the sixth gate 826 are connected with each other through a second metal layer 842.

Please refer to FIG. 23B. The first doped region 810, the second doped region 820 and the first gate 812 are collaboratively formed as a first select transistor S1. The second doped region 820, the third doped region 830 and the sixth gate 826 are collaboratively formed as a second select transistor S2. The second doped region 820 and the second gate 814 are collaboratively formed as a first antifuse transistor A1. The second doped region 820 and the third gate 816 are collaboratively formed as a second antifuse transistor A2. The second doped region 820 and the fourth gate 822 are collaboratively formed as a third antifuse transistor A3. The second doped region 820 and the fifth gate 824 are collaboratively formed as a fourth antifuse transistor A4. A drain terminal and a source terminal of the first antifuse transistor A1 are connected with each other. A drain terminal and a source terminal of the second antifuse transistor A2 are connected with each other. A drain terminal and a source terminal of the third antifuse transistor A3 are connected with each other. A drain terminal and a source terminal of the fourth antifuse transistor A4 are connected with each other. In this embodiment, 4 antifuse transistors A1~A4 can be seen as 4 capacitors.

The first drain/source terminal of the first select transistor S1 is connected with the bit line BL. The gate terminal of the first select transistor S1 is connected with the word line WL. The first drain/source terminal and the second drain/source terminal of the first antifuse transistor A1 are connected with the second drain/source terminal of the first select transistor S1. The gate terminal of the first antifuse transistor A1 is connected with a first antifuse control line AF1. The first drain/source terminal and the second drain/source terminal of the second antifuse transistor A2 are connected with the second drain/source terminal of the first select transistor S1. The gate terminal of the second antifuse transistor A2 is connected with a second antifuse control line AF2. The first drain/source terminal of the second select transistor S2 is connected with the bit line BL. The gate terminal of the second select transistor S2 is connected with the word line WL. The first drain/source terminal and the second drain/source terminal of the third antifuse transistor A3 are connected with the second drain/source terminal of the second select transistor S2. The gate terminal of the third antifuse transistor A3 is connected with a third antifuse control line AF3. The first drain/source terminal and the second drain/source terminal of the fourth antifuse transistor A4 are connected with the second drain/source terminal of the second select transistor S2. The gate terminal of the fourth antifuse transistor A4 is connected with a fourth antifuse control line AF4.

In accordance with the eighth embodiment, the OTP memory cell c1 comprises four storing circuits. That is, the first antifuse transistor A1 is a first storing circuit, the second antifuse transistor A2 is a second storing circuit, the third antifuse transistor A3 is a third storing circuit, and the fourth antifuse transistor A4 is a fourth storing circuit. During the program cycle of the OTP memory cell c1, the high voltage stress is applied to all of the first antifuse transistor A1, the second antifuse transistor A2, the third antifuse transistor A3 and the fourth antifuse transistor A4. Under this circumstance, the gate oxide layer of one of the first antifuse transistor A1, the second antifuse transistor A2, the third antifuse transistor A3 and the fourth antifuse transistor A4 is ruptured. Consequently, the storing state thereof is changed. During the read cycle, the storing states of the first antifuse transistor A1, the second antifuse transistor A2, the third antifuse transistor A3 and the fourth antifuse transistor A4 are sequentially read. Consequently, the random code of the PUF technology is determined.

FIGS. 24A~24E schematically illustrate associated voltage signals for programming and reading the OTP memory cell for the PUF technology according to the eighth embodiment of the present invention.

Figure 24A:
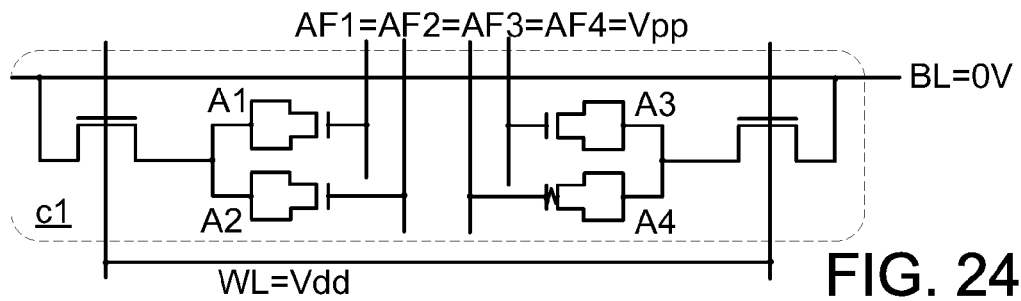
FIGS. 24A~24E schematically illustrate associated voltage signals for programming and reading the OTP memory cell for the PUF technology according to the eighth embodiment of the present invention.
Figure 24B:
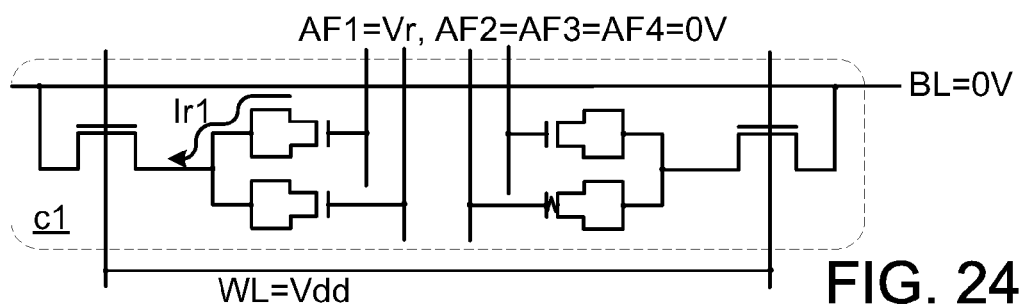

Please refer to FIG. 24A. For programming the OTP memory cell, a ground voltage (0V) is provided to the bit line BL, a select voltage Vdd is provided to the word line WL, and a program voltage Vpp is provided to the first antifuse control line AF1, the second antifuse control line AF2, the third antifuse control line AF3 and the fourth antifuse control line AF4. In an embodiment, the select voltage Vdd is in the range between 0.75V and ⅔ Vpp, and the program voltage Vpp is in the range between 3.6V and 11V.

When the select voltage Vdd is provided to the word line WL and the ground voltage is provided to the bit line BL, the first select transistor S1 and the second select transistor S2 are turned on. Consequently, a bias voltage Vpp is applied to the gate oxide layers of the first antifuse transistor A1, the gate oxide layers of the second antifuse transistor A2, the gate oxide layers of the third antifuse transistor A3 and the gate oxide layers of the fourth antifuse transistor A4. Since the program voltage Vpp is beyond the withstanding voltage range of the gate oxide layer, the gate oxide layer of one of the first antifuse transistor A1, the second antifuse transistor A2, the third antifuse transistor A3 and the fourth antifuse transistor A4 is ruptured. The ruptured gate oxide layer may be considered as a resistor with a low resistance value.

Due to the manufacturing variation of the OTP memory cell c1, the controlling circuit cannot realize whether the gate oxide layer of which antifuse transistor is ruptured during the program cycle. Consequently, the OTP memory cell c1 can utilize the PUF technology. Take the OTP memory cell c1 of FIG. 24A as an example. During the program cycle, the gate oxide layer of the fourth antifuse transistor A4 is ruptured, but the gate oxide layers of the first antifuse transistor A1, the second antifuse transistor A2, the third antifuse transistor A3 are not ruptured.

After the OTP memory cell c1 is programmed, four read actions are performed to judge the storing states of the four storing circuits. Please refer to FIG. 24B. During the first read cycle, the ground voltage (0V) is provided to the bit line BL, the select voltage Vdd is provided to the word line WL, a read voltage Vr is provided to the first antifuse control line AF1, and the ground voltage (0V) is provided to the second antifuse control line AF2, the third antifuse control line AF3 and the fourth antifuse control line AF4. In an embodiment, the read voltage Vr is in the range between 0.75V and 3.6V.

Since the gate oxide layer of the first antifuse transistor A1 is not ruptured, a first read current Ir1 flowing through the bit line BL has a small value (i.e., nearly zero). According to the first read current Ir1, the first antifuse transistor A1 (i.e., the first storing circuit) is verified to have a second storing state corresponding to the high resistance value.

Figure 24C:
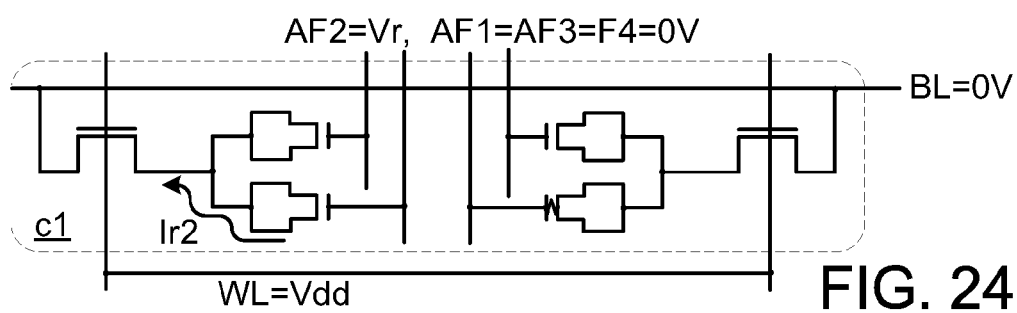

Please refer to FIG. 24C. During the second read cycle, the ground voltage (0V) is provided to the bit line BL, the select voltage Vdd is provided to the word line WL, a read voltage Vr is provided to the second antifuse control line AF2, and the ground voltage (0V) is provided to the first antifuse control line AF1, the third antifuse control line AF3 and the fourth antifuse control line AF4. In an embodiment, the read voltage Vr is in the range between 0.75V and 3.6V.

Since the gate oxide layer of the second antifuse transistor A2 is not ruptured, a second read current Ir2 flowing through the bit line BL has a small value (i.e., nearly zero). According to the second read current Ir2, the second antifuse transistor A2 (i.e., the second storing circuit) is verified to have a second storing state corresponding to the high resistance value.

Figure 24D:
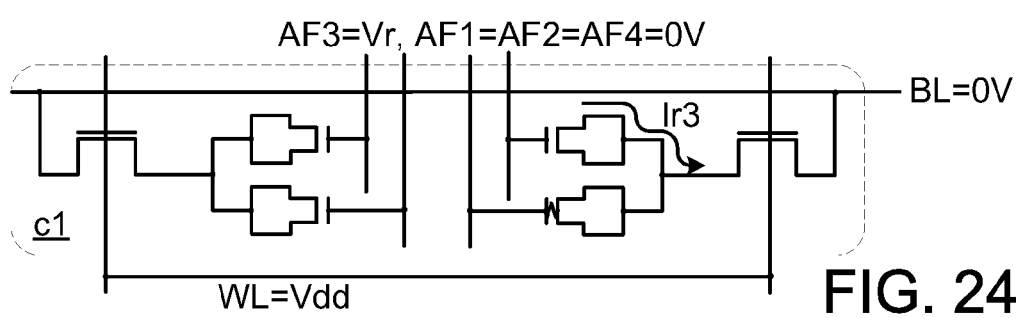

Please refer to FIG. 24D. During the third read cycle, the ground voltage (0V) is provided to the bit line BL, the select voltage Vdd is provided to the word line WL, a read voltage Vr is provided to the third antifuse control line AF3, and the ground voltage (0V) is provided to the first antifuse control line AF1, the second antifuse control line AF2 and the fourth antifuse control line AF4. In an embodiment, the read voltage Vr is in the range between 0.75V and 3.6V.

Since the gate oxide layer of the third antifuse transistor A3 is not ruptured, a third read current Ir3 flowing through the bit line BL has a small value (i.e., nearly zero). According to the third read current Ir3, the third antifuse transistor A3 (i.e., the third storing circuit) is verified to have a second storing state corresponding to the high resistance value.

Figure 24E:
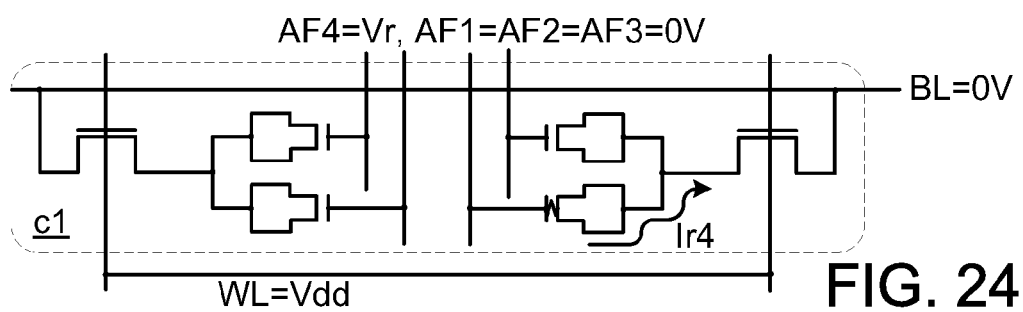

Please refer to FIG. 24E. During the fourth read cycle, the ground voltage (0V) is provided to the bit line BL, the select voltage Vdd is provided to the word line WL, a read voltage Vr is provided to the fourth antifuse control line AF4, and the ground voltage (0V) is provided to the first antifuse control line AF1, the second antifuse control line AF2 and the third antifuse control line AF3. In an embodiment, the read voltage Vr is in the range between 0.75V and 3.6V.

Since the gate oxide layer of the fourth antifuse transistor A4 is ruptured, a fourth read current Ir4 flowing through the bit line BL has a larger value. According to the fourth read current Ir4, the fourth antifuse transistor A4 (i.e., the fourth storing circuit) is verified to have a first storing state corresponding to the low resistance value.

Then, according to the storing states of the first antifuse transistor A1 (i.e., the first storing circuit), the second antifuse transistor A2 (i.e., the second storing circuit), the third antifuse transistor A3 (i.e., the third storing circuit) and the fourth antifuse transistor A4 (i.e., the fourth storing circuit), two bits of the random code are determined and applied to the PUF technology.

From the above descriptions, four read actions are performed to confirm the storing states of the four storing circuits and determine two bits of the random code.

Figure 25A:
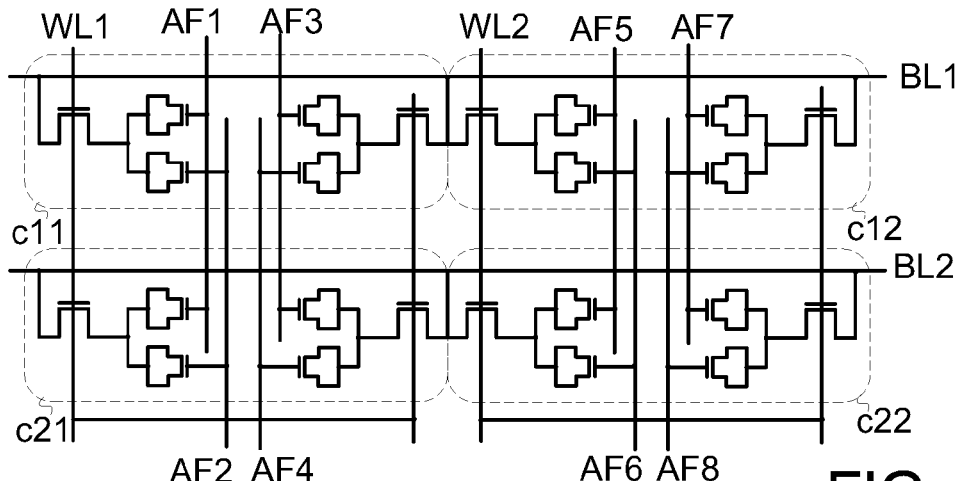
FIG. 25A is a schematic equivalent circuit diagram illustrating a memory array of OTP memory cells according to the eighth embodiment of the present invention.

FIG. 25A is a schematic equivalent circuit diagram illustrating a memory array of OTP memory cells according to the eighth embodiment of the present invention.

As shown in FIG. 25A, the memory array comprises OTP memory cells c11~c22 in a 2×2 array. The structure of each of the OTP memory cells c11~c22 is similar to the structure of the OTP memory cell as shown in FIG. 23A. In this embodiment, each of the OTP memory cells c11~c22 comprises a first select transistor S1, a second select transistor S2, a first antifuse transistor A1, a second antifuse transistor A2, a third antifuse transistor A3 and a fourth antifuse transistor A4.

FIGS. 25B~25F schematically illustrate associated voltage signals for programming and reading the memory array for the PUF technology according to the eighth embodiment of the present invention. For example, the OTP memory cell c11 is a selected memory cell.

Figure 25B:
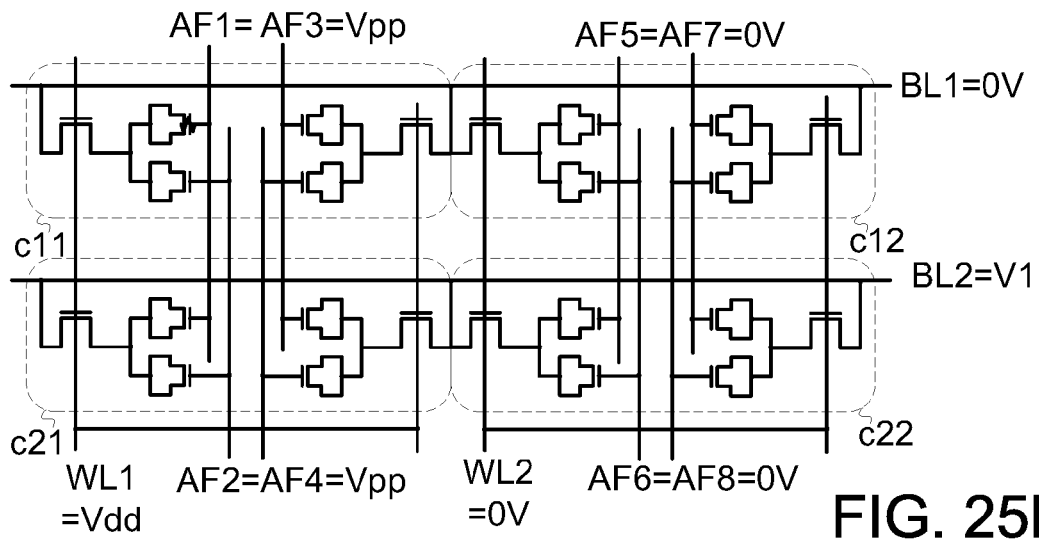
FIGS. 25B~25F schematically illustrate associated voltage signals for programming and reading the memory array for the PUF technology according to the eighth embodiment of the present invention.
Figure 25C:
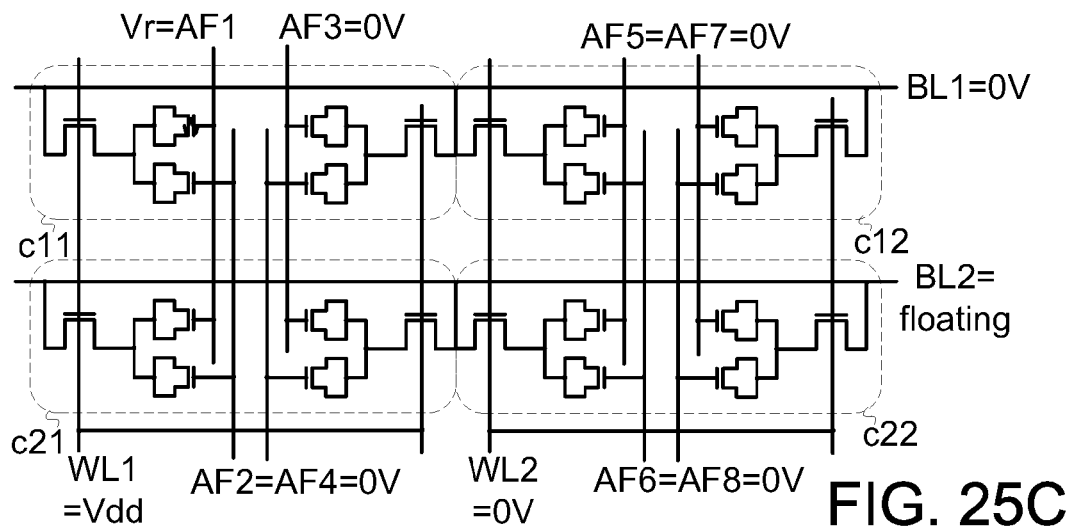

Please refer to FIG. 25B. For programming the selected OTP memory cell c11, a ground voltage (0V) is provided to a first bit line BL1, a select voltage Vdd is provided to a first word line WL1, and a program voltage Vpp is provided to a first antifuse control line AF1, a second antifuse control line AF2, a third antifuse control line AF3 and a fourth antifuse control line AF4. In an embodiment, the select voltage Vdd is in the range between 0.75V and ⅔ Vpp, and the program voltage Vpp is in the range between 3.6V and 11V.

The memory cells c12, c21 and c22 are unselected memory cells. For these unselected memory cells, a first voltage V1 is provided to the first second bit line BL1, the ground voltage (0V) is provided to the second word line WL2, and the ground voltage (0V) is provided to a fifth antifuse control line AF5, a sixth antifuse control line AF6, a seventh antifuse control line AF7 and an eighth antifuse control line AF8. In an embodiment, the first voltage V1 is equal to or larger than the select voltage Vdd, and the first voltage V1 is smaller than a half of the program voltage Vpp (i.e., Vdd≤V1<Vpp/2).

Please refer to FIG. 25B again. Since the memory cell c11 is the selected memory cell, the bias voltage Vpp is applied to the gate oxide layer of the first antifuse transistor A1, the gate oxide layer of the second antifuse transistor A2, the gate oxide layer of the third antifuse transistor A3 and the gate oxide layer of the fourth antifuse transistor A4. Consequently, the gate oxide layer of one of the first antifuse transistor A1, the second antifuse transistor A2, the third antifuse transistor A3 and the fourth antifuse transistor A4 is ruptured. The ruptured gate oxide layer may be considered as a resistor with a low resistance value. For example, in the memory cell c11 as shown in FIG. 25B, the gate oxide layer of the first antifuse transistor A1 is ruptured, but the gate oxide layers of the second antifuse transistor A2, the third antifuse transistor A3 and the fourth antifuse transistor A4 are not ruptured.

In case that the OTP memory cell c12, c21 or c22 is the selected memory cell, the bias voltages for performing the programming process are similar to those for the memory cell c11. The detailed description thereof is not redundantly described herein.

After the selected memory cell c11 is programmed, four read actions are performed to judge the storing states of the four storing circuits. Please refer to FIG. 25C. During the first read cycle of the selected memory cell c11, the ground voltage (0V) is provided to the first bit line BL1, the select voltage Vdd is provided to the first word line WL1, a read voltage Vr is provided to the first antifuse control line AF1, and the ground voltage (0V) is provided to the second antifuse control line AF2, the third antifuse control line AF3 and the fourth antifuse control line AF4. In an embodiment, the read voltage Vr is in the range between 0.75V and 3.6V.

For the unselected memory cells c12, c21 and c22, the second bit line BL2 is in a floating state, the ground voltage (0V) is provided to the second word line WL2, and the ground voltage (0V) is provided to the fifth antifuse control line AF5, the sixth antifuse control line AF6, the seventh antifuse control line AF7 and the eighth antifuse control line AF8.

In the selected memory cell c11, since the gate oxide layer of the first antifuse transistor A1 is ruptured, a first read current flowing through the first bit line BL1 has a larger value. According to the first read current, the first antifuse transistor A1 (i.e., the first storing circuit) is verified to have a first storing state corresponding to the low resistance value.

Figure 25D:
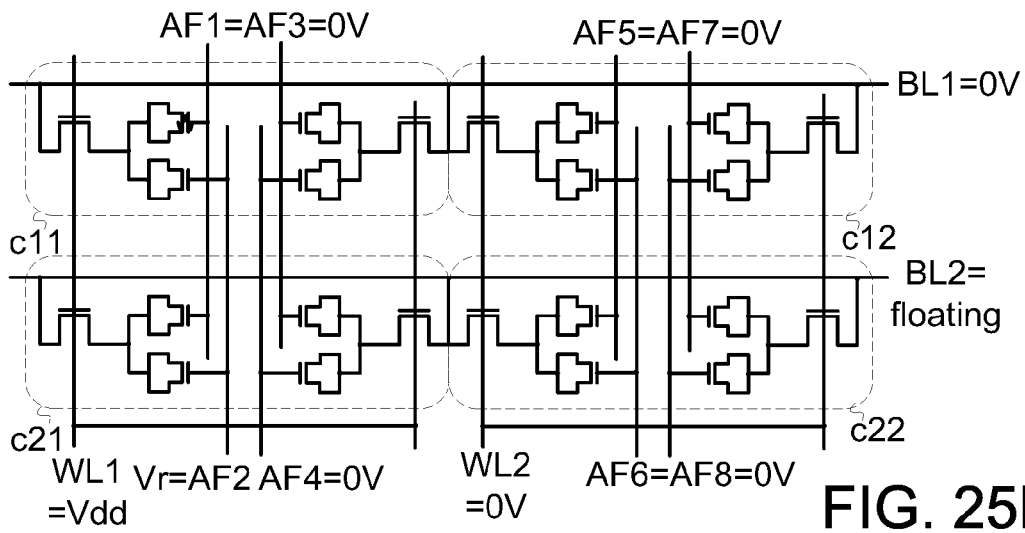

Please refer to FIG. 25D. During the second read cycle of the selected memory cell c11, the ground voltage (0V) is provided to the first bit line BL1, the select voltage Vdd is provided to the first word line WL1, a read voltage Vr is provided to the second antifuse control line AF2, and the ground voltage (0V) is provided to the first antifuse control line AF1, the third antifuse control line AF3 and the fourth antifuse control line AF4. In an embodiment, the read voltage Vr is in the range between 0.75V and 3.6V.

For the unselected memory cells c12, c21 and c22, the second bit line BL2 is in a floating state, the ground voltage (0V) is provided to the second word line WL2, and the ground voltage (0V) is provided to the fifth antifuse control line AF5, the sixth antifuse control line AF6, the seventh antifuse control line AF7 and the eighth antifuse control line AF8.

In the selected memory cell c11, since the gate oxide layer of the second antifuse transistor A2 is not ruptured, a second read current flowing through the first bit line BL1 has a small value (i.e., nearly zero). According to the second read current, the second antifuse transistor A2 (i.e., the second storing circuit) is verified to have a second storing state corresponding to the high resistance value.

Figure 25E:
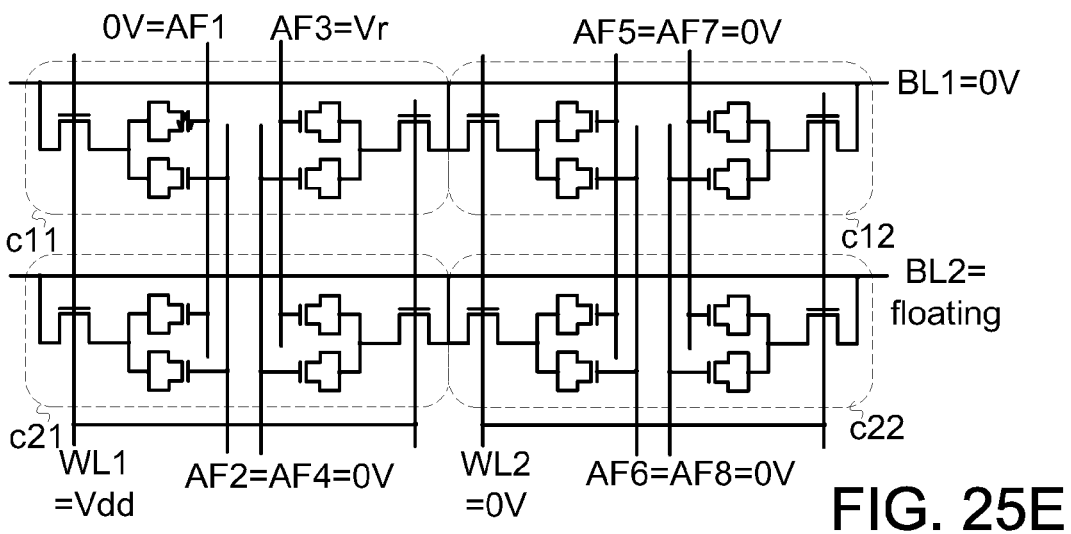

Please refer to FIG. 25E. During the third read cycle of the selected memory cell c11, the ground voltage (0V) is provided to the first bit line BL1, the select voltage Vdd is provided to the first word line WL1, a read voltage Vr is provided to the third antifuse control line AF3, and the ground voltage (0V) is provided to the first antifuse control line AF1, the second antifuse control line AF2 and the fourth antifuse control line AF4. In an embodiment, the read voltage Vr is in the range between 0.75V and 3.6V.

For the unselected memory cells c12, c21 and c22, the second bit line BL2 is in a floating state, the ground voltage (0V) is provided to the second word line WL2, and the ground voltage (0V) is provided to the fifth antifuse control line AF5, the sixth antifuse control line AF6, the seventh antifuse control line AF7 and the eighth antifuse control line AF8.

In the selected memory cell c11, since the gate oxide layer of the third antifuse transistor A3 is not ruptured, a third read current flowing through the first bit line BL1 has a small value (i.e., nearly zero). According to the third read current, the third antifuse transistor A3 (i.e., the third storing circuit) is verified to have a second storing state corresponding to the high resistance value.

Figure 25F:
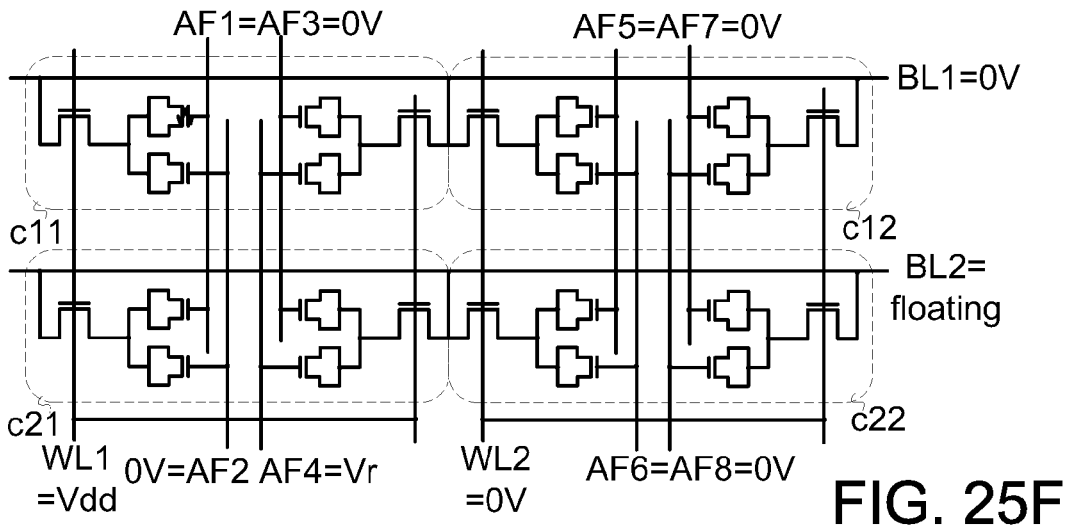

Please refer to FIG. 25F. During the third read cycle of the selected memory cell c11, the ground voltage (0V) is provided to the first bit line BL1, the select voltage Vdd is provided to the first word line WL1, a read voltage Vr is provided to the fourth antifuse control line AF4, and the ground voltage (0V) is provided to the first antifuse control line AF1, the second antifuse control line AF2 and the third antifuse control line AF3. In an embodiment, the read voltage Vr is in the range between 0.75V and 3.6V.

For the unselected memory cells c12, c21 and c22, the second bit line BL2 is in a floating state, the ground voltage (0V) is provided to the second word line WL2, and the ground voltage (0V) is provided to the fifth antifuse control line AF5, the sixth antifuse control line AF6, the seventh antifuse control line AF7 and the eighth antifuse control line AF8.

In the selected memory cell c11, since the gate oxide layer of the fourth antifuse transistor A4 is not ruptured, a third read current flowing through the first bit line BL1 has a small value (i.e., nearly zero). According to the third read current, the fourth antifuse transistor A4 (i.e., the fourth storing circuit) is verified to have a second storing state corresponding to the high resistance value.

Figure 26:
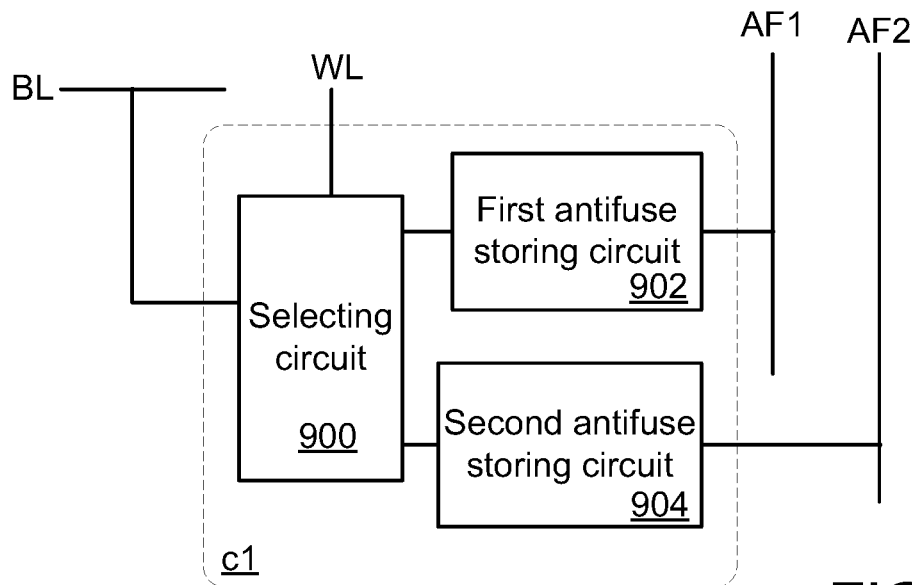
FIG. 26 is a schematic functional diagram illustrating the first type OTP memory cell of the present invention.

From the above descriptions, the present invention provides a one time programming memory cell and a memory array for a physically unclonable function (PUF) technology. The OTP memory cells described in the above embodiments are mainly classified into two types. FIG. 26 is a schematic functional diagram illustrating the first type OTP memory cell of the present invention. The OTP memory cells described in the first embodiment, the fifth embodiment, the seventh embodiment and the eighth embodiment are the first type OTP memory cells.

As shown in FIG. 26, the first type OTP memory cell c1 comprises a selecting circuit 900, a first antifuse storing circuit 902 and a second antifuse storing circuit 904. The selecting circuit 900 is connected with a bit line BL and a word line WL. The selecting circuit 900 is connected to at least two antifuse storing circuits. As shown in FIG. 26, the first antifuse storing circuit 902 is connected with a first antifuse control line AF1 and the selecting circuit 900. The second antifuse storing circuit 904 is connected with a second antifuse control line AF2 and the selecting circuit 900.

According to the embodiment of the present invention, the first antifuse storing circuit 902 and the second antifuse storing circuit 904 are disposed symmetrically in the semiconductor. The selecting circuit 900 includes at least one select transistor, and each antifuse storing circuit 902 and 904 includes at least one antifuse transistor. In another embodiment, the selecting circuit may includes select transistors and switch transistors, and the antifuse storing circuit may include more antifuse transistors connecting to corresponding antifuse control lines.

For programming the OTP memory cell c1, a ground voltage (0V) is provided to the bit line BL, a select voltage Vdd is provided to the word line WL, and a program voltage Vpp is provided to the first antifuse control line AF1 and the second antifuse control line AF2. The selecting circuit 900 provides the ground voltage (0V) to the first antifuse storing circuit 902 and the second antifuse storing circuit 904. During the program cycle of the OTP memory cell c1, the program voltage is applied to both of the first antifuse storing circuit 902 and the second antifuse storing circuit 904. Consequently, the storing state of the first antifuse storing circuit 902 or the second antifuse storing circuit 904 is changed.

During the read cycle of the OTP memory cell c1, the ground voltage (0V) is provided to the bit line BL, the select voltage Vdd is provided to the word line WL, a read voltage Vr is provided to the first antifuse control line AF1, and the ground voltage (0V) is provided to the second antifuse control line AF2. Consequently, the first antifuse storing circuit 902 generates a first read current to the bit line BL. According to the first read current, the first antifuse storing circuit 902 is judged to have a first storing state or a second storing state. Consequently, one bit of the random code for the PUF technology is realized. In another embodiment, the storing state of the antifuse storing circuit may be determined by measuring the voltage drop across the gate oxide layer of the antifuse transistor in the antifuse storing circuit.

That is to say, when programming the OTP memory cell, the antifuse storing circuits in the OTP memory cell receive the same predetermined voltage difference, and then one of the antifuse storing circuit changes the storing state. When reading the OTP memory cell, the storing states of the antifuse storing circuits are read and recorded. That means the ruptured conditions of the antifuse storing circuits are determined and recorded. In this invention, the ruptured conditions are determined based on the manufacturing variation of the programmed antifuse storing circuits. Then, a random code is capable of being generated in response to the recorded ruptured conditions.

Figure 27:
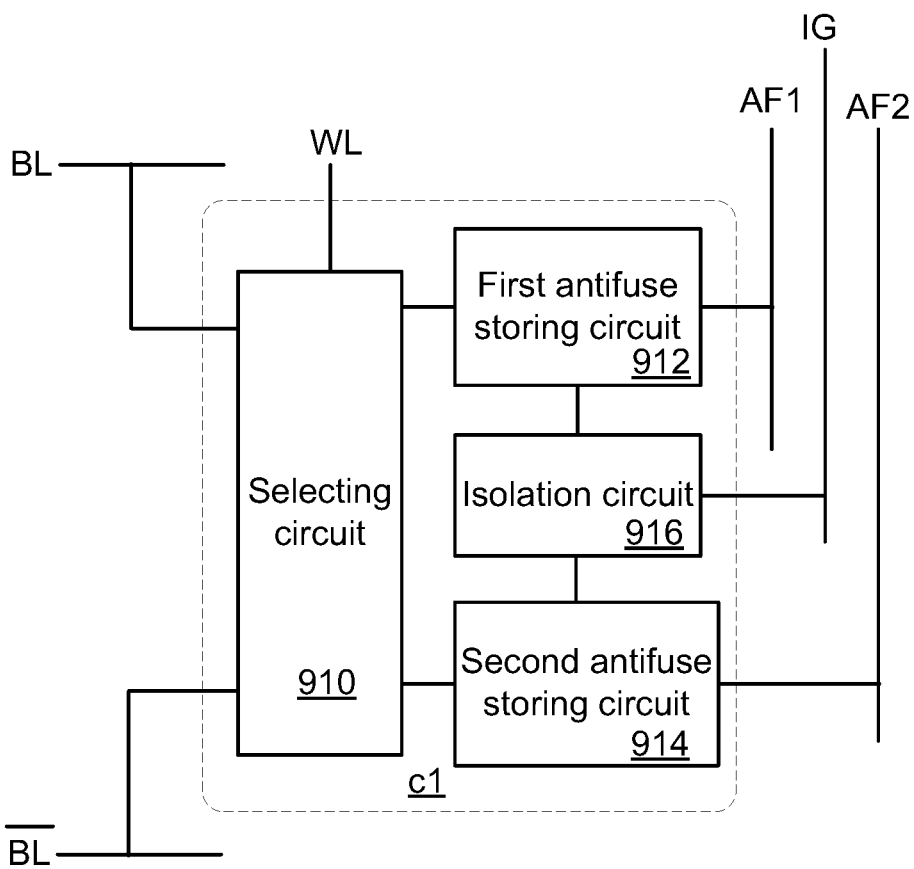
FIG. 27 is a schematic functional diagram illustrating the second type OTP memory cell of the present invention.

FIG. 27 is a schematic functional diagram illustrating the second type OTP memory cell of the present invention. The OTP memory cells described in the second embodiment and the sixth embodiment are the second type OTP memory cells.

As shown in FIG. 27, the first type OTP memory cell c1 comprises a selecting circuit 910, a first antifuse storing circuit 912, a second antifuse storing circuit 914 and an isolation circuit 916. The selecting circuit 910 is connected with a bit line BL, an inverted bit line $\overline{BL}$ and a word line WL. The selecting circuit 910 is connected to at least two antifuse storing circuits. As shown in FIG. 27, the first antifuse storing circuit 912 is connected with a first antifuse control line AF1, the isolation circuit 916 and the selecting circuit 910. The second antifuse storing circuit 914 is connected with a second antifuse control line AF2, the isolation circuit 916 and the selecting circuit 910.

According to the embodiment of the present invention, the first antifuse storing circuit 912 and the second antifuse storing circuit 914 are disposed symmetrically in the semiconductor. The selecting circuit 910 includes at least one select transistor, and each antifuse storing circuit 912 and 914 includes at least one antifuse transistor, and the isolation circuit 916 includes an isolation transistor. In another embodiment, the selecting circuit may includes select transistors and switch transistors, and the antifuse storing circuit may include more antifuse transistors connecting to corresponding antifuse control lines, and the isolation circuit may include more isolation transistors.

For programming the OTP memory cell c1, a ground voltage (0V) is provided to the bit line BL and the inverted bit line $\overline{BL}$, a select voltage Vdd is provided to the word line WL, an on voltage is provided to an isolation control line IG, and a program voltage Vpp is provided to the first antifuse control line AF1 and the second antifuse control line AF2.

The isolation circuit 916 is connected with the first antifuse storing circuit 912 and the second antifuse storing circuit 914. The selecting circuit 910 provides the ground voltage (0V) to the first antifuse storing circuit 912 and the second antifuse storing circuit 914. During the program cycle of the OTP memory cell c1, the program voltage is applied to both of the first antifuse storing circuit 912 and the second antifuse storing circuit 914. Consequently, the storing state of the first antifuse storing circuit 912 or the second antifuse storing circuit 914 is changed.

During the read cycle of the OTP memory cell c1, the ground voltage (0V) is provided to the bit line BL and the inverted bit line $\overline{BL}$, the select voltage Vdd is provided to the word line WL, a read voltage Vr is provided to the first antifuse control line AF1 and the second antifuse control line AF2, and an off voltage is provided to the isolation control line IG to isolate the two antifuse storing circuits 912 and 914. Consequently, the first antifuse storing circuit 912 generates a first read current to the bit line BL. The second antifuse storing circuit 914 generates a second read current to the inverted bit line $\overline{BL}$. According to the first read current and the second read current, the first antifuse storing circuit 902 is judged to have a first storing state and the second antifuse storing circuit 914 is judged to have a second storing state. That is to say that the storing state of the first antifuse storing circuit 912 and the second antifuse storing circuit 914 is judged by comparing the first read current and the second read current. Moreover, one bit of the random code for the PUF technology is determined according to the first storing state of the first antifuse storing circuit 912.

Alternatively, one bit of the random code can be determined by using a differential sensing operation to compare the first read current and the second read current of the differential OTP memory cell.

The same, when programming the OTP memory cell, the antifuse storing circuits in the OTP memory cell receive the same predetermined voltage difference, and then one of the antifuse storing circuits changes the storing state. After reading the OTP memory cell, the storing states (ruptured conditions) of the antifuse storing circuits are determined and recorded. In this invention, the ruptured conditions are determined based on the manufacturing variation of the programmed antifuse storing circuits. Then, a random code is capable of being generated in response to the recorded ruptured conditions.

Furthermore, the recorded ruptured conditions mentioned above can be directly used as the random code. Or, the recorded ruptured conditions may be processed to generate the random code. For example, input the recorded ruptured conditions to a look up table, and then the random code is generated according to the look up table.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A one time programming memory cell, comprising:
    a selecting circuit connected with a bit line and a word line;
    a first antifuse storing circuit connected with a first antifuse control line and the selecting circuit; and
    a second antifuse storing circuit connected with a second antifuse control line and the selecting circuit,
    wherein during a program cycle, a select voltage is provided to the word line, a ground voltage is provided to the bit line, and a program voltage is provided to the first antifuse control line and the second antifuse control line, wherein the selecting circuit provides the ground voltage to the first antifuse storing circuit and the second antifuse storing circuit, and the program voltage is applied to both of the first antifuse storing circuit and the second antifuse storing circuit, so that a storing state of the first antifuse storing circuit or the second antifuse storing circuit is changed,
    wherein during a read cycle, the select voltage is provided to the word line, the ground voltage is provided to the bit line, a read voltage is provided to the first antifuse control line, and the ground voltage is provided to the second antifuse control line, so that the first antifuse storing circuit generates a first read current to the bit line, wherein the first antifuse storing circuit is judged to have a first storing state or a second storing state according to the first read current, and one bit of a random code for a physically unclonable function technology is realized according to the first storing state or the second storing state of the first antifuse storing circuit.

2. The one time programming memory cell as claimed in claim 1, wherein the selecting circuit comprises a first select transistor and a second select transistor, the first antifuse storing circuit comprises a first antifuse transistor, and the second antifuse storing circuit comprises a second antifuse transistor, wherein a first drain/source terminal of the first select transistor is connected with the bit line, a gate terminal of the first select transistor is connected with the word line, a first drain/source terminal of the first antifuse transistor is connected with a second drain/source terminal of the first select transistor, a gate terminal of the first antifuse transistor is connected with the first antifuse control line, a first drain/source terminal of the second antifuse transistor is connected with a second drain/source terminal of the first antifuse transistor, a gate terminal of the second antifuse transistor is connected with the second antifuse control line, a first drain/source terminal of the second select transistor is connected with a second drain/source terminal of the second antifuse transistor, a gate terminal of the second select transistor is connected with the word line, and a second drain/source terminal of the second select transistor is connected with the bit line.

3. The one time programming memory cell as claimed in claim 1, wherein the selecting circuit comprises a first select transistor, a second select transistor, a first switch transistor and a second switch transistor, the first antifuse storing circuit comprises a first antifuse transistor, and the second antifuse storing circuit comprises a second antifuse transistor, wherein a first drain/source terminal of the first select transistor is connected with the bit line, a gate terminal of the first select transistor is connected with the word line, a first drain/source terminal of the first switch transistor is connected with a second drain/source terminal of the first select transistor, a gate terminal of the first switch transistor is connected with a switch control line, a first drain/source terminal of the first antifuse transistor is connected with a second drain/source terminal of the first switch transistor, a gate terminal of the first antifuse transistor is connected with the first antifuse control line, a first drain/source terminal of the second antifuse transistor is connected with a second drain/source terminal of the first antifuse transistor, a gate terminal of the second antifuse transistor is connected with the second antifuse control line, a first drain/source terminal of the second switch transistor is connected with a second drain/source terminal of the second antifuse transistor, a gate terminal of the second switch transistor is connected with the switch control line, a first drain/source terminal of the second select transistor is connected with a second drain/source terminal of the second switch transistor, a gate terminal of the second select transistor is connected with the word line, and a second drain/source terminal of the second select transistor is connected with the bit line.

4. The one time programming memory cell as claimed in claim 1, wherein the selecting circuit comprises a select transistor, the first antifuse storing circuit comprises a first antifuse transistor, and the second antifuse storing circuit comprises a second antifuse transistor, wherein a first drain/source terminal of the select transistor is connected with the bit line, a gate terminal of the select transistor is connected with the word line, a first drain/source terminal and a second drain/source terminal of the first antifuse transistor are connected with a second drain/source terminal of the select transistor, a gate terminal of the first antifuse transistor is connected with the first antifuse control line, a first drain/source terminal and the second drain/source terminal of the second antifuse transistor are connected with the second drain/source terminal of the select transistor, and a gate terminal of the second antifuse transistor is connected with the second antifuse control line.

5. The one time programming memory cell as claimed in claim 1, wherein the selecting circuit comprises a first select transistor, a second select transistor, the first antifuse storing circuit comprises a first antifuse transistor, the second antifuse storing circuit comprises a second antifuse transistor, and the one time programming memory cell further comprises a third antifuse transistor and a fourth antifuse transistor, wherein a first drain/source terminal of the first select transistor is connected with the bit line, a gate terminal of the first select transistor is connected with the word line, a first drain/source terminal and a second drain/source terminal of the first antifuse transistor are connected with a second drain/source terminal of the first select transistor, a gate terminal of the first antifuse transistor is connected with the first antifuse control line, a first drain/source terminal and a second drain/source terminal of the second antifuse transistor are connected with the second drain/source terminal of the first select transistor, and a gate terminal of the second antifuse transistor is connected with the second antifuse control line, wherein a first drain/source terminal of the second select transistor is connected with the bit line, a gate terminal of the second select transistor is connected with the word line, a first drain/source terminal and a second drain/source terminal of the third antifuse transistor are connected with a second drain/source terminal of the second select transistor, a gate terminal of the third antifuse transistor is connected with a third antifuse control line, a first drain/source terminal and a second drain/source terminal of the fourth antifuse transistor are connected with the second drain/source terminal of the second select transistor, and a gate terminal of the fourth antifuse transistor is connected with a fourth antifuse control line.

6. The one time programming memory cell as claimed in claim 1, wherein the first antifuse storing circuit and the second antifuse storing circuit are disposed symmetrically in a semiconductor.

7. A one time programming memory cell, comprising:
a selecting circuit connected with a bit line, an inverted bit line and a word line;
an isolation circuit connected with an isolation control line;
a first antifuse storing circuit connected with a first antifuse control line, the isolation circuit and the selecting circuit; and
a second antifuse storing circuit connected with a second antifuse control line, the isolation circuit and the selecting circuit,
wherein during a program cycle, a select voltage is provided to the word line, a ground voltage is provided to the bit line and the inverted bit line, an on voltage is provided to the isolation control line, and a program voltage is provided to the first antifuse control line and the second antifuse control line, wherein the isolation circuit is connected with the first antifuse storing circuit and the second antifuse storing circuit, the selecting circuit provides the ground voltage to the first antifuse storing circuit and the second antifuse storing circuit, and the program voltage is applied to both of the first antifuse storing circuit and the second antifuse storing circuit, so that a storing state of the first antifuse storing circuit or the second antifuse storing circuit is changed,
wherein during a read cycle, the select voltage is provided to the word line, the ground voltage is provided to the bit line and the inverted bit line, a read voltage is provided to the first antifuse control line and the second antifuse control line, and an off voltage is provided to the isolation control line, so that the first antifuse storing circuit generates a first read current to the bit line and the second antifuse storing circuit generates a second read current to the inverted bit line, and one bit of a random code for a physically unclonable function technology is determined.

8. The one time programming memory cell as claimed in claim 7, wherein the selecting circuit comprises a first select transistor and a second select transistor, the first antifuse storing circuit comprises a first antifuse transistor, the second antifuse storing circuit comprises a second antifuse transistor, and the isolation circuit comprises an isolation transistor, wherein a first drain/source terminal of the first select transistor is connected with the bit line, a gate terminal of the first select transistor is connected with the word line, a first drain/source terminal of the first antifuse transistor is connected with a second drain/source terminal of the first select transistor, a gate terminal of the first antifuse transistor is connected with the first antifuse control line, a first drain/source terminal of the isolation transistor is connected with a second drain/source terminal of the first antifuse transistor, a gate terminal of the isolation transistor is connected with the isolation control line, a first drain/source terminal of the second antifuse transistor is connected with a second drain/source terminal of the isolation transistor, a gate terminal of the second antifuse transistor is connected with the second antifuse control line, a first drain/source terminal of the second select transistor is connected with a second drain/source terminal of the second antifuse transistor, a gate terminal of the second select transistor is connected with the word line, and a second drain/source terminal of the second select transistor is connected with the inverted bit line.

9. The one time programming memory cell as claimed in claim 7, wherein the selecting circuit comprises a first select transistor, a second select transistor, a first switch transistor and a second switch transistor, the first antifuse storing circuit comprises a first antifuse transistor, the second antifuse storing circuit comprises a second antifuse transistor, and the isolation circuit comprises an isolation transistor, wherein a first drain/source terminal of the first select transistor is connected with the bit line, a gate terminal of the first select transistor is connected with the word line, a first drain/source terminal of the first switch transistor is connected with a second drain/source terminal of the first select transistor, a gate terminal of the first switch transistor is connected with a switch control line, a first drain/source terminal of the first antifuse transistor is connected with a second drain/source terminal of the first switch transistor, a gate terminal of the first antifuse transistor is connected with the first antifuse control line, a first drain/source terminal of the isolation transistor is connected with a second drain/source terminal of the first antifuse transistor, a gate terminal of the isolation transistor is connected with the isolation control line, a first drain/source terminal of the second antifuse transistor is connected with a second drain/source terminal of the isolation transistor, a gate terminal of the second antifuse transistor is connected with the second antifuse control line, a first drain/source terminal of the second switch transistor is connected with a second drain/source terminal of the second antifuse transistor, a gate terminal of the second switch transistor is connected with the switch control line, a first drain/source terminal of the second select transistor is connected with a second drain/source terminal of the second switch transistor, a gate terminal of the second select transistor is connected with the word line, and a second drain/source terminal of the second select transistor is connected with the inverted bit line.

10. The one time programming memory cell as claimed in claim 7, wherein the first antifuse storing circuit and the second antifuse storing circuit are disposed symmetrically in a semiconductor.

11. A one time programming memory cell, comprising:
a first antifuse transistor, wherein a first drain/source terminal of the first antifuse transistor is connected with a bit line, and a gate terminal of the first antifuse transistor is connected with a first antifuse control line, wherein the gate terminal of the first antifuse transistor comprises a gate oxide layer with a first part and a second part, wherein the first part is thinner than the second part; and
a second antifuse transistor, wherein a first drain/source terminal of the second antifuse transistor is connected with a second drain/source terminal of the first antifuse transistor, a gate terminal of the second antifuse transistor is connected with a second antifuse control line, a second drain/source terminal of the second antifuse transistor is connected with the bit line, wherein the gate terminal of the second antifuse transistor comprises a gate oxide layer with a third part and a fourth part, wherein the third part is thinner than the fourth part,
wherein during a program cycle, a ground voltage is provided to the bit line, and a program voltage is provided to the first antifuse control line and the second antifuse control line, wherein the program voltage is applied to both of the first antifuse storing circuit and the second antifuse storing circuit, so that a storing state of the first antifuse storing circuit or the second antifuse storing circuit is changed,
wherein during a read cycle, the ground voltage is provided to the bit line, a read voltage is provided to the first antifuse control line, and the ground voltage is provided to the second antifuse control line, so that the first antifuse storing circuit generates a first read current to the bit line, wherein the first antifuse storing circuit is judged to have a first storing state or a second storing state according to the first read current, and one bit of a random code for a physically unclonable function technology is realized according to the first storing state or the second storing state of the first antifuse storing circuit.

12. A one time programming memory cell, comprising:
a first antifuse transistor, wherein a first drain/source terminal of the first antifuse transistor is connected with a bit line, and a gate terminal of the first antifuse transistor is connected with a first antifuse control line, wherein the gate terminal of the first antifuse transistor comprises a gate oxide layer with a first part and a second part, wherein the first part is thinner than the second part;
an isolation transistor, wherein a first drain/source terminal of the isolation transistor is connected with a second drain/source terminal of the first antifuse transistor, and a gate terminal of the isolation transistor is connected with an isolation control line; and
a second antifuse transistor, wherein a first drain/source terminal of the second antifuse transistor is connected with a second drain/source terminal of the isolation transistor, a gate terminal of the second antifuse transistor is connected with a second antifuse control line, a second drain/source terminal of the second antifuse transistor is connected with an inverted bit line, wherein the gate terminal of the second antifuse transistor comprises a gate oxide layer with a third part and a fourth part, wherein the third part is thinner than the fourth part,
wherein during a program cycle, a ground voltage is provided to the bit line and the inverted bit line, an on voltage is provided to the isolation control line, and a program voltage is provided to the first antifuse control line and the second antifuse control line, wherein the isolation transistor is connected with the first antifuse transistor and the second antifuse transistor, and the program voltage is applied to both of the first antifuse transistor and the second antifuse transistor, so that a storing state of the first antifuse transistor or the second antifuse transistor is changed,
wherein during a read cycle, the ground voltage is provided to the bit line and the inverted bit line, a read voltage is provided to the first antifuse control line and the second antifuse transistor, and an off voltage is provided to the isolation control line, so that the first antifuse transistor generates a first read current to the bit line and the second antifuse transistor generates a second read current to the inverted bit line, and one bit of a random code for a physically unclonable function technology is determined.

13. A memory array connected with a first bit line, a first word line, a first antifuse control line and a second antifuse control line, the memory array comprising a first one time programming memory cell and a second one time programming memory cell, wherein the first one time programming memory cell comprises:
- a first selecting circuit connected with the first bit line and the first word line;
- a first antifuse storing circuit connected between the first antifuse control line and the first selecting circuit; and
- a second antifuse storing circuit connected between the second antifuse control line and the first selecting circuit,
- wherein the second one time programming memory cell comprises:
- a second selecting circuit connected with the first bit line and a second word line;
- a third antifuse storing circuit connected between a third antifuse control line and the second selecting circuit; and
- a fourth antifuse storing circuit connected between a fourth antifuse control line and the second selecting circuit,
- wherein during a program cycle, a select voltage is provided to the first word line, a ground voltage is provided to the first bit line, and a program voltage is provided to the first antifuse control line and the second antifuse control line, wherein the first selecting circuit provides the ground voltage to the first antifuse storing circuit and the second antifuse storing circuit, and the program voltage is applied to both of the first antifuse storing circuit and the second antifuse storing circuit, so that a storing state of the first antifuse storing circuit or the second antifuse storing circuit is changed,
- wherein during a read cycle, the select voltage is provided to the first word line, the ground voltage is provided to the first bit line, a read voltage is provided to the first antifuse control line, and the ground voltage is provided to the second antifuse control line, so that the first antifuse storing circuit generates a first read current to the first bit line, wherein the first antifuse storing circuit is judged to have a first storing state or a second storing state according to the first read current, and one bit of a random code for a physically unclonable function technology is realized according to the first storing state or the second storing state of the first antifuse storing circuit.

14. The memory array as claimed in claim 13, further comprising a third one time programming memory cell, wherein the third one time programming memory cell comprises:
- a third selecting circuit connected with a second bit line and the first word line;
- a fifth antifuse storing circuit connected between the first antifuse control line and the third selecting circuit; and
- a sixth antifuse storing circuit connected between the second antifuse control line and the third selecting circuit.

15. A memory array connected with a first bit line, a first inverted bit line, a first word line, a first isolation line, a first antifuse control line and a second antifuse control line, the memory array comprising a first one time programming memory cell and a second one time programming memory cell, wherein the first one time programming memory cell comprises:
- a first selecting circuit connected with the first bit line, the first inverted bit line and the first word line;
- a first isolation circuit connected with the first isolation control line;
- a first antifuse storing circuit connected with the first antifuse control line, the first isolation circuit and the first selecting circuit; and
- a second antifuse storing circuit connected with the second antifuse control line, the first isolation circuit and the first selecting circuit,
- wherein the second one time programming memory cell comprises:
- a second selecting circuit connected with the first bit line, the first inverted bit line and a second word line;
- a second isolation circuit connected with a second isolation control line;
- a third antifuse storing circuit connected with a third antifuse control line, the second isolation circuit and the second selecting circuit; and
- a fourth antifuse storing circuit connected with a fourth antifuse control line, the second isolation circuit and the second selecting circuit,
- wherein during a program cycle, a select voltage is provided to the first word line, a ground voltage is provided to the first bit line and the first inverted bit line, an on voltage is provided to the first isolation control line, and a program voltage is provided to the first antifuse control line and the second antifuse control line, wherein the first isolation circuit is connected with the first antifuse storing circuit and the second antifuse storing circuit, the first selecting circuit provides the ground voltage to the first antifuse storing circuit and the second antifuse storing circuit, and the program voltage is applied to both of the first antifuse storing circuit and the second antifuse storing circuit, so that a storing state of the first antifuse storing circuit or the second antifuse storing circuit is changed,
- wherein during a read cycle, the select voltage is provided to the first word line, the ground voltage is provided to the first bit line and the first inverted bit line, a read voltage is provided to the first antifuse control line and the second antifuse storing circuit, and an off voltage is provided to the first isolation control line, so that the first antifuse storing circuit generates a first read current to the first bit line and the second antifuse storing circuit generates a second read current to the first inverted bit line, wherein the first antifuse storing circuit is judged to have a first storing state according to the first read current, and the second antifuse storing circuit is judged to have a second storing state according to the second read current, wherein one bit of a random code for a physically unclonable function technology is realized according to the first storing state of the first antifuse storing circuit.

16. The memory array as claimed in claim 15, further comprising a third one time programming memory cell, wherein the third one time programming memory cell comprises:
- a third selecting circuit connected with a second bit line, a second inverted bit line and the first word line;
- a third isolation circuit connected with the first isolation control line;
- a fifth antifuse storing circuit connected with the first antifuse control line, the third isolation circuit and the third selecting circuit; and
- a sixth antifuse storing circuit connected with the second antifuse control line, the third isolation circuit and the third selecting circuit.

17. A method for generating a random code, comprising steps of:

providing a non-volatile memory cell comprising at least two antifuse storing circuits;

programming the antifuse storing circuits with a same predetermined program voltage difference;

recording the ruptured conditions of the programmed antifuse storing circuits in the non-volatile memory cell; and generating the random code in response to the ruptured conditions.

18. The method as claimed in claim 17, wherein the ruptured conditions are acquired according to reading currents or voltage drops provided by the programmed antifuse storing circuits.

19. The method as claimed in claim 17, further comprising a step of: inputting the ruptured conditions to a look up table to generate the random code.

20. The method as claimed in claim 17, wherein the ruptured conditions are determined based on a manufacturing variation of the programmed antifuse storing circuits.

* * * * *